(12) United States Patent
Huang et al.

(10) Patent No.: US 12,232,105 B2
(45) Date of Patent: Feb. 18, 2025

(54) METHOD AND APPARATUS FOR DETERMINING UPLINK SCHEDULING INFORMATION

(71) Applicant: DATANG MOBILE COMMUNICATIONS EQUIPMENT CO., LTD., Beijing (CN)

(72) Inventors: Qiuping Huang, Beijing (CN); Yiwen Lu, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 398 days.

(21) Appl. No.: 17/636,020

(22) PCT Filed: Aug. 10, 2020

(86) PCT No.: PCT/CN2020/108296
§ 371 (c)(1),
(2) Date: Feb. 16, 2022

(87) PCT Pub. No.: WO2021/031913
PCT Pub. Date: Feb. 25, 2021

(65) Prior Publication Data
US 2022/0287059 A1 Sep. 8, 2022

(30) Foreign Application Priority Data
Aug. 16, 2019 (CN) .......................... 201910760964.9

(51) Int. Cl.
*H04W 52/34* (2009.01)
*H04B 7/0456* (2017.01)
*H04W 72/1268* (2023.01)

(52) U.S. Cl.
CPC ...... *H04W 72/1268* (2013.01); *H04B 7/0456* (2013.01); *H04W 52/34* (2013.01)

(58) Field of Classification Search
CPC ........... H04W 72/1268; H04W 7/0456; H04W 52/34
(Continued)

(56) References Cited

U.S. PATENT DOCUMENTS 11,368,916 B2 * 6/2022 Park ..................... H04W 52/367
2011/0275403 A1 11/2011 Chen et al.
(Continued)

FOREIGN PATENT DOCUMENTS

| CN | 1308291 A | 8/2001 |
| CN | 102763463 B | 7/2015 |

(Continued)

OTHER PUBLICATIONS

Intel Corporation,"On Full Power Uplink Transmission", 3GPP TSG RAN WG1 Meeting #97,Reno, USA, May 13-17, 2019, total 5 pages,R1-1906817.
(Continued)

*Primary Examiner* — Dang T Ton
(74) *Attorney, Agent, or Firm* — Kilpatrick Townsend & Stockton LLP

(57) ABSTRACT

A method and apparatus for determining uplink scheduling information. The method includes a user equipment (UE) reports full power transmission capability and/or coherence transmission capability to a base station, determining a codebook subset of a codebook-based PUSCH and/or second information according to first information, the first information comprising at least one of the following information: the full power transmission capability, the coherence transmission capability, codebook subset restriction information of the codebook-based PUSCH, and first instruction, and the second information comprising an over-
(Continued)

head indicated by a precoded matrix and the number of transport layers of the codebook-based PUSCH and/or an encoding mode indicated by the precoded matrix and the number of transport layers of the codebook-based PUSCH, and receiving uplink scheduling information of the codebook-based PUSCH, and determining the precoded matrix and the number of transport layers of the codebook-based PUSCH according to the uplink scheduling information of the codebook-based PUSCH.

19 Claims, 11 Drawing Sheets

(58) Field of Classification Search
USPC .................................. 370/329, 400, 401, 402
See application file for complete search history.

(56) References Cited

U.S. PATENT DOCUMENTS

| | | | |
|---|---|---|---|
| 2012/0177089 A1 | 7/2012 | Pelletier et al. | |
| 2018/0183503 A1 | 6/2018 | Rahman et al. | |
| 2018/0367252 A1 | 12/2018 | Nammi et al. | |

FOREIGN PATENT DOCUMENTS

| | | |
|---|---|---|
| CN | 106455066 A | 2/2017 |
| CN | 108322241 A | 7/2018 |
| CN | 108990069 A | 12/2018 |
| CN | 109167621 A | 1/2019 |
| CN | 109600208 A | 4/2019 |
| CN | 109690962 A | 4/2019 |
| EP | 2979502 A1 | 2/2016 |
| WO | 2014158072 A1 | 10/2014 |

OTHER PUBLICATIONS

CATT,"Consideration on full transmission power of UL", 3GPP TSG RAN WG1 Meeting #94bis, Chengdu, China, Oct. 8-12, 2018, total 7 pages, R1-1810557.
Vivo,"Feature lead summary on Full TX Power UL transmission", 3GPP TSG RAN WG1#97, Reno, USA, May 13-17, 2019, total 20 pages, R1-1907671.
Nokia et al.,"On the full Tx power UL transmission", 3GPP TSG-RAN WG1 Meeting #97, Reno, USA, May 13-17, 2019, total 5 pages, R1-1907318.
Ritao Chen et al.,"Vertical industry-oriented wireless network planning system and key technologies", 5G network Planning, 5G network Innovation Seminar 2019, China, total 8 pages.
Huawei et al.,"UL MIMO full power transmission with multiple PAs", 3GPP TSG RAN WG1 Meeting #97, Reno, USA, May 13-17, 2019, total 11 pages, R1-1906031.

* cited by examiner

| Transmitted Precoding Matrix Indicator (TPMI) Index | Precoding matrix $W$ (Sorting from left to right according to an ascending order of the TPMI index) | | | | | | | |
|---|---|---|---|---|---|---|---|---|
| 0 – 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

FIG. 1A

| Transmitted Precoding Matrix Indicator (TPMI) Index | Precoding matrix $W$ (Sorting from left to right according to an ascending order of the TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | – | – | – | – |

FIG. 1B

| Transmitted Precoding Matrix Indicator (TPMI) Index | Precoding matrix $W$ (Sorting from left to right according to an ascending order of the TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-1\end{bmatrix}$ | $\frac{1}{2}\begin{bmatrix}1\\j\\-j\\-1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | – | – | – | – |

FIG. 1C

| Transmitted Precoding Matrix Indicator (TPMI) Index | Precoding matrix $W$ (Sorting from left to right according to an ascending order of the TPMI index) |
|---|---|
| 0 – 2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

FIG. 1D

| Transmitted Precoding Matrix Indicator (TPMI) Index | Precoding matrix $W$ (Sorting from left to right according to an ascending order of the TPMI index) | | | |
|---|---|---|---|---|
| 0 – 3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4 – 7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8 – 11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12 – 15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16 – 19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20 – 21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | - | - |

FIG. 1E

| Transmitted Precoding Matrix Indicator (TPMI) Index | Precoding matrix $W$ (Sorting from left to right according to an ascending order of the TPMI index) | | | |
|---|---|---|---|---|
| 0 – 3 | $\dfrac{1}{2}\begin{bmatrix} 1 & 0 & 0 \\ 0 & 1 & 0 \\ 0 & 0 & 1 \\ 0 & 0 & 0 \end{bmatrix}$ | $\dfrac{1}{2}\begin{bmatrix} 1 & 0 & 0 \\ 0 & 1 & 0 \\ 1 & 0 & 0 \\ 0 & 0 & 1 \end{bmatrix}$ | $\dfrac{1}{2}\begin{bmatrix} 1 & 0 & 0 \\ 0 & 1 & 0 \\ -1 & 0 & 0 \\ 0 & 0 & 1 \end{bmatrix}$ | $\dfrac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 – 6 | $\dfrac{1}{2\sqrt{3}}\begin{bmatrix} 1 & 1 & 1 \\ 1 & -1 & 1 \\ j & j & -j \\ j & -j & -j \end{bmatrix}$ | $\dfrac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\dfrac{1}{2\sqrt{3}}\begin{bmatrix} 1 & 1 & 1 \\ -1 & 1 & -1 \\ j & j & -j \\ -j & j & j \end{bmatrix}$ | - |

FIG. 1F

| Transmitted Precoding Matrix Indicator (TPMI) Index | Precoding matrix $W$ (Sorting from left to right according to an ascending order of the TPMI index) | | | |
|---|---|---|---|---|
| 0 – 3 | $\dfrac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\dfrac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\dfrac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\dfrac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\dfrac{1}{4}\begin{bmatrix} 1 & 1 & 1 & 1 \\ 1 & -1 & 1 & -1 \\ j & j & -j & -j \\ j & -j & -j & j \end{bmatrix}$ | - | - | - |

FIG. 1G

METHOD AND APPARATUS FOR DETERMINING UPLINK SCHEDULING INFORMATION

CROSS-REFERENCE TO RELATED APPLICATIONS

The present disclosure is a National Stage of International Application No. PCT/CN2020/108296, filed on Aug. 10, 2020, which claims the priority of the Chinese patent application No. 201910760964.9, filed to the China National Intellectual Property Administration on Aug. 16, 2019, and entitled "METHOD AND APPARATUS FOR DETERMINING UPLINK SCHEDULING INFORMATION", of which the entire contents are incorporated herein by reference.

FIELD

The present disclosure relates to the field of wireless communication, in particular to a method and apparatus for determining uplink scheduling information.

BACKGROUND

A user equipment (UE) may have power amplifiers (PAs), and there are coherent transmission or noncoherent transmission between different PAs. When PAs corresponding to two antenna ports meet a coherent transmission condition, the UE utilizes the two antenna ports to perform simultaneous data transmission of the same layer through precoding, to obtain array gain. As for UE unable to achieve coherent transmission of antennas, there is possibly a large difference between the phase difference between the antennas of the UE when a base station calculates a transmitted precoding matrix indicator (TPMI) and phase difference between the antennas when the UE performs physical uplink shared channel (PUSCH) transmission after receiving the TPMI. If the TPMI indicates the antennas unable to achieve coherent transmission to be used for transmission of the same data layer, optimal uplink transmission precoding of the UE may be possibly not precoding indicated by the TPMI, that is, good performance cannot be obtained when the UE performs PUSCH transmission using the precoding indicated by the base station via the TPMI.

Coherent transmission capability of the UE antennas is considered in the codebook design of a new radio (NR) system. The base station may configure the following three codebook subsets for the UE through a radio resource control (RRC) signaling "codebookSubset": nonCoherent, partialAndNonCoherent, fullyAndPartialAndNonCoherent. A codebook subset corresponding to nonCoherent is all precoding codewords, corresponding to a situation that any data layer is transmitted only through one antenna port, in a codebook; a codebook subset corresponding to partialAndNonCoherent are all codewords meeting the following conditions in the codebook: precoding codewords that any data layer is transmitted through one antenna port, or first and third ports, or second and fourth ports; and a codebook subset corresponding to fullyAndPartialAndNonCoherent is all codewords in the codebook.

Accordingly, the NR system defines PUSCH transmission coherence (pusch-TransCoherence) of the UE, and the UE reports its antenna-TransCoherence by reporting codebook subset supported thereof. The pusch-TransCoherence includes three values: nonCoherent, partialNonCoherent, fullCoherent. When UE capability report nonCoherent, the base station can only configure codebook subset of nonCoherent for the UE; when the UE capability report partialNonCoherent, the base station can configure the codebook subset of nonCoherent or codebook subset of partialAndNonCoherent for the UE; and when the UE capability report fullCoherent, the base station can configure the codebook subset of nonCoherent or the codebook subset of partialAndNonCoherent or codebook subset of fullyAndPartialAndNonCoherent for the UE.

As can be seen, the base station needs to configure the codebook subset according to the pusch-TransCoherence reported by the UE. Codewords in an uplink codebook are divided into three types: noncoherent codewords, partialcoherent codewords and fullcoherent codewords respectively. The noncoherent codeword meets a condition that: each PUSCH layer has only one activated antenna port (only one element corresponding to a antenna port is non-zero); the partialcoherent codeword meets a condition that: each PUSCH layer has at most two activated antenna ports (only two elements corresponding to antenna ports are non-zero), and there is at least one PUSCH layer having the two activated antenna ports; and the fullcoherent codeword meets a condition that: there is at least one PUSCH layer using all antenna ports (all elements corresponding to the antenna ports are non-zero). In other words, in any column in the partialcoherent codewords there is only non-zero elements corresponding and belonging to the same coherent transmission antenna group (in a third generation partnership project NR system, first and third antennas form one coherent transmission antenna group, and second and fourth antennas form another coherent transmission antenna group); in any column in the noncoherent codewords there is only non-zero elements corresponding to one antenna; and in the fullcoherent codewords, there is at least one column of elements are non-zero.

One UE with specific power class (PC) capability needs to meet a requirement of maximum output power. For example, as for a UE with power class being PC 3, the maximum output power thereof is required to be capable of reaching 23 dBm; and as for a UE with the power class being PC 2, the maximum output power thereof is required to be capable of reaching 26 dBm. As for a UE with PAs, it can meet the maximum output power requirement by using PAs for simultaneous sending. That is, each PA of the UE is not required to realize the maximum output power required by the power class of the UE. For example, as for a UE which has two sending antennas (or two PAs) and the output power of each sending antenna (or PA) may reach 20 dBm, the maximum output power of the UE can reach 23 dBm by using the two antennas for simultaneous sending, and thus the UE is the UE being PC 3.

In order to avoid that transmission power of uplink scheduled by the base station exceeds the PA capability of the UE, in the NR system, a multiple-antenna power allocation mode for PUSCH adopting codebook-based uplink Multiple-Input Multiple-Output (MIMO) is: if triggering is performed through a Downlink Control Information (DCI) format 0_1 and the quantity of the antenna ports in each Sounding Reference Signal (SRS) resource is greater than 1, the UE will perform power scaling on the basis of PUSCH transmission power calculated through an uplink power control formula according to a proportion of the quantity of actual non-zero signal sending ports in a maximum SRS port quantity in one SRS resource supported by a terminal, and then equally allocate the scaled power to antenna ports for actually sending the signal. For example, it is assumed that the maximum SRS port quantity in one SRS resource supported by the terminal is 4, four antenna ports are configured for uplink transmission, a precoding matrix indicated by the base station is $½[1\ 0\ 1\ 0]^T$, and the transmission power (for example, in the NR system, PUSCH transmission power calculated corresponding to section 7.1.1 in 3GPP TS 38.213-f40 version) calculated by the UE according to the PUSCH power control formula is P, thus actual PUSCH transmission power is P/2, where transmission power of the first antenna port and the third antenna port each is P/4. This scaling scheme does not require each antenna port of UE to have maximum transmission power, and allows the UE to use radio frequency components with the lower cost to implement a multi-antenna function. We may define an uplink transmission mode that the PUSCH transmission power calculated according to the uplink power control formula is not scaled or scaled by a scaling factor is 1, and then allocated to signal ports with data transmission as full power transmission, or otherwise, non-full power transmission.

Under a current uplink transmission solution and power control solution, when the quantity of the antenna ports in the SRS resource for obtaining the Channel State Information (CSI) configured by the base station for the UE is greater than 1 and smaller than the maximum port quantity in one SRS resource supported by the terminal, no matter what precoding matrix is indicated to the UE by the base station, the terminal cannot perform full power transmission of the PUSCH. When the quantity of the antenna ports in the SRS resource for obtaining the CSI configured by the base station for the UE is equal to the maximum port quantity in one SRS resource supported by the terminal, and when the precoding matrix indicated by the base station for the UE is the noncoherent codewords or the partialcoherent codewords, the UE cannot perform full power transmission. When the pusch-TransCoherence of the UE is partialNonCoherent or nonCoherent, since the base station cannot configure the codebook subset of fullyAndPartialAndNonCoherent for the UE, the UE cannot perform full power uplink transmission either.

There are only three codebook subset restrictions of fullyAndPartialAndNonCoherent, partialAndNonCoherent and nonCoherent at present, if the base station is allowed to configure the codebook subset restriction of the fullyAndPartialAndNonCoherent for the UE with the pusch-TransCoherence being partialNonCoherent or nonCoherent, UE full power transmission can be achieved, but a large DCI overhead is generated. Therefore, how to achieve UE full power transmission with a low DCI overhead is an urgent problem to solve.

SUMMARY

An embodiment of the present disclosure provides an uplink scheduling information determining method and apparatus, configured to achieve full power transmission of user equipment with a low DCI overhead.

A first aspect provides an uplink scheduling information determining method, including: reporting, by user equipment, a full power transmission capability and/or a coherent transmission capability of the user equipment to a base station;
   determining, by the user equipment, a codebook subset of a codebook-based physical uplink shared channel (PUSCH) and/or second information according to first information, and the first information includes at least one of the following information: the full power transmission capability, the coherent transmission capability, information on codebook subset restriction of the codebook-based PUSCH, or first instruction, the second information includes an overhead of the indication of precoding information and number of layers of the codebook-based PUSCH, and/or an encoding mechanism of the indication of precoding information and number of layers of the codebook-based PUSCH, the first instruction includes instruction for instructing the user equipment to perform full power transmission or not to perform full power transmission and/or instruction for indicating a full power transmission mode of the user equipment, and the information on codebook subset restriction of the codebook-based PUSCH is used for indicating the codebook subset of the codebook-based PUSCH;
   receiving, by the user equipment, uplink scheduling information of the codebook-based PUSCH sent by the base station; and
   determining, by the user equipment, the precoding matrix and the number of transmission layers of the codebook-based PUSCH according to the uplink scheduling information of the codebook-based PUSCH, the codebook subset of the codebook-based PUSCH and the second information sent by the base station.

A second aspect provides an uplink scheduling information determining method, including: receiving, by a base station, report information of user equipment, and the report information at least includes a full power transmission capability of the user equipment and/or a coherent transmission capability of the user equipment;
   determining, by the base station, the full power transmission capability of the user equipment and/or the coherent transmission capability of the user equipment according to the report information;
   determining, by the base station, a codebook subset of a codebook-based physical uplink shared channel (PUSCH) and/or third information according to the full power transmission capability of the user equipment and/or the coherent transmission capability of the user equipment, and the third information includes at least one of the following information: an overhead indicated by a precoding matrix and the number of transmission layers of the codebook-based PUSCH, an encoding mode indicated by the precoding matrix and the number of transmission layers of the codebook-based PUSCH, or information on codebook subset restriction of the codebook-based PUSCH, and the information on codebook subset restriction of the codebook-based PUSCH is used for indicating the codebook subset of the codebook-based PUSCH; and
   sending, by the base station, uplink scheduling information of the codebook-based PUSCH to the user equipment according to the codebook subset of the codebook-based PUSCH and/or the third information.

A third aspect provides user equipment, including a processor, a memory and a transceiver.
   The memory stores a computer instruction; and
   the processor is configured to read the computer instruction to execute the method according to any one in the above first aspect.

A fourth aspect provides a base station, including a processor, a memory and a transceiver.
   The memory stores a computer instruction; and
   the processor is configured to read the computer instruction to execute the method according to any one in the above second aspect.

A fifth aspect provides user equipment, including a sending device, a first determining device, a receiving device and a second determining device, and the sending device is configured to report a full power transmission capability of the user equipment and/or a coherent transmission capability of the user equipment to a base station; the first determining device is configured to determine a codebook subset of a codebook-based physical uplink shared channel (PUSCH) and/or second information according to first information, the first information includes at least one of the following information: the full power transmission capability, the coherent transmission capability, information on codebook subset restriction of the codebook-based PUSCH, or first instruction, the second information includes an overhead of the indication of precoding information and number of layers of the codebook-based PUSCH, and/or an encoding mechanism of the indication of precoding information and number of layers of the codebook-based PUSCH, the first instruction includes instruction for instructing the user equipment to perform full power transmission or not to perform full power transmission and/or instruction for indicating a full power transmission mode of the user equipment, and the information on codebook subset restriction of the codebook-based PUSCH is used for indicating the codebook subset of the codebook-based PUSCH;

the receiving device is configured to receive uplink scheduling information of the codebook-based PUSCH sent by the base station; and the second determining device is configured to determine the precoding matrix and the number of transmission layers of the codebook-based PUSCH according to the uplink scheduling information of the codebook-based PUSCH sent by the base station, the codebook subset of the codebook-based PUSCH and the second information.

A sixth aspect provides a base station, including a receiving device, a first determining device, a second determining device and a sending device, and the receiving device is configured to receive report information of user equipment, and the report information at least includes a full power transmission capability of the user equipment and/or a coherent transmission capability of the user equipment;

the first determining device is configured to determine the full power transmission capability of the user equipment and/or the coherent transmission capability of the user equipment according to the report information;

the second determining device is configured to determine a codebook subset of a codebook-based physical uplink shared channel (PUSCH) and/or third information according to the full power transmission capability of the user equipment and/or the coherent transmission capability of the user equipment, the third information includes at least one of the following information: an overhead indicated by a precoding matrix and the number of transmission layers of the codebook-based PUSCH, an encoding mode indicated by the precoding matrix and the number of transmission layers of the codebook-based PUSCH, or information on codebook subset restriction of the codebook-based PUSCH, and the information on codebook subset restriction of the codebook-based PUSCH is used for indicating the codebook subset of the codebook-based PUSCH; and the sending device is configured to send uplink scheduling information of the codebook-based PUSCH to the user equipment according to the codebook subset of the codebook-based PUSCH and/or the third information.

A seventh aspect provides a computer readable storage medium. The computer readable storage medium stores a computer instruction, and the computer instruction, when run on a computer, causes the computer to execute the method according to any one of the first aspect.

An eighth aspect provides a computer readable storage medium. The computer readable storage medium stores a computer instruction, and the computer instruction, when run on a computer, causes the computer to execute the method according to any one of the second aspect.

BRIEF DESCRIPTION OF THE DRAWINGS

FIG. 1A is a precoding matrix for single-layer transmission by using two antenna ports provided by an embodiment of the present disclosure.

FIG. 1B is a precoding matrix for single-layer transmission using four antenna ports based on a Direct Fourier Transformer Spread Orthogonal Frequency Division Multiplexing (DFT-S-OFDM) waveform provided by an embodiment of the present disclosure.

FIG. 1C is a precoding matrix for single-layer transmission by using four antenna ports based on a Cyclic Prefix Orthogonal Frequency Division Multiplexing (CP-OFDM) waveform provided by an embodiment of the present disclosure.

FIG. 1D is a precoding matrix for double-layer transmission by using two antenna ports based on a CP-OFDM waveform provided by an embodiment of the present disclosure.

FIG. 1E is a precoding matrix for two-layer transmission by using four antenna ports based on a CP-OFDM waveform provided by an embodiment of the present disclosure.

FIG. 1F is a precoding matrix for three-layer transmission by using four antenna ports based on a CP-OFDM waveform provided by an embodiment of the present disclosure.

FIG. 1G is a precoding matrix for four-layer transmission by using four antenna ports based on a CP-OFDM waveform provided by an embodiment of the present disclosure.

DETAILED DESCRIPTION

Figure 2:
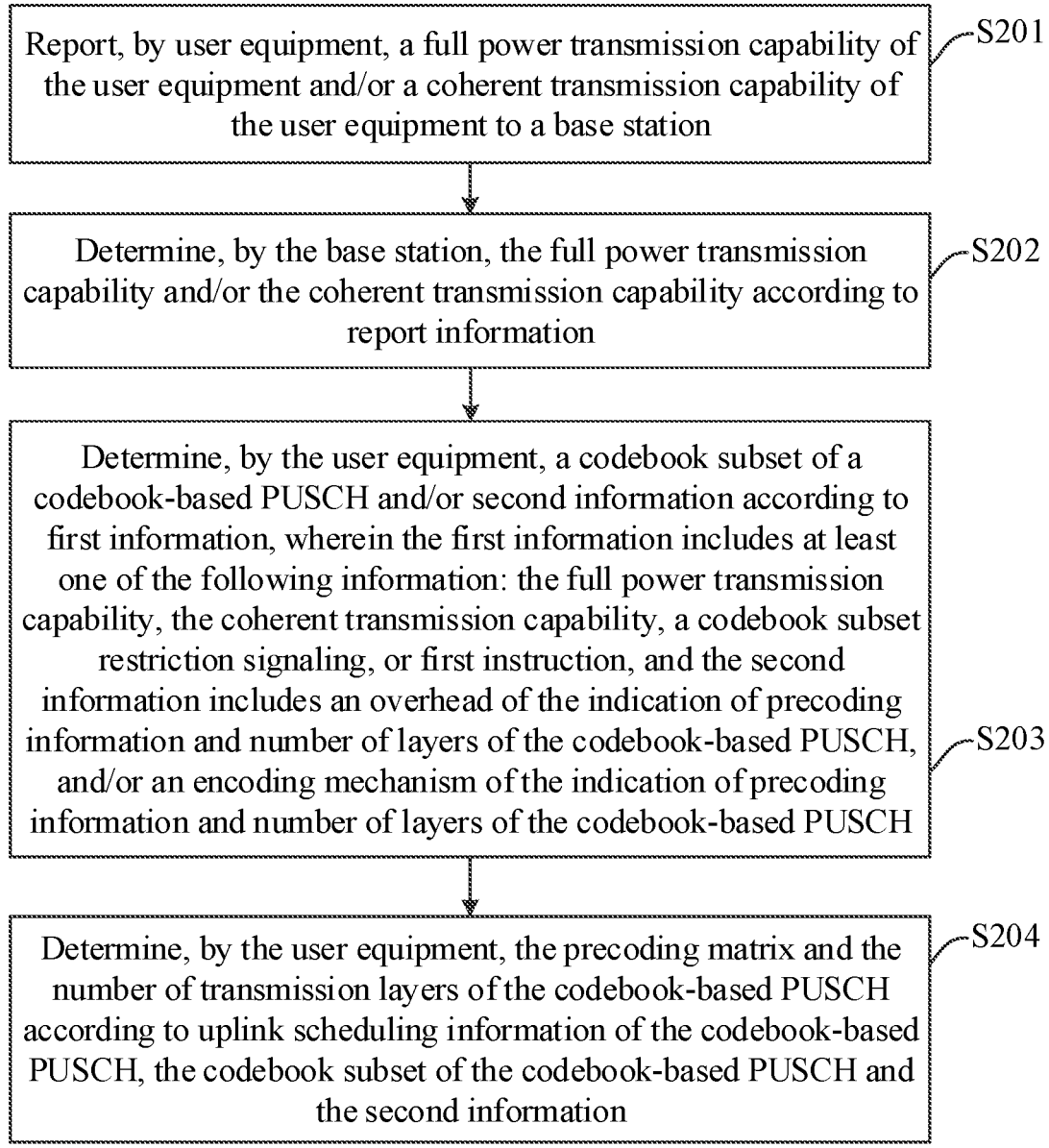
FIG. 2 is a schematic flow diagram of an uplink scheduling information determining method provided by an embodiment of the present disclosure.

Firstly, part of terms in embodiments of the present disclosure are explained and illustrated.

(1) "First", "second", "third" and the like are configured to distinguish similar objects, and are not necessarily configured to describe a specific order or a precedence order.

(2) "And/or" describes an association relationship of an association object, and represents that there may be three kinds of relationships, for example, A and/or B, may represent: A exists alone, A and B exist at the same time, and B exists alone. A character "/" generally represents that the previous and next association objects are in a "or" relationship.

(3) User equipment (UE) may be called a terminal, a mobile station (MS for short), a mobile terminal, an MTC terminal and the like, and the user equipment may be in communication with one or more core networks via a radio access network (RAN for short).

(4) A base station may be an Evolutional Node B (eNB or e-NodeB for short), a Macro NodeB, a MicroNodeB (also called "small base station"), a femto base station, an access point (AP for short) or a transmission point (TP for short) and the like in an LTE system, which is not limited in the present disclosure. But in order to facilitate description, the following embodiments will be illustrated by taking the base station and the user equipment as an example.

Secondly, the drawings involved in the embodiments of the present disclosure are illustrated as follows.

FIG. 1A is a schematic diagram of a precoding matrix W for single-layer transmission by using two antenna ports provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0-1 are noncoherent transmission codewords, and the rest codewords are fullcoherent transmission codewords.

FIG. 1B is a schematic diagram of a precoding matrix W for single-layer transmission by using four antenna ports based on a DFT-S-OFDM waveform provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0-3 are noncoherent transmission codewords, codewords corresponding to TPMI index 4-11 are partialcoherent transmission codewords, and the rest codewords are fullcoherent transmission codewords.

FIG. 1C is a schematic diagram of a precoding matrix W for single-layer transmission by using four antenna ports based on a CP-OFDM waveform provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0-3 are noncoherent transmission codewords, codewords corresponding to TPMI index 4-11 are partialcoherent transmission codewords, and the rest codewords are fullcoherent transmission codewords.

FIG. 1D is a schematic diagram of a precoding matrix W for double-layer transmission by using two antenna ports based on a CP-OFDM waveform provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0 are noncoherent transmission codewords, and codewords corresponding to TPMI index 1 and 2 are fullcoherent transmission codewords.

FIG. 1E is a schematic diagram of a precoding matrix W for double-layer transmission by using four antenna ports based on a CP-OFDM waveform provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0-5 are noncoherent transmission codewords, codewords corresponding to TPMI index 6-13 are partialcoherent transmission codewords, and the rest codewords are fullcoherent transmission codewords.

FIG. 1F is a schematic diagram of a precoding matrix W for three-layer transmission by using four antenna ports based on a CP-OFDM waveform provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0 are noncoherent transmission codewords, codewords corresponding to TPMI index 1 and 2 are partialcoherent transmission codewords, and the rest codewords are fullcoherent transmission codewords.

FIG. 1G is a schematic diagram of a precoding matrix W for four-layer transmission by using four antenna ports based on a CP-OFDM waveform provided by an embodiment of the present disclosure. The figure shows a corresponding relationship between a transmitted precoding matrix index and the precoding matrix. The precoding matrix is sorted from left to right according to an ascending order of TPMI index, codewords corresponding to TPMI index 0 are noncoherent transmission codewords, codewords corresponding to TPMI index 1 and 2 are partialcoherent transmission codewords, and the rest codewords are fullcoherent transmission codewords.

Specific implementations of the present disclosure are illustrated in detail below with reference to the drawings. It should be understood that the specific implementations described here are only configured to illustrate and explain the present disclosure and not to limit the present disclosure.

In a NR system of 3GPP Release 15 (R15), as for UE with a partialcoherent transmission capability and UE with a noncoherent transmission capability, during low rank transmission in a codebook-based uplink transmission scheme configured with antenna ports, transmission power of the UE cannot reach maximum transmission power. The UE of 3GPP R15 cannot realize uplink maximum transmitting power during transmission when the quantity of non-codebook uplink multi-antenna ranks configured with antenna ports is smaller than the quantity of the configured antenna ports. This will reduce performance of the UE at a cell edge, and influence coverage of a cell.

In the R15 version of the 3GPP NR system, as for the UE with the coherent transmission capability being partialcoherent or noncoherent, if the base station configures the UE with codebook-based uplink MIMO transmission, the terminal must multiply transmission power of PUSCH by a scaling factor smaller than 1 and then performs PUSCH transmission, that is, full power transmission of the PUSCH cannot be used. This will reduce the using efficiency of the UE transmission power. Users at cell edge are significantly influenced by other user interference, and transmission performance of the PUSCH will be reduced by reducing the transmission power of the PUSCH.

In addition, there are only three codebook subset restrictions of fullyAndPartialAndNonCoherent, partialAndNonCoherent and nonCoherent at present. If the base station is allowed to configure the codebook subset restriction of the fullyAndPartialAndNonCoherent for the UE with the pusch- TransCoherence being partialNonCoherent or nonCoherent, full power transmission can be achieved, but a large DCI overhead is generated.

In order to solve the above problem, an embodiment of the present disclosure provides an uplink scheduling information determining method. The method is applied to a user equipment side, and may realize full power transmission of user equipment with a low DCI overhead.

FIG. 2 shows a schematic flow diagram of an uplink scheduling information determining method provided by an embodiment of the present disclosure.

As shown in the figure, the flow includes the following steps.

S201, the user equipment reports a full power transmission capability of the user equipment and/or a coherent transmission capability of the user equipment to a base station.

In one embodiment, the user equipment reports the full power transmission capability of the user equipment to the base station; or the user equipment reports the coherent transmission capability of the user equipment to the base station; or the user equipment reports the full power transmission capability of the user equipment and the coherent transmission capability of the user equipment to the base station.

In some embodiments, before or after the user equipment reports the full power transmission capability and/or the coherent transmission capability to the base station, the user equipment further receives codebook subset restriction information sent by the base station.

In some embodiments, before or after the user equipment reports the full power transmission capability and/or the coherent transmission capability to the base station, the user equipment further receives a first instruction sent by the base station. The first instruction includes one of the following: instruction for instructing the UE whether or not to perform full power transmission; instruction of a full power transmission mode; and the instruction for instructing the UE whether or not to perform full power transmission and the instruction of the full power transmission mode.

The instruction of the full power transmission mode may be instruction of a transmission mode causing a terminal to achieve full power transmission. For example, instruction for instructing the terminal to use a precoding matrix exceeding a coherent transmission capability of the terminal to perform codebook-based PUSCH transmission. For another example, instruction for instructing the terminal to use an uplink transmission mode, which may realize that the scaling factor of the transmission power of the codebook-based PUSCH corresponding to at least part of precoding matrix is 1, to perform the codebook-based PUSCH transmission.

In addition, it should be noted that one definition of full power transmission of the PUSCH by the user equipment is that under a condition of not considering simultaneous transmitting of the PUSCH and other signals, the user equipment has uplink transmission power corresponding to at least one precoding codeword being PUSCH transmission power calculated according to an uplink power control formula (for example, in the NR system, corresponding to the PUSCH transmission power calculated in section 7.1.1 in 3GPP TS 38.213 version) under uplink codebook subset restriction. A user equipment sending behavior not meeting the definition of full power transmission is non-full power transmission. If the PUSCH and other signals (such as PUCCH or SRS) are simultaneously transmitted (frequency division multiplexing), the transmission power of the user equipment may be subjected to one proportion scaling according to power of the various signals, at the moment, the transmission power of PUSCH needs to be multiplied by a coefficient related to signal multiplexing, and in this case, we still consider that the user equipment sends the PUSCH in full power. In addition, if transmission of the PUSCH is single port transmission, a behavior that the user equipment sends the PUSCH according to the PUSCH transmission power calculated according to the uplink power control formula (for example, in the NR system, corresponding to the PUSCH transmission power calculated in section 7.1.1 in 3GPP TS 38.213 version) is also considered as full power transmission. The PUSCH transmission power calculated by the user equipment according to the uplink power control formula is determined by the user equipment according to its maximum transmission power, an open-loop receiving end power target value, path loss estimate, path loss compensation factor and other information on an uplink carrier.

A case that one PA may achieve full power transmission means that transmission power of the PA may reach maximum output power corresponding to power class of the user equipment.

A case that one antenna port may achieve full power transmission means that transmission power of the antenna port may reach maximum output power corresponding to the power class of the user equipment, or may reach the PUSCH transmission power calculated by the user equipment according to the uplink power control formula.

The full power transmission capability of the user equipment may contain a full power transmission capability of the PA of the user equipment, and/or a full power transmission capability of the antenna port, and/or a codebook-based PUSCH full power transmission capability, etc.

The coherent transmission capability of the user equipment refers to a capability of keeping relative phase difference between antennas of the user equipment changing within a certain range. The coherent transmission capability of the user equipment may include at least one of noncoherent transmission, partialcoherent transmission or fullcoherent transmission (for example, the user equipment reports its antenna coherent transmission capability through codebook subset restriction indication). The coherent transmission capability of the user equipment may also contain an antenna coherent transmission capability of the user equipment.

When the coherent transmission capability of the user equipment is that all antennas cannot be used for coherent transmission (that is, the coherent transmission capability of the user equipment is the noncoherent transmission capability), a precoding matrix (or called codeword) exceeding the coherent transmission capability of the user equipment refers to a precoding matrix (or called codeword) with a quantity of non-zero elements being greater than 1 on at least one data layer (or being regarded as at least one column of the precoding matrix), and other precoding matrixes are precoding matrixes not exceeding the coherent transmission capability of the user equipment. When the coherent transmission capability of the user equipment is that partial antennas can be used for coherent transmission (that is, the coherent transmission capability of the user equipment is the partial coherent transmission capability), the precoding matrix (or called codeword) exceeding the coherent transmission capability of the user equipment refers to a precoding matrix with a quantity of non-zero elements being greater than M on at least one data layer (or being regarded as at least one column of the precoding matrix), and M is the quantity of antennas that can be used for coherent transmission of the user equipment (for example, M=2), and other precoding matrixes are precoding matrixes not exceeding the coherent transmission capability of the user equipment.

In the present disclosure, the term antenna port are used at many places. In order to facilitate description, a signal port is directly described as the antenna port of a signal in part of content of the present disclosure. For example, a PUSCH port is described as an antenna port of PUSCH, an SRS port is described as an antenna port of SRS, or a port of a certain signal is directly described as an antenna port.

S202, the user equipment determines a codebook subset of a codebook-based PUSCH and/or second information according to first information.

In one embodiment, the user equipment determines the codebook subset of the codebook-based PUSCH according to the first information; or the user equipment determines the second information according to the first information; or the user equipment determines the codebook-based PUSCH and the second information according to the first information.

The first information includes at least one of the following information: the full power transmission capability; the coherent transmission capability; codebook subset restriction information; or first instruction. The second information includes one of the following information: an overhead of the indication of precoding information and number of layers of the codebook-based PUSCH; an encoding mechanism of the indication of precoding information and number of layers of the codebook-based PUSCH; or the overhead of the indication of precoding information and number of layers of the codebook-based PUSCH, and an encoding mechanism of the indication of precoding information and number of layers of the codebook-based PUSCH.

In one embodiment, before S202, the user equipment receives second instruction sent by the base station, the second instruction is configured to instruct the user equipment to determine the second information according to the full power transmission capability; or instruct the user equipment to determine the second information according to the coherent transmission capability; or instruct the user equipment to determine the second information according to the full power transmission capability and the coherent transmission capability.

In some embodiments, the first information includes the first instruction. When the first instruction instructs the UE to perform full power transmission, the UE determines a maximum number of transmission layers of the codebook-based PUSCH, the maximum number of transmission layers of the codebook-based PUSCH is equal to S, or the maximum number of transmission layers of the codebook-based PUSCH is not greater than S, and S is a positive integer. Further, the maximum number of transmission layers of the codebook-based PUSCH is equal to a minimum value among S, R and P; or the maximum number of transmission layers of the codebook-based PUSCH is not greater than the minimum value among S, R and P, where R is a maximum layer quantity limit indicated by the base station, and P is a maximum number of transmission layers supported by the user equipment.

S is a numerical value agreed in a protocol; or S is an implicit numerical value; or S is equal to 1; or S is equal to 2; or the base station and the user equipment determine the value of S according to the full power transmission capability and/or the coherent transmission capability; or the base station sends indication for indicating the value of S to the user equipment.

When the first information includes the first instruction and the first instruction instructs the UE to perform full power transmission, the user equipment performs full power transmission no matter what precoding matrix, indicated by the base station, is received by the user equipment.

When the user equipment receives the codebook subset indicated by the base station and the codebook subset corresponds to full power transmission of the user equipment, the user equipment performs full power transmission no matter what precoding matrix, indicated by the base station, is received by the user equipment.

In one embodiment, different coherent transmission capabilities correspond to overheads and/or encoding modes indicated by different precoding matrixes and transmission layer quantities, and different terminal full power transmission capabilities correspond to the overhead and/or encoding mode indicated by the same precoding matrix and number of transmission layers when there is the same terminal coherent transmission capability.

In one embodiment, the different terminal full power transmission capabilities correspond to the overheads and/or encoding modes indicated by different precoding matrixes and transmission layer quantities, and the different terminal coherent transmission capabilities correspond to the overhead and/or encoding mode indicated by the same precoding matrix and number of transmission layers when there is the same terminal full power transmission capability.

In one embodiment, the different terminal full power transmission capabilities correspond to the overheads and/or encoding modes indicated by the different precoding matrixes and transmission layer quantities, and the different terminal coherent transmission capabilities also correspond to the overheads and/or encoding modes indicated by the different precoding matrixes and transmission layer quantities when there is the same terminal full power transmission capability.

For example, a first user equipment has four antenna ports, the full power transmission capability of the first user equipment is that the maximum transmission power may be reached only when all the antenna ports are used for simultaneous transmission, and the maximum transmission power may be the transmission power that can be reached by the first user equipment based on its power class. A second user equipment has four antenna ports, the full power transmission capability of the second user equipment is that a sum of transmission power of any two antenna ports may reach the maximum transmission power, and the maximum transmission power may be transmission power that can be reached by the second user equipment based on its power class. When a coherent transmission capability of the first user equipment and a coherent transmission capability of the second user equipment are the same, the base station indicates different codebook subset restrictions for the first user equipment and the second user equipment, so second information determined by the first user equipment according to the codebook subset restriction indicated by the base station and second information determined by the second user equipment according to the codebook subset restriction indicated by the base station are different.

S203: the user equipment receives uplink scheduling information of the codebook-based PUSCH sent by the base station.

The user equipment may receive the uplink scheduling information of the codebook-based PUSCH sent by the base station according to the determined overhead indicated by the precoding matrix and the number of transmission layers of the codebook-based PUSCH.

If in S202, the user equipment determines the codebook subset of the codebook-based PUSCH according to the first information, a determining process of the codebook subset of the codebook-based PUSCH and a process involved in S203 are in no particular order.

S204: the user equipment determines the precoding matrix and the number of transmission layers of the codebook-based PUSCH according to the uplink scheduling information of the codebook-based PUSCH, the codebook subset of the codebook-based PUSCH and the second information.

After S204, the user equipment transmits the PUSCH according to the determined precoding matrix and number of transmission layers of the codebook-based PUSCH.

In one embodiment, the user equipment further determines the transmission power of the codebook-based PUSCH according to the determined precoding matrix and number of transmission layers of the codebook-based PUSCH and the full power transmission capability; or the user equipment further determines the transmission power of the codebook-based PUSCH according to the determined precoding matrix and number of transmission layers of the codebook-based PUSCH and the coherent transmission capability; or the user equipment further determines the transmission power of the codebook-based PUSCH according to the determined precoding matrix and number of transmission layers of the codebook-based PUSCH, the full power transmission capability and the coherent transmission capability.

In some embodiments, the user equipment determines the transmission power of the codebook-based PUSCH according to the full power transmission capability. Or, the user equipment determines the transmission power of the codebook-based PUSCH according to the coherent transmission capability. Or, the user equipment determines the transmission power of the codebook-based PUSCH according to codebook subset restriction information. Or, the user equipment determines the transmission power of the codebook-based PUSCH according to a full power transmission mode indicated by information of the full power transmission mode of the user equipment.

In some embodiments, the user equipment determines the transmission power of the codebook-based PUSCH according to the full power transmission capability and the coherent transmission capability. Or, the user equipment determines the transmission power of the codebook-based PUSCH according to the full power transmission capability and the codebook subset restriction information. Or, the user equipment determines the transmission power of the codebook-based PUSCH according to the full power transmission capability and the full power transmission mode indicated by the information of the full power transmission mode of the user equipment. Or, the user equipment determines the transmission power of the codebook-based PUSCH according to the coherent transmission capability and the codebook subset restriction information. Or, the user equipment determines the transmission power of the codebook-based PUSCH according to the coherent transmission capability and the full power transmission mode indicated by the information of the full power transmission mode of the user equipment. Or, the user equipment determines the transmission power of the codebook-based PUSCH according to the codebook subset restriction information and the full power transmission mode indicated by the information of the full power transmission mode of the user equipment.

In some other embodiments, the user equipment determines the transmission power of the codebook-based PUSCH according to the full power transmission capability, the coherent transmission capability and the codebook subset restriction information. Or, the user equipment determines the transmission power of the codebook-based PUSCH according to the full power transmission capability, the coherent transmission capability and the full power transmission mode indicated by the information of the full power transmission mode of the user equipment. Or, the user equipment determines the transmission power of the codebook-based PUSCH according to the full power transmission capability, the codebook subset restriction information and the full power transmission mode indicated by the information of the full power transmission mode of the user equipment. Or, the user equipment determines the transmission power of the codebook-based PUSCH according to the coherent transmission capability, the codebook subset restriction information and the full power transmission mode indicated by the information of the full power transmission mode of the user equipment.

In another embodiment, the user equipment determines the transmission power of the codebook-based PUSCH according to the full power transmission capability, the coherent transmission capability, the codebook subset restriction information and the full power transmission mode indicated by the information of the full power transmission mode of the user equipment.

In S201, the user equipment reports the full power transmission capability to the base station. During specific implementation, the user equipment reports the full power transmission capability by at least one of the following modes.

Mode 1: the user equipment reports a codebook subset capability supported by the user equipment, and the codebook subset capability supported by the user equipment is configured to determine, by the base station, at least one of a PA capability of the user equipment, a full power transmission capability of an antenna port of the user equipment, whether the user equipment supports to use a precoding matrix exceeding the pusch-TransCoherence capability of the user equipment for PUSCH transmission, the codebook subset restriction information, or the full power transmission mode supported by the user equipment.

When the codebook subset capability supported by the user equipment is configured to determine, by the base station, whether the user equipment supports to use the precoding matrix exceeding the pusch-TransCoherence capability of the user equipment for PUSCH transmission, after the base station receives the codebook subset capability report, the codebook subset restriction exceeding the pusch-TransCoherence capability of the user equipment may be configured for the user equipment, otherwise, the codebook subset restriction exceeding the pusch-TransCoherence capability of the user equipment cannot be configured for the user equipment. Or, after the base station receives the codebook subset capability report, the codebook subset restriction information indicated for the user equipment represents codebook subset restriction 1 when the value is 1; and the codebook subset restriction information indicated for the user equipment represents codebook subset restriction 2 when the value is 2, and the codebook subset restriction 1 and the codebook subset restriction 2 may be the same or different, and corresponding DCI overheads may be the same or different as well.

Mode 2: the user equipment reports a third instruction, and the third instruction is configured to directly indicate whether the user equipment supports using the precoding matrix exceeding the pusch-TransCoherence capability of the user equipment for PUSCH transmission.

After the base station receives the third instruction, the codebook subset restriction exceeding the pusch-TransCoherence capability of the user equipment may be configured for the user equipment, otherwise, the codebook subset restriction exceeding the pusch-TransCoherence capability of the user equipment cannot be configured for the user equipment. Or, after the base station receives the codebook subset capability report, the codebook subset restriction information indicated for the user equipment represents codebook subset restriction 1 when the value is 1; and the codebook subset restriction information indicated for the user equipment represents codebook subset restriction 2 when the value is 2, and the codebook subset restriction 1 and the codebook subset restriction 2 may be the same or different, and the corresponding DCI overheads may be the same or different as well.

Mode 3: the user equipment reports PA information and/or antenna port information, and the PA information and/or the antenna port information are/is configured to determine the full power transmission capability of the user equipment.

In one embodiment, the user equipment reports the PA information; or the user equipment reports the antenna port information; or the user equipment reports the PA information and the antenna port information.

The PA information includes at least one of the following information: the quantity of PAs supporting the full power transmission of the user equipment; an identifier of the PA supporting the full power transmission of the user equipment; a sending combination of the PAs supporting the full power transmission of the user equipment; or fourth instruction. The identifier of the PAs may be identified in a number mode or in a bit number mode. For example, the number 1 is used to represent a first PA of the user equipment, or the bit number 0 is used to represent the first PA of the user equipment, which is not limited in the present disclosure.

The fourth instruction is configured to indicate that any PA of the user equipment can realize 1/M of the maximum power class transmission power of the user equipment, or indicate that a combination of any M PAs of the user equipment can realize the maximum power class transmission power of the user equipment, or indicate that a combination of all the PAs of the user equipment can realize the maximum power class transmission power of the user equipment, and M is a positive integer.

The antenna port information includes at least one of the following information: the quantity of antenna ports supporting the full power transmission of the user equipment; an identifier of the antenna ports supporting the full power transmission of the user equipment; a sending combination of the antenna ports supporting the full power transmission of the user equipment; or fifth instruction. The identifier of the antenna ports may be identified in a number mode or in a bit number mode. For example, the number 1 is used to represent a first antenna port of the user equipment, or the bit number 0 is used to represent the first antenna port of the user equipment, which is not limited in the present disclosure.

The fifth instruction is configured to indicate that any antenna port of the user equipment can realize 1/M of the maximum power class transmission power of the user equipment, or indicate that a combination of any M antenna ports of the user equipment can realize the maximum power class transmission power of the user equipment, or indicate that a combination of all the antenna ports of the user equipment can realize the maximum power class transmission power of the user equipment.

In one embodiment, the user equipment reports the antenna ports supporting the full power transmission of the user equipment in a bitmap mode.

Mode 4: the user equipment reports a precoding matrix set, and the precoding matrix set is configured to determine at least one of a PA capability of the user equipment, a full power transmission capability of the antenna port of the user equipment, whether the user equipment supports to use a precoding matrix exceeding the pusch-TransCoherence capability of the user equipment for PUSCH transmission, the codebook subset restriction information, or a precoding matrix of full power transmission of the user equipment.

In one embodiment, a combination of the antenna ports corresponding to non-zero elements contained by each precoding matrix in the precoding matrix set supports the full power transmission. For example, one precoding matrix in the precoding matrix set is [1 0 1 0], and it can be seen that the antenna ports corresponding to the non-zero elements in the precoding matrix are the first antenna port and a third antenna port respectively, and the first antenna port and the third antenna port support the full power transmission.

Further, positions of the corresponding non-zero elements of any two precoding matrixes in the precoding matrix set are different. In this case, the user equipment reports the precoding matrix set supporting the full power transmission of the user equipment to the base station, so that an overhead for reporting the full power transmission capability by the user equipment can be reduced. For example, the precoding matrix set reported by the user equipment may be {[1 1 1 1], [1 0 1 0], [0 1 0 1]}, and it can be seen that the positions of the corresponding non-zero element of any two precoding matrixes are different. But the precoding matrix set that cannot be reported is {[1 1 1 1], [1 0 1 0], [1 0 j 0]}, because the positions of the non-zero elements corresponding to the first and third antenna ports in [1 0 1 0] and [1 0 j 0] in the precoding matrix set are the same. After the base station receives the precoding matrix set reported by the user equipment, if the position of the non-zero element of one precoding matrix is the same as the position of the corresponding non-zero element of any precoding matrix in the precoding matrix set reported by the user equipment, the precoding matrix may be used for full power transmission. That is, if the base station instructs the user equipment to precode the codebook-based PUSCH by using the non-zero element with the position same as the corresponding non-zero element of any precoding matrix in the precoding matrix set reported by the user equipment, the transmission power of the PUSCH transmission is basic power. The basic power is PUSCH power (for example, in the NR system, the PUSCH transmission power $P_{PUSCH,b,f,c}(i, j, q_d, l)$ calculated by the terminal according to a formula in section 7.1.1 in 3GPP protocol TS 38.213-f40) calculated by the user equipment according to its maximum output power on an uplink carrier, parameters configured by the base station for the user equipment and configured to calculate the PUSCH transmission power, downlink path loss estimated by the user equipment, and the like.

Mode 5: the user equipment reports the first antenna port quantity, and the first antenna port quantity is configured to determine the full power transmission capability of the user equipment.

In some embodiments, the user equipment determines the transmission power of the codebook-based PUSCH through the following schemes: when the quantity of determined non-zero antenna ports included by the transmission precoding matrix of the codebook-based PUSCH is greater than the first antenna port quantity, a predefined scaling factor is used to scale the basic power of the codebook-based PUSCH, and the scaled PUSCH power is equally allocated to the PUSCH antenna port with non-zero power. The predefined scaling factor may be 1, and may certainly be other values, which is not limited in the present disclosure. The basic power is PUSCH power calculated by the user equipment according to its maximum output power on the uplink carrier, parameters configured by the base station for the user equipment and configured to calculate the PUSCH transmission power, downlink path loss estimated by the user equipment, and the like.

In some embodiments, the user equipment determines the transmission power of the codebook-based PUSCH through the following scheme: when the quantity of antenna ports included by a sounding reference signal (SRS) resource for determining the precoding matrix of the PUSCH is smaller than the first antenna port quantity, a predefined scaling factor is used to scale the basic power of the PUSCH, and the scaled power is equally allocated to the PUSCH antenna port with the non-zero power.

In one embodiment, the user equipment reports the first antenna port quantity, which means that full power transmission may be achieved when the antenna port quantity for sending the PUSCH is greater than or equal to the first antenna port quantity.

In one embodiment, the user equipment reports the first antenna port quantity, which means that full power transmission may be achieved when the antenna port quantity for sending the PUSCH is greater than the first antenna port quantity.

In one embodiment, the user equipment reports the first antenna port quantity, which means that all TPMI may achieve full power transmission when the quantity of the antenna ports contained in the SRS resource for determining the precoding matrix of the codebook-based PUSCH is not greater than the first antenna port quantity.

In one embodiment, the user equipment reports the first antenna port quantity, which means that all TPMI may achieve full power transmission when the quantity of the antenna ports contained in the SRS resource for determining the precoding matrix of the codebook-based PUSCH is smaller than the first antenna port quantity.

Mode 6: the user equipment directly reports sixth instruction, and the sixth instruction is configured to indicate that the full power transmission capability of the user equipment is one of the following: each PA of the user equipment supports full power transmission; each PA of the user equipment does not support the full power transmission, but the user equipment may achieve full power transmission; and partial PA of the user equipment supports the full power transmission.

Mode 7: the user equipment directly reports the precoding matrix supporting the full power transmission.

Mode 8: the user equipment reports the transmission power that each PA can reach. For example, the transmission power of each PA that can be reached reported by the user equipment is ½ of power class. If the power class of the user equipment is PC 3, the user equipment reports that the transmission power of each PA is 20 dBm.

Mode 9: the user equipment reports an uplink full power transmission mode supported by the user equipment.

In some embodiments, the user equipment may report the full power transmission capability for antenna port quantities respectively. For example, the user equipment supports the SRS resource with the maximum four antenna ports, and thus the user equipment reports the full power transmission capability corresponding to the four antenna ports for the four antenna ports, and reports the full power transmission capability corresponding to the two antenna ports for the two antenna ports.

In one embodiment, the full power transmission capability reported by the user equipment is only suitable for that the antenna port quantity is equal to the maximum antenna port quantity of the SRS resource corresponding to codebook-based uplink transmission supported by the user equipment.

In one embodiment, the full power transmission capability reported by the user equipment is suitable for all the SRS resources corresponding to the codebook-based uplink transmission.

In S201, the user equipment reports the coherent transmission capability to the base station. During specific implementation, a mode that the user equipment reports the coherent transmission capability includes at least one of the following modes.

Mode 1: the user equipment reports a seventh instruction to the base station, and the seventh instruction is configured to indicate that the coherent transmission capability of the user equipment is one of the following capabilities: fullcoherent, partialcoherent and noncoherent.

Mode 2: the user equipment reports an eighth instruction to the base station, and the eighth instruction is configured to indicate a set of the antenna ports supporting coherent transmission of the user equipment.

Mode 3: the user equipment reports codebook subset restrictions supported by the user equipment, and the codebook subset restrictions respectively correspond to the coherent transmission capability, the partialcoherent transmission capability and the noncoherent transmission capability. For example, in the 3GPP R15 specification of the NR system, the user equipment capability pusch-TransCoherence corresponds to the coherent transmission capability of the user equipment.

In S201, the user equipment reports the full power transmission capability and the coherent transmission capability to the base station. During specific implementation, the user equipment performs joint encoding on the full power transmission capability and the coherent transmission capability, uses the same capability information to simultaneously indicate the full power transmission capability and the coherent transmission capability, and reports the capability information to the base station. For example, the user equipment reports the supported precoding matrix set, the precoding matrix set is obtained after the user equipment jointly encodes the full power transmission capability and the coherent transmission capability, and the precoding matrix set implicitly indicates the full power transmission capability and the coherent transmission capability of the user equipment.

In S202, the first information includes codebook subset restriction information, and the codebook subset restriction information meets at least one of the following conditions.

Condition 1: at least one value of the codebook subset restriction information is configured to indicate codebook subset restriction different from 3GPP R15.

The base station may flexibly control whether the user equipment to perform full power transmission according to a channel situation of the user equipment. When it is determined that the user equipment performs full power transmission, the codebook subset restriction information is sent to the user equipment, so that the user equipment may determine the codebook subset of the codebook-based PUSCH according to the value of the codebook subset restriction information after receiving the codebook subset restriction information. For example, when the user equipment is in the cell edge, the base station instructs the UE to perform full power transmission, to achieve anti-interference by improving the transmission power. When the user equipment is in a cell center, the base station instructs the UE to perform non-full power transmission, to improve the transmission efficiency of the user equipment.

Table 1 and Table 2 exemplarily show codebook subset restrictions with single layer transmission of four antenna ports based on one DFT-S-OFDM waveform.

As shown in Table 1, when the value of the codebook subset restriction information is 1, precoding matrixes corresponding to the codebook subset restriction being nonCoherent are precoding matrixes corresponding to TPMI 0-3 in FIG. 1B, precoding matrixes corresponding to the codebook subset restriction being PartialAndNonCoherent are precoding matrixes corresponding to TPMI 0-11 in FIG. 1B, and precoding matrixes corresponding to the codebook subset restriction being fullyAndPartialAndNonCoherent are precoding matrixes corresponding to TPMI 0-27 in FIG. 1B. When the value of the codebook subset restriction information is 2, precoding matrixes corresponding to the codebook subset restriction being nonCoherent are precoding matrixes corresponding to TPMI 12 in FIG. 1B, precoding matrixes corresponding to the codebook subset restriction being PartialAndNonCoherent are precoding matrixes corresponding to TPMI 12-13 in FIG. 1B, and precoding matrixes corresponding to the codebook subset restriction being fullyAndPartialAndNonCoherent are precoding matrixes corresponding to TPMI 12-27 in FIG. 1B.

As shown in Table 2, when the value of the codebook subset restriction information is 1, precoding matrixes corresponding to the codebook subset restriction being nonCoherent are precoding matrixes corresponding to TPMI 0-3 in FIG. 1B, precoding matrix corresponding to the codebook subset restriction being PartialAndNonCoherent are precoding matrixes corresponding to TPMI 0-11 in FIG. 1B, and precoding matrixes corresponding to the codebook subset restriction being fullyAndPartialAndNonCoherent are precoding matrixes corresponding to TPMI 0-27 in FIG. 1B. When the value of the codebook subset restriction information is 2, precoding matrixes corresponding to the codebook subset restriction being nonCoherent are precoding matrixes corresponding to TPMI 0-3 and 12 in FIG. 1B, precoding matrixes corresponding to the codebook subset restriction being PartialAndNonCoherent are precoding matrixes corresponding to TPMI 0-13 in FIG. 1B, and precoding matrixes corresponding to the codebook subset restriction being fullyAndPartialAndNonCoherent are precoding matrixes corresponding to TPMI 0-27 in FIG. 1B.

TABLE 1

Codebook subset restriction with single layer transmission of four antenna ports

| Codebook subset restriction information | Codebook subset restriction codebooksubset | | |
|---|---|---|---|
| | nonCoherent | PartialAndNonCoherent | fullyAndPartialAndNonCoherent |
| 1 | TPMI 0-3 | TPMI 0-11 | TPMI 0-27 |
| 2 | TPMI 12 | TPMI 12-13 | TPMI 12-27 |

TABLE 2

Codebook subset restriction with single layer transmission of four antenna ports

| Codebook subset restriction information | Codebook subset restriction codebooksubset | | |
|---|---|---|---|
| | nonCoherent | PartialAndNonCoherent | fullyAndPartialAndNonCoherent |
| 1 | TPMI 0-3 | TPMI 0-11 | TPMI 0-27 |
| 2 | TPMI 0-3, 12 | TPMI 0-13 | TPMI 0-27 |

In one embodiment, all the values of the codebook subset restriction information are configured to indicate codebook subset restriction different from that in 3GPP R15 version.

In one embodiment, the codebook subset restriction information is an RRC signaling, or an MAC-CE signaling, or a DCI instruction.

Condition 2: the same value of the codebook subset restriction information represents the different codebook subset restrictions for the different coherent transmission capabilities.

During specific implementation, the user equipment receives the codebook subset restriction information sent by the base station, and the same value of the codebook subset restriction information represents the different codebook subset restrictions for the different user equipment capabilities (for example, the coherent transmission capability and/or PA capability, etc.). When the user equipment receives the codebook subset restriction information, the corresponding codebook subset restriction is determined according to the user equipment capabilities. In this way, the user equipment may determine the codebook subset according to the codebook subset restriction information and the user equipment capabilities. For example, the UE capability of nonCoherent corresponds to a codebook 1; the UE capability of partialNonCoherent corresponds to a codebook 2; and the UE capability of fullCoherent corresponds to a codebook 3. Two codebooks in the codebooks 1, 2 and 3 are the same. In this case, the base station indicates the different codebook subset restrictions for the user equipment with the different capabilities through the same codebook subset restriction information, to simply the design of the signaling, and reducing an overhead of the signaling.

Further, the codebook subset restriction information cannot appear simultaneously with the existing codebook subset restriction information, so that performance loss caused by inconsistent understanding of the user equipment and the base station for the codebook subset restrictions can be avoided.

Condition 3: the codebook subset restriction information at least includes fourth information and fifth information, and the fourth information is configured to indicate an identifier of the codebook subset, and the fifth information is configured to indicate a codebook subset actually corresponding to the fourth information.

Condition 4: the same value of the codebook subset restriction information corresponds to different codebook subsets under conditions that the user equipment receives a codebook subset restriction activation instruction and that the user equipment does not receive the codebook subset restriction activation instruction.

In an embodiment, the user equipment defaults the codebook subset corresponding to the value of the codebook subset restriction information being a first codebook set, and when the user equipment receives the codebook subset restriction activation instruction indicated by the base station, the user equipment determines a codebook subset corresponding to the value of the codebook subset restriction information as a second codebook set; and when the user equipment receives a codebook subset restriction deactivation instruction indicated by the base station, the user equipment determines a codebook subset corresponding to the value of the codebook subset restriction information as a first codebook set.

Table 3 exemplarily shows a codebook subset defaulted by the user equipment with single layer transmission of four antenna ports. As shown in Table 3, by default, the codebook subset restriction when the codebook subset restriction information is nonCoherent is TPMI 0-3 in FIG. 1B, the codebook subset restriction when the codebook subset restriction information is PartialAndNonCoherent is TPMI 0-11 in FIG. 1B, and the codebook subset restriction when the codebook subset restriction information is fullyAndPartialAndNonCoherent is TPMI 0-27 in FIG. 1B.

Table 4 exemplarily shows a codebook subset after the user equipment receives an activation instruction with single layer transmission of four antenna ports. As shown in Table 4, the user equipment receives the codebook subset restriction activation instruction, the codebook subset restriction when the codebook subset restriction information is nonCoherent is TPMI 12 in FIG. 1B, the codebook subset restriction when the codebook subset restriction information is PartialAndNonCoherent is TPMI 12-13 in FIG. 1B, and the codebook subset restriction when the codebook subset restriction information is fullyAndPartialAndNonCoherent is TPMI 12-27 in FIG. 1B.

Table 5 exemplarily shows a codebook subset after the user equipment receives a deactivation instruction with single layer transmission of four antenna ports. As shown in Table 5, the user equipment receives the codebook subset restriction deactivation instruction, the codebook subset restriction when the codebook subset restriction information is nonCoherent is TPMI 0-3 in FIG. 1B, the codebook subset restriction when the codebook subset restriction information is PartialAndNonCoherent is TPMI 0-11 in FIG. 1B, and the codebook subset restriction when the codebook subset restriction information is fullyAndPartialAndNonCoherent is TPMI 0-27 in FIG. 1B.

TABLE 3

Codebook set defaulted by user equipment with single layer transmission of four antenna ports
Codebook subset restriction information codebooksubset

| nonCoherent | PartialAndNonCoherent | fullyAndPartialAndNonCoherent |
|---|---|---|
| TPMI 0-3 | TPMI 0-11 | TPMI 0-27 |

TABLE 4

Codebook subset after user equipment receives activation instruction with single layer transmission of four antenna ports
codebooksubset

| nonCoherent | PartialAndNonCoherent | fullyAndPartialAndNonCoherent |
|---|---|---|
| TPMI 12 | TPMI 12-13 | TPMI 12-27 |

TABLE 5

Codebook subset after user equipment receives deactivation instruction with single layer transmission of four antenna ports
codebooksubset

| nonCoherent | PartialAndNonCoherent | fullyAndPartialAndNonCoherent |
|---|---|---|
| TPMI 0-3 | TPMI 0-11 | TPMI 0-27 |

In some embodiments, the user equipment determines a codebook corresponding to the PUSCH based on first capability information reported by the user equipment.

In one embodiment, if the user equipment reports second capability information, a codebook corresponding to PUSCH transmission is a codebook different from that in R15 specification; and if the user equipment does not have the second capability information, the codebook corresponding to PUSCH transmission is determined by adopting an existing mode. The second capability information is one piece of capability information in the first capability information.

In one embodiment, if the user equipment reports the second capability information, the codebook corresponding to PUSCH transmission is determined by adopting the existing mode, that is, the codebook is determined according to the codebook subset restriction information indicated by the base station; and if the user equipment reports third capability information, the codebook corresponding to PUSCH transmission is a codebook different from that in R15 specification. The second capability information and the third capability information are two pieces of capability information in the first capability information.

In some other embodiments, the above first capability information may be combined with the codebook subset restriction information for use. In one embodiment, when the user equipment reports the second capability information, the user equipment determines that the codebook corresponding to the PUSCH is a first codebook according to the codebook subset restriction determined from the codebook subset restriction information and the second capability information; and when the user equipment reports the third capability information, the user equipment determines that the codebook corresponding to the PUSCH is a second codebook according to the codebook subset restriction determined from the codebook subset restriction information and the third capability information, and the second capability information and the third capability information are the two pieces of capability information in the first capability information, and the first codebook and the second codebook are the two codebooks different from the codebook subset restriction in R15 specification.

In some other embodiments, the above first capability information may be combined with the codebook subset restriction information for use. When the user equipment reports the second capability information, the user equipment determines that the codebook corresponding to the PUSCH is the first codebook according to the codebook subset restriction information determined from the codebook subset restriction information and the second capability information; and when the user equipment reports other capability information except for the second capability information in the first capability information, the user equipment determines that the codebook corresponding to the PUSCH is the second codebook according to the codebook subset restriction determined from the codebook subset restriction information and other capability information except for the second capability information in the first capability information, and the second capability information is one capability information in the first capability information, and the first codebook and the second codebook are the two codebooks different from codebook subset restriction in R15 specification.

In one embodiment, a mode that the user equipment reports the full power transmission capability includes reporting, by the user equipment, PA information and/or antenna port information. The PA information includes the quantity of PAs supporting the full power transmission of the user equipment, and the antenna port information includes the quantity of antenna ports supporting the full power transmission of the user equipment.

In one embodiment, the codebook subset of the codebook-based PUSCH includes one or more precoding matrixes, and each precoding matrix meets the following conditions: the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports, and N is the quantity of the PAs supporting the full power transmission of the user equipment, or N is the quantity of the antenna ports supporting the full power transmission of the user equipment. The antenna ports with the non-zero power refer to antenna ports corresponding to non-zero elements.

In one embodiment, the codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of antenna ports with non-zero power for at least one layer non-zeroexceeds the coherent transmission capability of the user equipment; and when the quantity of the antenna ports with the non-zero power is smaller than the quantity of the antenna ports contained in the SRS resource for determining the precoding matrix of the codebook-based PUSCH, and N=1, the antenna port with the non-zero power is the first antenna port, when N=2, the antenna ports with the non-zero power are the first antenna port and third antenna port, and when N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with the non-zero power exceeds the coherent transmission capability of the user equipment; and when the quantity of the antenna ports with the non-zero power is smaller than the quantity of the antenna ports contained in the SRS resource for determining the precoding matrix of the codebook-based PUSCH, and N=1, the antenna port with the non-zero power is the first antenna port, when N=2, the antenna ports with the non-zero power are second antenna port and fourth antenna port, and when N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the transmission power of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number. When the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being first antenna ports is 1 or a predefined positive number, if N=2, a power control scaling factor of PUSCH corresponding to the precoding matrix with the antenna ports with the non-zero power not containing antenna ports other than the first antenna port and third antenna port is 1 or a predefined positive number, and if N=3, a power control scaling factor of PUSCH corresponding to the precoding matrix with the antenna ports with the non-zero power not containing antenna ports other than the first three antenna ports is 1 or a predefined positive number. When the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna port with the non-zero power not being the first antenna port is X/I, if N=2, a power control scaling factor of PUSCH corresponding to the precoding matrix with the antenna ports with the non-zero power not being the first antenna port and the third antenna port is X/I, and if N=3, a power control scaling factor of PUSCH corresponding to the precoding matrix with the at least one antenna port with the non-zero power not being the first three antenna ports is X/I, and N is the quantity of PAs supporting the full power transmission of the user equipment, or N is the quantity of the antenna ports supporting the full power transmission of the user equipment, X is the quantity of the antenna ports with the non-zero power in the precoding matrix, and I is the quantity of the antenna ports contained in the SRS resource for determining the precoding matrix of the codebook-based PUSCH.

In one embodiment, a mode that the user equipment reports the full power transmission capability includes reporting, by the user equipment, PA information and/or antenna port information. The PA information includes fourth instruction, and the antenna port information includes fifth instruction.

In one embodiment, the codebook subset of the codebook-based PUSCH includes one or more precoding matrixes, and each precoding matrix meets at least one of the following conditions: a combination of any layer of antenna ports with the non-zero power does not exceed the coherent transmission capability of the user equipment; the quantity of the antenna ports with the non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M, and M is a positive number.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with the non-zero power exceeds the coherent transmission capability of the user equipment, and the quantity of the antenna ports with the non-zero power is equal to the quantity of the antenna ports contained in the SRS resource for determining the precoding matrix of the codebook-based PUSCH; or the combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M, and M is a positive number.

In one embodiment, the transmission power of PUSCH corresponding to each precoding matrix in the codebook subset of the codebook-based PUSCH meets the following condition: a power control scaling factor of PUSCH corresponding to the precoding matrix with the antenna ports with the non-zero power is a minimum value between (MX)/I and 1, and X is the quantity of the antenna ports with the non-zero power in the precoding matrix, and I is the quantity of the antenna ports contained in the SRS resource for determining the precoding matrix of the codebook-based PUSCH.

In one embodiment, a mode that the user equipment reports the full power transmission capability includes reporting, by the user equipment, a precoding matrix set. Any two precoding matrixes in the precoding matrix set meet the following conditions: at least one layer of ports with the non-zero power in any two precoding matrixes are different; or the non-zero power ports in any two precoding matrixes are the same, but the transmission layer quantities of any two precoding matrixes are different.

In one embodiment, a mode that the user equipment reports the full power transmission capability includes reporting, by the user equipment, a precoding matrix set; and any two precoding matrixes in the precoding matrix set meet the following condition: antenna ports with the non-zero power in any two precoding matrixes are different.

In one embodiment, a mode that the user equipment reports the full power transmission capability includes reporting, by the user equipment, a precoding matrix set. The codebook subset of the codebook-based PUSCH includes one or more precoding matrixes, and each precoding matrix meets the following condition: each precoding matrix belongs to precoding matrixes in the precoding matrix set reported by the user equipment.

In one embodiment, a mode that the user equipment reports the full power transmission capability includes reporting, by the user equipment, a precoding matrix set. The codebook subset of the codebook-based PUSCH includes one or more precoding matrixes, and each precoding matrix meets the following conditions: non-zero ports of any precoding matrix are the same as non-zero ports of at least one precoding matrix in the precoding matrix set reported by the user equipment; and the non-zero power ports and the transmission layer quantities of the at least two precoding matrixes are the same, and relative phases between the non-zero antenna ports corresponding to the at least two precoding matrixes are different.

In one embodiment, a mode that the user equipment reports the full power transmission capability includes reporting, by the user equipment, a precoding matrix set. The codebook subset of the codebook-based PUSCH determined by the user equipment includes one or more precoding matrixes, and each precoding matrix meets the following conditions: a combination of any layer of antenna ports with non-zero power does not exceed the coherent transmission capability of the user equipment; or a combination of at least one layer of antenna ports with the non-zero power exceeds the coherent transmission capability of the user equipment, and non-zero ports contained in the combination of at least one layer of the antenna ports with the non-zero power are the same as non-zero ports contained by at least one precoding matrix in the precoding matrix set reported by the user equipment.

In one embodiment, a mode that the user equipment reports the full power transmission capability includes reporting, by the user equipment, a precoding matrix set. The codebook subset of the codebook-based PUSCH is a full set or subset of a set composed of the precoding matrixes meeting any one of following conditions: a codeword does not exceed the coherent transmission capability of the user equipment; or the contained non-zero antenna ports are the same as non-zero antenna ports corresponding to one precoding matrix in the precoding matrix set reported by the user equipment.

In one embodiment, the same precoding matrix set reported by the user equipment corresponds to the different codebook subsets of the codebook-based PUSCH based on the different coherent transmission capabilities.

In one embodiment, the full power transmission capability that the user equipment supports full power transmission, but at least one PA does not support the full power transmission, and the coherent transmission capability is supporting noncoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource for determining codebook-based PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, and the non-zero power ports of any two precoding matrixes are the same, but the transmission layer quantities of any two precoding matrixes are different.

In one embodiment, the full power transmission capability is that the user equipment supports full power transmission, but at least one PA does not support the full power transmission, and the coherent transmission capability is supporting partialcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, and the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, and the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability is that the user equipment supports full power transmission, but at least one PA does not support the full power transmission, and the coherent transmission capability is supporting fullcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource for determining codebook-based PUSCH transmission, and the at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, and the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, and the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability that the user equipment supports full power transmission, but at least one PA does not support the full power transmission, and the coherent transmission capability is supporting noncoherent transmission. The codebook subset of the codebook-based PUSCH includes a codebook subset composed of noncoherent transmission codewords and a first precoding set, and precoding matrixes in the first precoding set meet the following conditions: the quantity of the antenna ports with the non-zero power of any precoding matrix is equal to the quantity of the antenna ports included in an SRS resource for determining codebook-based PUSCH transmission, and at least one corresponding layer of the non-zero power ports in any two precoding matrixes are different; or the quantity of the antenna ports with the non-zero power of any precoding matrix is equal to the quantity of the antenna ports included by the SRS resource for determining codebook-based PUSCH transmission, and the non-zero power ports of any two precoding matrixes are the same, but the transmission layer quantities of any two precoding matrixes are different.

In one embodiment, the full power transmission capability that the user equipment supports full power transmission, but at least one PA does not support the full power transmission, and the coherent transmission capability is supporting partialcoherent transmission. The codebook subset of the codebook-based PUSCH includes a codebook subset composed of noncoherent transmission codewords, a codebook subset composed of partialcoherent transmission codewords, and a second precoding set, and a precoding matrix of the second precoding set meets the following conditions: the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, and the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, and the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability that the user equipment supports full power transmission, but at least one PA does not support the full power transmission, and the coherent transmission capability is supporting partialcoherent transmission. The codebook subset of the codebook-based PUSCH includes a codebook subset composed of noncoherent transmission codewords, a codebook subset composed of partialcoherent transmission codewords, and a first precoding set, and precoding matrixes of the first precoding set meet the following condition: the quantity of the antenna ports with the non-zero power of any precoding matrix is equal to the quantity of the antenna ports included in an SRS resource for determining codebook-based PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, and the non-zero power ports of any two precoding matrixes are the same, but the transmission layer quantities of any two precoding matrixes are different.

Embodiment of the present disclosure further provides an uplink scheduling information determining method applied to a base station side. The method may realize full power transmission of user equipment with a low DCI overhead.

Figure 3:
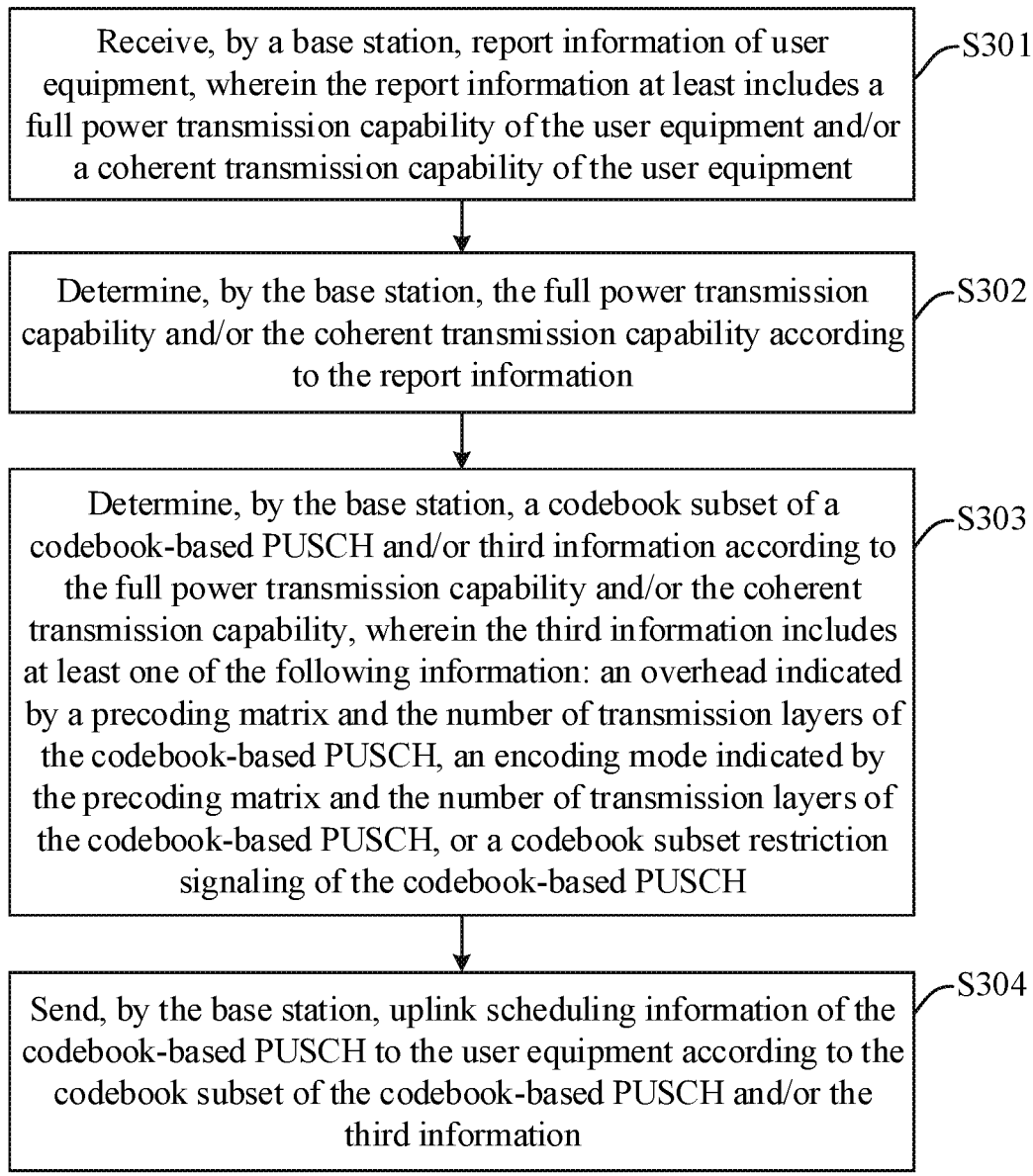
FIG. 3 is a schematic flow diagram of an uplink scheduling information determining method provided by an embodiment of the present disclosure.

FIG. 3 shows a schematic flow diagram of an uplink scheduling information determining method provided by an embodiment of the present disclosure.

As shown in the figure, the flow includes followings.

S301: a base station receives report information of the user equipment, and the report information at least includes a full power transmission capability of the user equipment and/or a coherent transmission capability of the user equipment.

In one embodiment, the report information at least include: the full power transmission capability of the user equipment, the coherent transmission capability of the user equipment, or the full power transmission capability of the user equipment and the coherent transmission capability of the user equipment.

In some embodiments, after the base station receives the report information of the user equipment, the base station further sends codebook subset restriction information to the user equipment. The codebook subset restriction information is configured to determine, by the user equipment, a codebook subset of a codebook-based PUSCH; or the codebook subset restriction information is configured to determine, by the user equipment, second information; or the codebook subset restriction information is configured to determine, by the user equipment, the codebook subset of the codebook-based PUSCH and the second information. The second information includes one of the following information: an overhead of the indication of precoding information and number of layers of the codebook-based PUSCH; an encoding mechanism of the indication of precoding information and number of layers of the codebook-based PUSCH; or the overhead of the indication of precoding information and number of layers of the codebook-based PUSCH, and the encoding mechanism of the indication of precoding information and number of layers of the codebook-based PUSCH.

During specific implementation, the base station sends the codebook subset restriction information to a user, and the codebook subset restriction information meets at least one of the following conditions.

Condition 1: at least one value of the codebook subset restriction information is configured to indicate codebook subset restriction different from that in 3GPP R15 specification.

The base station may flexibly control whether the user equipment to perform full power transmission according to a channel situation of the user equipment. When it is determined that the user equipment performs full power transmission, the codebook subset restriction information is sent to the user equipment, so that the user equipment may determine the codebook subset of the codebook-based PUSCH according to the value of the codebook subset restriction information after receiving the codebook subset restriction information. For example, when the user equipment is in a cell edge, the base station indicates full power transmission of the user equipment, to achieve anti-interference by improving the transmission power. When the user equipment is in a cell center, the base station indicates non-full power transmission of the user equipment, to improve the transmission efficiency of the user equipment.

In one embodiment, all the values of the codebook subset restriction information are configured to indicate codebook subset restriction different from that in 3GPP R15 specification.

In one embodiment, the codebook subset restriction information is an RRC signaling, or an MAC-CE signaling, or a DCI instruction.

Condition 2: the same value of the codebook subset restriction information represents the different codebook subset restrictions for the different coherent transmission capabilities.

During specific implementation, the base station sends the codebook subset restriction information to the user equipment, and the same value of the codebook subset restriction information represents the different codebook subset restrictions for the different user equipment capabilities (for example, the coherent transmission capability and/or PA capability, etc.). When the user equipment receives the codebook subset restriction information, the corresponding codebook subset restriction is determined according to the user equipment capabilities. In this way, the user equipment may determine the codebook subset according to the codebook subset restriction information and the user equipment capabilities. For example, the UE capability of nonCoherent corresponds to codebook 1; the UE capability of partial-NonCoherent corresponds to codebook 2; and the UE capability of fullCoherent corresponds to a codebook 3. Two codebooks in the codebooks 1, 2 and 3 are the same. In this case, the base station indicates the different codebook subset restrictions for the user equipment with the different capabilities through the same codebook subset restriction information, to simply the design of the signaling, and reducing an overhead of the signaling.

Further, the codebook subset restriction information cannot appear simultaneously with the existing codebook subset restriction information, so that performance loss caused by inconsistent understanding of the user equipment and the base station for the codebook subset restrictions can be avoided.

Condition 3: the codebook subset restriction information at least includes fourth information and fifth information. The fourth information is configured to indicate an identifier of the codebook subset, and the fifth information is configured to indicate a codebook subset actually corresponding to the fourth information.

Condition 4: the same value of the codebook subset restriction information corresponds to different codebook subsets under conditions that the user equipment receives a codebook subset restriction activation instruction and that the user equipment does not receive the codebook subset restriction activation instruction.

In an embodiment, the user equipment defaults the codebook subset corresponding to the value of the codebook subset restriction information being a first codebook set, and when the base station indicates the codebook subset restriction activation instruction indicated to the user equipment, the user equipment determines a codebook subset corresponding to the value of the codebook subset restriction information as a second codebook set; and when the base station indicates a codebook subset restriction deactivation instruction to the user equipment, the user equipment determines a codebook subset corresponding to the value of the codebook subset restriction information as a first codebook set.

In some embodiments, the base station further receives first capability information sent by the user equipment, and determines a codebook corresponding to the PUSCH based on the first capability information.

In one embodiment, if the base station receives second capability information, a codebook corresponding to PUSCH transmission is a codebook different from that in R15 version; and if the base station does not receive the second capability information, the codebook corresponding to PUSCH transmission is determined by adopting an existing mode. The second capability information is one piece of capability information in the first capability information.

In one embodiment, if the base station receives the second capability information, the codebook corresponding to PUSCH transmission is determined by adopting the existing mode, that is, the codebook is determined according to the codebook subset restriction information indicated by the base station; and if the base station receives third capability information, the codebook corresponding to PUSCH transmission is a codebook different from that in 3GPP R15 specification. The second capability information and the third capability information are two pieces of capability information in the first capability information.

In some other embodiments, the above first capability information may be combined with the codebook subset restriction information for use. In one embodiment, when the base station receives the second capability information, the base station determines that the codebook corresponding to the PUSCH is a first codebook according to the codebook subset restriction determined from the codebook subset restriction information and the second capability information; and when the base station receives the third capability information, the base station determines that the codebook corresponding to the PUSCH is a second codebook according to the codebook subset restriction determined from the codebook subset restriction information and the third capability information, and the second capability information and the third capability information are the two pieces of capability information in the first capability information, and the first codebook and the second codebook are the two codebooks different from the codebook subset restriction in 3GPP R15 specification.

In some other embodiments, the above first capability information may be combined with the codebook subset restriction information for use. When the base station receives the second capability information, the base station determines that the codebook corresponding to the PUSCH is the first codebook according to the codebook subset restriction determined from the codebook subset restriction information and the second capability information; and when the base station receives other capability information except for the second capability information in the first capability information, the base station determines that the codebook corresponding to the PUSCH is the second codebook according to the codebook subset restriction determined from the codebook subset restriction information and other capability information except for the second capability information in the first capability information, and the second capability information is one capability information in the first capability information, and the first codebook and the second codebook are the two codebooks different from the codebook subset restriction in 3GPP R15 specification.

S302: the base station determines the full power transmission capability and/or the coherent transmission capability according to the report information.

In one embodiment, when the report information includes the full power transmission capability, the base station determines the full power transmission capability according to the report information; or when the report information includes the coherent transmission capability, the base station determines the coherent transmission capability according to the report information; or when the report information includes the full power transmission capability and the coherent transmission capability, the base station determines the full power transmission capability and the coherent transmission capability according to the report information.

In some embodiments, before and after the base station determines the full power transmission capability and/or the coherent transmission capability according to the report information, the base station further sends first instruction to the user equipment, and the first instruction includes one of the following information: instruction for instructing the user equipment whether or not to perform full power transmission; instruction for indicating a full power transmission mode of the user equipment; or the instruction for instructing the user equipment whether or not to perform full power transmission and the instruction for indicating the full power transmission mode of the user equipment.

In some embodiments, when the first instruction indicates full power transmission of the user equipment, the base station determines a maximum number of transmission layers of the codebook-based PUSCH, and the maximum number of transmission layers of the codebook-based PUSCH is not greater than S, and S is a positive integer. Further, the maximum number of transmission layers of the codebook-based PUSCH is not greater than a minimum value among S, R and P, and R is a maximum layer quantity limit indicated by the base station, and P is a maximum layer quantity limit supported by the user equipment.

S is a numerical value agreed by a protocol; or S is an implicit numerical value; or S is equal to 1; or S is equal to 2; or the base station and the user equipment determine the value of S according to the full power transmission capability and/or the coherent transmission capability; or the base station sends instruction for indicating the value of S to the user equipment.

When the first instruction is used for instructing the user equipment to perform full power transmission, the user equipment performs full power transmission no matter what precoding matrix is indicated by the base station to the user equipment.

When the base station indicates the codebook subset to the user equipment and the codebook subset corresponds to full power transmission of the user equipment, the user equipment performs full power transmission no matter what precoding matrix is indicated by the base station to the user equipment.

In some embodiments, after the base station determines the full power transmission capability and/or the coherent transmission capability according to the report information, the base station further sends second instruction to the user equipment, and the second instruction is configured to instruct the user equipment to determine second information according to the full power transmission capability; or instruct the user equipment to determine the second information according to the coherent transmission capability; or instruct the user equipment to determine the second information according to the full power transmission capability and the coherent transmission capability.

In one embodiment, different coherent transmission capabilities correspond to overheads and/or encoding modes indicated by different precoding matrixes and transmission layer quantities, and different terminal full power transmission capabilities correspond to the overhead and/or encoding mode indicated by the same precoding matrix and number of transmission layers under the same terminal coherent transmission capability.

In one embodiment, the different terminal full power transmission capabilities correspond to the overheads and/or encoding modes indicated by different precoding matrixes and transmission layer quantities, and the different terminal coherent transmission capabilities correspond to the overhead and/or encoding mode indicated by the same precoding matrix and number of transmission layers under the same terminal full power transmission capability.

In one embodiment, the different terminal full power transmission capabilities correspond to the overheads and/or encoding modes indicated by the different precoding matrixes and transmission layer quantities, and the different terminal coherent transmission capabilities also correspond to the overheads and/or encoding modes indicated by the different precoding matrixes and transmission layer quantities under the same terminal full power transmission capability.

S303: the base station determines a codebook subset of the codebook-based PUSCH and/or third information according to the full power transmission capability and/or the coherent transmission capability.

In one embodiment, the base station determines the codebook subset of the codebook-based PUSCH according to the full power transmission capability; or the base station determines the third information according to the full power transmission capability; or the base station determines the codebook subset of the codebook-based PUSCH and the third information according to the full power transmission capability; or the base station determines the codebook subset of the codebook-based PUSCH according to the coherent transmission capability; or the base station determines the third information according to the coherent transmission capability; or the base station determines the codebook subset of the codebook-based PUSCH and the third information according to the coherent transmission capability; or the base station determines the codebook subset of the codebook-based PUSCH according to the full power transmission capability and the coherent transmission capability; or the base station determines the third information according to the full power transmission capability and the coherent transmission capability; or the base station determines the codebook subset of the codebook-based PUSCH and the third information according to the full power transmission capability and the coherent transmission capability.

The third information includes at least one of the following information: an overhead indicated by the precoding matrix and the number of transmission layers of the codebook-based PUSCH, an encoding mode indicated by the precoding matrix and the number of transmission layers of the codebook-based PUSCH, or codebook subset restriction information of the codebook-based PUSCH.

S304: the base station sends uplink scheduling information of the codebook-based PUSCH to the user equipment according to the codebook subset of the codebook-based PUSCH and/or the third information.

In one embodiment, the base station sends the uplink scheduling information of the codebook-based PUSCH to the user equipment according to the codebook subset of the codebook-based PUSCH; or the base station sends the uplink scheduling information of the codebook-based PUSCH to the user equipment according to the third information; or the base station sends the uplink scheduling information of the codebook-based PUSCH to the user equipment according to the codebook subset of the codebook-based PUSCH and the third information.

In some embodiments, the base station determines reference power or reference amplitude corresponding to a precoding matrix in the codebook subset of the codebook-based PUSCH according to the full power transmission capability; or the base station determines the reference power or reference amplitude corresponding to the precoding matrix in the codebook subset of the codebook-based PUSCH according to the coherent transmission capability; or the base station determines the reference power or reference amplitude corresponding to the precoding matrix in the codebook subset of the codebook-based PUSCH according to the full power transmission capability and the coherent transmission capability.

The reference power corresponding to one precoding matrix is power of the precoding matrix when determining the precoding matrix in the uplink scheduling information of the codebook-based PUSCH; or the reference power corresponding to one precoding matrix is power of the precoding matrix when determining the number of layers (i.e., the number of transmission layers) in the uplink scheduling information of the codebook-based PUSCH; or the reference power corresponding to one precoding matrix is power of the precoding matrix when determining an MCS class in the uplink scheduling information of the codebook-based PUSCH; or the reference power corresponding to one precoding matrix is power of the precoding matrix when determining the precoding matrix and the number of transmission layers in the uplink scheduling information of the codebook-based PUSCH; or the reference power corresponding to one precoding matrix is power of the precoding matrix when determining the precoding matrix and the MCS class in the uplink scheduling information of the codebook-based PUSCH; or the reference power corresponding to one precoding matrix is power of the precoding matrix when determining the number of transmission layers and the MCS class in the uplink scheduling information of the codebook-based PUSCH; or the reference power corresponding to one precoding matrix is power of the precoding matrix when determining the precoding matrix, the number of transmission layers and the MCS class in the uplink scheduling information of the codebook-based PUSCH.

In one embodiment, the reference power corresponding to one precoding matrix is power of the precoding matrix when the precoding matrix is utilized to detect the codebook-based PUSCH.

The reference amplitude corresponding to one precoding matrix is an amplitude coefficient of the precoding matrix when determining the precoding matrix in the uplink scheduling information of the codebook-based PUSCH; or the reference amplitude corresponding to one precoding matrix is an amplitude coefficient of the precoding matrix when determining the number of layers in the uplink scheduling information of the codebook-based PUSCH; or the reference amplitude corresponding to one precoding matrix is an amplitude coefficient of the precoding matrix when determining an MCS class in the uplink scheduling information of the codebook-based PUSCH; or the reference amplitude corresponding to one precoding matrix is an amplitude coefficient of the precoding matrix when determining the precoding matrix and the number of transmission layers in the uplink scheduling information of the codebook-based PUSCH; or the reference amplitude corresponding to one precoding matrix is an amplitude coefficient of the precoding matrix when determining the precoding matrix and the MCS class in the uplink scheduling information of the codebook-based PUSCH; or the reference amplitude corresponding to one precoding matrix is an amplitude coefficient of the precoding matrix when determining the number of transmission layers and the MCS class in the uplink scheduling information of the codebook-based PUSCH; or the reference amplitude corresponding to one precoding matrix is an amplitude coefficient of the precoding matrix when determining the precoding matrix, the number of transmission layers and the MCS class in the uplink scheduling information of the codebook-based PUSCH.

In one embodiment, the reference amplitude corresponding to one precoding matrix is an amplitude coefficient of the precoding matrix when the precoding matrix is utilized to detect the codebook-based PUSCH.

In S301, the base station receives the report information of the user equipment, and when the report information includes the full power transmission capability of the user equipment, the base station receives the report information according to at least one of the following modes.

Mode 1: the base station receives a codebook subset capability sent by the user equipment, and determines at least one of a PA capability of the user equipment, a full power transmission capability of an antenna port of the user equipment, whether the user equipment supports to use a precoding matrix exceeding the pusch-TransCoherence capability of the user equipment for PUSCH transmission, or the codebook subset restriction information according to the codebook subset capability.

When the codebook subset capability is configured to determine whether the user equipment supports to use the precoding matrix exceeding the pusch-TransCoherence capability of the user equipment for PUSCH transmission, after the base station receives the codebook subset capability, the codebook subset restriction exceeding the pusch-TransCoherence capability of the user equipment may be configured for the user equipment, otherwise, the codebook subset restriction exceeding the pusch-TransCoherence capability of the user equipment cannot be configured for the user equipment. Or, after the base station receives the codebook subset capability, the codebook subset restriction information indicated for the user equipment represents codebook subset restriction 1 when the value is 1; and the codebook subset restriction information indicated for the user equipment represents codebook subset restriction 2 when the value is 2, and the codebook subset restriction 1 and the codebook subset restriction 2 may be the same or different, and the corresponding DCI overheads may be the same or different as well.

Mode 2: the base station receives the third instruction, the third instruction is configured to directly indicate whether the user equipment supports to use the precoding matrix exceeding the pusch-TransCoherence capability of the user equipment for PUSCH transmission, and the base station determines whether the user equipment supports to use the precoding matrix exceeding the pusch-TransCoherence capability of the user equipment for PUSCH transmission according to the third instruction.

After the base station receives the third instruction, the codebook subset restriction exceeding the pusch-TransCoherence capability of the user equipment may be configured for the user equipment, otherwise, the codebook subset restriction exceeding the pusch-TransCoherence capability of the user equipment cannot be configured for the user equipment. Or, after the base station receives the codebook subset capability, the codebook subset restriction information indicated for the user equipment represents codebook subset restriction 1 when the value is 1; and the codebook subset restriction information indicated for the user equipment represents codebook subset restriction 2 when the value is 2, and the codebook subset restriction 1 and the codebook subset restriction 2 may be the same or different, and the corresponding DCI overheads may be the same or different as well.

Mode 3: the base station receives PA information and/or antenna port information sent by the user equipment, and determines the full power transmission capability of the user equipment according to the PA information and/or the antenna port information.

In one embodiment, the base station receives the PA information sent by the user equipment, and determines the full power transmission capability of the user equipment according to the PA information; or the base station receives the antenna port information, and determines the full power transmission capability of the user equipment according to the antenna port information; or the base station receives the PA information and the antenna port information sent by the user equipment, and determines the full power transmission capability of the user equipment according to the PA information and the antenna port information.

The PA information includes at least one of the following information: the quantity of PAs supporting the full power transmission of the user equipment; an identifier of the PAs supporting the full power transmission of the user equipment; a sending combination of the PAs supporting the full power transmission of the user equipment; or fourth instruction.

The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment, and M is a positive integer.

The antenna port information includes at least one of the following information: the quantity of antenna ports supporting the full power transmission of the user equipment; an identifier of the antenna ports supporting the full power transmission of the user equipment; a sending combination of the antenna ports supporting the full power transmission of the user equipment; or fifth instruction.

The fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment.

In one embodiment, the base station receives the antenna ports, sent by the user equipment, supporting the full power transmission of the user equipment in a bitmap mode.

Mode 4: the base station receives a precoding matrix set, the precoding matrix set is configured to determine at least one of a PA capability of the user equipment, a full power transmission capability of the antenna port of the user equipment, whether the user equipment supports to use a precoding matrix exceeding the pusch-TransCoherence capability of the user equipment for PUSCH transmission, the codebook subset restriction information, or a precoding matrix of full power transmission of the user equipment, and the base station determines at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information, or the precoding matrix of full power transmission of the user equipment according to the precoding matrix set.

In one embodiment, a combination of the antenna ports corresponding to non-zero elements contained by each precoding matrix in the precoding matrix set supports the full power transmission.

Further, positions of the non-zero elements corresponding to any two precoding matrixes in the precoding matrix set are different. After the base station receives the precoding matrix set reported by the user equipment, if the position of the non-zero element is the same as the position of the non-zero element corresponding to any precoding matrix, any precoding matrix supports full power transmission.

Mode 5: the base station receives the first antenna port quantity, and determines the full power transmission capability of the user equipment according to the first antenna port quantity.

In some embodiments, after the base station receives the first antenna port quantity, the base station determines the reference power or amplitude of the codebook-based PUSCH through the following modes: when the quantity of non-zero antenna ports included by one precoding matrix is greater than the first antenna port quantity and one precoding matrix is utilized to measure or detect the codebook-based PUSCH, the reference power corresponding to one precoding matrix is scaled by using a predefined scaling factor; or when the quantity of the non-zero antenna ports included by one precoding matrix is greater than the first antenna port quantity and one precoding matrix is utilized to measure or detect the codebook-based PUSCH, the amplitude corresponding to one precoding matrix is scaled by using the predefined scaling factor.

In some other embodiments, after the base station receives the first antenna port quantity, the base station determines the reference power or amplitude of the codebook-based PUSCH through the following modes: when the quantity of antenna ports included by one sounding reference signal (SRS) resource is smaller than the first antenna port quantity and an SRS on the SRS resource is utilized to calculate a signal to noise ratio corresponding to one precoding matrix, the reference power corresponding to one precoding matrix is scaled by using a predefined scaling factor; or when the quantity of the antenna ports included by one SRS resource is smaller than the first antenna port quantity and the SRS on the SRS resource is utilized to calculate the signal to noise ratio corresponding to one precoding matrix, the amplitude corresponding to one precoding matrix is scaled by using the predefined scaling factor.

In one embodiment, the base station receives the first antenna port quantity, which means that full power transmission may be achieved when the antenna port quantity for sending the PUSCH is greater than or equal to the first antenna port quantity.

In one embodiment, the base station receives the first antenna port quantity, which means that full power transmission may be achieved when the antenna port quantity for sending the PUSCH is greater than the first antenna port quantity.

In one embodiment, the base station receives the first antenna port quantity, which means that all TPMI may achieve full power transmission when the quantity of the antenna ports contained in the SRS resource for determining the precoding matrix of the codebook-based PUSCH is not greater than the first antenna port quantity.

In one embodiment, the base station receives the first antenna port quantity, which means that all TPMI may achieve full power transmission when the quantity of the antenna ports contained in the SRS resource for determining the precoding matrix of the codebook-based PUSCH is smaller than the first antenna port quantity.

Mode 6: the base station receives sixth instruction sent by the user equipment, and the sixth instruction is configured to indicate that the full power transmission capability of the user equipment is one of the following capabilities: each PA of the user equipment supports full power transmission; each PA of the user equipment does not support the full power transmission, but the user equipment may achieve full power transmission; and partial PA of the user equipment supports the full power transmission.

Mode 7: the base station receives the precoding matrix, directly sent by the user equipment, supporting the full power transmission of the user equipment.

Mode 8: the base station receives transmission power that can be reached when the user equipment sends each PA. For example, the transmission power of each PA that can be reached reported by the user equipment is ½ of power class. If the power class of the user equipment is PC 3, the base station receives that the transmission power of each PA of the user equipment is 20 dBm.

Mode 9: the user equipment reports an uplink full power transmission mode supported by the user equipment.

In some embodiments, the base station receives the full power transmission capabilities respectively sent by the user equipment for antenna port quantities. For example, the user equipment supports the SRS resource with the maximum four antenna ports, and thus the user equipment reports the full power transmission capability corresponding to the four antenna ports for the four antenna ports, and the base station receives the full power transmission capability corresponding to the four antenna ports; and the user equipment reports the full power transmission capability corresponding to the two antenna ports for the two antenna ports, and the base station receives the full power transmission capability corresponding to the two antenna ports.

In S301, the base station receives the report information of the user equipment, and when the report information includes the coherent transmission capability of the user equipment, the base station receives the report information according to at least one of the following modes.

Mode 1: the base station receives a seventh instruction sent by the user equipment, and the seventh instruction is configured to indicate that the coherent transmission capability of the user equipment is one of the following capabilities: fullcoherent, partialcoherent and noncoherent.

Mode 2: the base station receives an eighth instruction sent by the user equipment, and the eighth instruction is configured to indicate a set of the antenna ports supporting coherent transmission of the user equipment.

Mode 3: the base station receives codebook subset restrictions sent by the user equipment and supported by the user equipment, and the codebook subset restrictions respectively correspond to the coherent transmission capability, the partialcoherent transmission capability and the noncoherent transmission capability. For example, in a 3GPP R15 specification of the NR system, the user equipment capability pusch-TransCoherence corresponds to the coherent transmission capability of the user equipment.

In S301, the base station receives the report information of the user equipment, when the report information include the full power transmission capability of the user equipment and the coherent transmission capability of the user equipment, the base station receives capability information obtained by jointly encoding the full power transmission capability and the coherent transmission capability by the user equipment, and the capability information simultaneously indicates the full power transmission capability and the coherent transmission capability. For example, the base station receives a precoding matrix set sent by the user equipment, the precoding matrix set is obtained after the user equipment jointly encodes the full power transmission capability and the coherent transmission capability, and the precoding matrix set implicitly indicates the full power transmission capability and the coherent transmission capability of the user equipment.

In one embodiment, before the base station sends the uplink scheduling information of the codebook-based PUSCH to the user equipment according to the codebook subset of the codebook-based PUSCH and/or the third information, the method further includes: the base station sends codebook subset restriction information of the codebook-based PUSCH to the user equipment, the codebook subset restriction information of the codebook-based PUSCH is configured to determine, by the user equipment, the codebook subset of the codebook-based PUSCH and/or second information, and the second information includes an overhead of the indication of precoding information and number of layers of the codebook-based PUSCH, and/or an encoding mechanism of the indication of precoding information and number of layers of the codebook-based PUSCH; and the second information includes one of the following information: the overhead of the indication of precoding information and number of layers of the codebook-based PUSCH; the encoding mechanism of the indication of precoding information and number of layers of the codebook-based PUSCH; or the overhead of the indication of precoding information and number of layers of the codebook-based PUSCH, and the encoding mechanism of the indication of precoding information and number of layers of the codebook-based PUSCH.

In one embodiment, the codebook subset restriction information of the codebook-based PUSCH meets at least one of the follows: at least one value of the codebook subset restriction information of the codebook-based PUSCH is configured to indicate the codebook subset restriction different from that in 3GPP R15 specification; the same value of the codebook subset restriction information of the codebook-based PUSCH represents the different codebook subset restrictions for the different coherent transmission capabilities; the codebook subset restriction information of the codebook-based PUSCH at least includes fourth information and fifth information, and the fourth information is configured to indicate an identifier of the codebook subset, and the fifth information is configured to indicate a codebook subset actually corresponding to the fourth information; and the same value of the codebook subset restriction information of the codebook-based PUSCH corresponds to different codebook subsets under the conditions that the user equipment receives a codebook subset restriction activation instruction and the user equipment does not receive the codebook subset restriction activation instruction.

In one embodiment, before the base station sends the uplink scheduling information of the codebook-based PUSCH to the user equipment according to the codebook subset of the codebook-based PUSCH and/or the third information, the method further includes: the base station sends the first instruction to the user equipment, and the first instruction includes instruction for instructing the user equipment whether or not to perform full power transmission and/or instruction for indicating a full power transmission mode of the user equipment.

In one embodiment, the method further includes: the base station determines reference power or reference amplitude corresponding to the precoding matrix in the codebook subset of the codebook-based PUSCH according to the full power transmission capability; or the base station determines the reference power or reference amplitude corresponding to the precoding matrix in the codebook subset of the codebook-based PUSCH according to the coherent transmission capability; or the base station determines the reference power or reference amplitude corresponding to the precoding matrix in the codebook subset of the codebook-based PUSCH according to the full power transmission capability and the coherent transmission capability.

In one embodiment, the method further includes: the base station sends second instruction to the user equipment, and the second instruction is configured to indicate that the user equipment determines second information according to the full power transmission capability and/or the coherent transmission capability. The second information includes an overhead of the indication of precoding information and number of layers of the codebook-based PUSCH, and/or an encoding mechanism of the indication of precoding information and number of layers of the codebook-based PUSCH.

In one embodiment, when the first instruction indicates full power transmission of the user equipment, the method further includes: the base station determines a maximum number of transmission layers of the codebook-based PUSCH, and the maximum number of transmission layers of the codebook-based PUSCH is not greater than S, or not greater than a minimum value among S, R and P, and S is a positive integer, R is a maximum layer quantity limit indicated by the base station, and P is a maximum layer quantity limit supported by the user equipment. The base station determines the codebook subset of the codebook-based PUSCH and/or the third information according to the maximum number of transmission layers of the codebook-based PUSCH.

In one embodiment, when the report information includes the full power transmission capability of the user equipment, the base station receives the report information according to at least one of the following modes: the base station receives a codebook subset capability sent by the user equipment, and the base station determines at least one of a power amplifier (PA) capability of the user equipment, a full power transmission capability of an antenna port of the user equipment, whether the user equipment supports to use a precoding matrix exceeding the pusch-TransCoherence capability of the user equipment for PUSCH transmission, or the codebook subset restriction information of the codebook-based PUSCH according to the codebook subset capability; the base station receives third instruction, the third instruction is configured to indicate whether the user equipment supports to use the precoding matrix exceeding the pusch-TransCoherence capability of the user equipment for PUSCH transmission, and the base station determines whether the user equipment supports to use the precoding matrix exceeding the pusch-TransCoherence capability of the user equipment for PUSCH transmission according to the third instruction; the base station receives PA information and/or antenna port information sent by the user equipment, and the base station determines the full power transmission capability of the user equipment according to the PA information and/or the antenna port information; the base station receives an uplink full power transmission mode supported by the user equipment and sent by the user equipment; the base station receives a precoding matrix set, the precoding matrix set is configured to determine at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment, and the base station determines at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment according to the precoding matrix set; and the base station receives the first antenna port quantity, and the base station determines the full power transmission capability of the user equipment according to the first antenna port quantity.

In one embodiment, the PA information includes at least one of the following information: the quantity of PAs supporting the full power transmission of the user equipment, an identifier of the PAs supporting the full power transmission of the user equipment, a sending combination of the PAs supporting the full power transmission of the user equipment, or fourth instruction. The antenna port information includes at least one of the following information: the quantity of antenna ports supporting the full power transmission of the user equipment, an identifier of the antenna ports supporting the full power transmission of the user equipment, a sending combination of the antenna ports supporting the full power transmission of the user equipment, or fifth instruction. The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment; and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, a combination of the antenna ports corresponding to non-zero elements contained by each precoding matrix in the precoding matrix set supports the full power transmission.

In one embodiment, the base station receives the first antenna port quantity, and the method further includes: the base station determines the reference power or reference amplitude of the codebook-based PUSCH through the following mode: when the quantity of non-zero antenna ports included by one precoding matrix is greater than the first antenna port quantity and one precoding matrix is utilized to measure or detect the codebook-based PUSCH, the reference power or amplitude corresponding to one precoding matrix is scaled by using a predefined scaling factor.

In one embodiment, the base station receives the first antenna port quantity, and the method further includes: the base station determines the reference power or reference amplitude of the codebook-based PUSCH through the following modes: when the quantity of antenna ports included by one sounding reference signal (SRS) resource is smaller than the first antenna port quantity and an SRS on the SRS resource is utilized to calculate a signal to noise ratio corresponding to one precoding matrix, the reference power or amplitude corresponding to the precoding matrix is scaled by using a predefined scaling factor.

In one embodiment, the method further includes: the base station receives the full power transmission capabilities respectively sent by the user equipment for antenna port quantities; and the base station determines the full power transmission capabilities of antenna port quantities according to the full power transmission capabilities respectively sent by the user equipment for antenna port quantities.

In one embodiment, a mode that the base station receives the full power transmission capability includes receiving, by the base station, PA information and/or antenna port information. The PA information includes the quantity of PAs supporting the full power transmission of the user equipment, and the antenna port information includes the quantity of antenna ports supporting the full power transmission of the user equipment.

In one embodiment, the codebook subset of the codebook-based PUSCH includes one or more precoding matrixes, and each precoding matrix meets the following conditions: the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with the non-zero power exceeds the coherent transmission capability of the user equipment; and when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are the first antenna port and third antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with the non-zero power exceeds the coherent transmission capability of the user equipment; and when the quantity of the antenna ports with the non-zero power is smaller than the quantity of the antenna ports contained in the SRS resource for determining the precoding matrix of the codebook-based PUSCH, if N=1, the antenna ports with the non-zero power are the first antenna ports, if N=2, the antenna ports with the non-zero power are second antenna port and fourth antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the reference power or reference amplitude of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being the first antenna ports is 1 or a predefined positive number, if N=2, a power control scaling factor of PUSCH corresponding to the precoding matrix with the antenna ports with the non-zero power containing at least one of the first antenna port or third antenna port is 1 or a predefined positive number, and if N=3, a power control scaling factor of PUSCH corresponding to the precoding matrix with the antenna ports with the non-zero power containing at least one of the first three antenna ports is 1 or a predefined positive number; and when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power not being the first antenna port is X/I, if N=2, a power control scaling factor of PUSCH corresponding to the precoding matrix with the at least one antenna port with the non-zero power being the antenna ports other than the first antenna port and the third antenna port is X/I, and if N=3, a power control scaling factor of PUSCH corresponding to the precoding matrix with the at least one antenna port with the non-zero power being the antenna port other than the first three antenna ports is X/I, and N is the quantity of PAs supporting the full power transmission of the user equipment, or N is the quantity of the antenna ports supporting the full power transmission of the user equipment, X is the quantity of the antenna ports with the non-zero power in the precoding matrix, and I is the quantity of the antenna ports contained in the SRS resource for determining the precoding matrix of the codebook-based PUSCH.

In one embodiment, a mode that the base station receives the full power transmission capability includes receiving, by the base station, PA information and/or antenna port information, the PA information includes fourth instruction, and the antenna port information includes fifth instruction. The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment; and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, the codebook subset of the codebook-based PUSCH includes one or more precoding matrixes, and each precoding matrix meets at least one of the following conditions: not exceeding the coherent transmission capability of the user equipment; the quantity of the antenna ports with the non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH includes one or more precoding matrixes, and each precoding matrix meets at least one of the following conditions: a combination of any layer of antenna ports with the non-zero power does not exceed the coherent transmission capability of the user equipment; the quantity of the antenna ports with the non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M, and M is a positive number.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with the non-zero power exceeds the coherent transmission capability of the user equipment, and the quantity of the antenna ports with the non-zero power is equal to the quantity of the antenna ports contained in the SRS resource for determining the precoding matrix of the codebook-based PUSCH; or the combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M, and M is a positive number.

In one embodiment, the reference power or reference amplitude of PUSCH corresponding to each precoding matrix in the codebook subset of the codebook-based PUSCH meets the following condition: a power control scaling factor of PUSCH corresponding to the precoding matrix with the antenna ports with the non-zero power is a minimum value between (MX)/I and 1, and X is the quantity of the antenna ports with the non-zero power in the precoding matrix, I is the quantity of the antenna ports contained in the SRS resource for determining the precoding matrix of the codebook-based PUSCH, and M is a positive number.

In one embodiment, a mode that the base station receives the full power transmission capability includes receiving, by the base station, a precoding matrix set. Any two precoding matrixes in the precoding matrix set meet the following conditions: at least one layer of antenna ports with the non-zero power in any two precoding matrixes are different; or the antenna ports with the non-zero power in any two precoding matrixes are the same, but the transmission layer quantities of any two precoding matrixes are different.

In one embodiment, a mode that the base station receives the full power transmission capability includes receiving, by the base station, a precoding matrix set; and any two precoding matrixes in the precoding matrix set meet the following condition: antenna ports with the non-zero power in any two precoding matrixes are different.

In one embodiment, a mode that the base station receives the full power transmission capability includes receiving, by the base station, a precoding matrix set. The codebook subset of the codebook-based PUSCH includes one or more precoding matrixes, and each precoding matrix meets the following condition: each precoding matrix belongs to precoding matrixes in the precoding matrix set reported by the user equipment.

In one embodiment, a mode that the base station receives the full power transmission capability includes receiving, by the base station, a precoding matrix set.

The codebook subset of the codebook-based PUSCH includes one or more precoding matrixes, and each precoding matrix meets the following conditions: non-zero ports of any precoding matrix are the same as non-zero ports of at least one precoding matrix in the precoding matrix set reported by the user equipment; and the non-zero power ports and the transmission layer quantities of the at least two precoding matrixes are the same, and relative phases between the non-zero antenna ports corresponding to the at least two precoding matrixes are different.

In one embodiment, a mode that the base station receives the full power transmission capability includes receiving, by the base station, a precoding matrix set.

The codebook subset of the codebook-based PUSCH includes one or more precoding matrixes, and each precoding matrix meets the following conditions: a combination of any layer of antenna ports with non-zero power does not exceed the coherent transmission capability of the user equipment; or a combination of at least one layer of antenna ports with the non-zero power exceeds the coherent transmission capability of the user equipment, and the non-zero ports are the same as non-zero ports contained by at least one precoding matrix in the precoding matrix set sent by the user equipment.

In one embodiment, a mode that the base station receives the full power transmission capability includes receiving, by the base station, a precoding matrix set. The codebook subset of the codebook-based PUSCH is a full set or subset of a set composed of the precoding matrixes meeting any one of following conditions: not exceeding the coherent transmission capability of the user equipment; or the contained non-zero antenna ports are the same as non-zero antenna ports corresponding to one precoding matrix in the precoding matrix set sent by the user equipment.

In one embodiment, a mode that the base station receives the full power transmission capability includes receiving, by the base station, the same precoding matrix set; and
the determining, by the base station, the codebook subset of the codebook-based PUSCH according to the coherent transmission capability, includes: the base station determines the different codebook subsets of the codebook-based PUSCH corresponding to the same precoding matrix set according to the different coherent transmission capabilities.

In one embodiment, the full power transmission capability includes the user equipment supporting full power transmission but at least one PA not supporting the full power transmission, and the coherent transmission capability is supporting noncoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The precoding matrixes in the codebook subset of the codebook-based PUSCH meet the following conditions:

the quantity of the antenna ports with the non-zero power of any precoding matrix is equal to the quantity of the antenna ports included in an SRS resource obtained by CSI for determining the codebook-based PUSCH, and at least one layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting fullcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource obtained by CSI for determining the codebook-based PUSCH, and the at least one layer of the non-zero power ports in any two precoding matrixes are different; or the quantity of the antenna ports with the non-zero power of any precoding matrix is equal to the quantity of the antenna ports included in the SRS resource obtained by CSI for determining codebook-based PUSCH transmission, and the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting noncoherent transmission. The codebook subset includes a codebook subset composed of noncoherent transmission codebooks and a first precoding set, precoding matrixes in the first precoding set meet the following conditions: the quantity of the antenna ports with the non-zero power of any precoding matrix is equal to the quantity of the antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a second precoding set, and a precoding matrix of the second precoding set meets the following conditions: the quantity of the antenna ports with the non-zero power of any precoding matrix is equal to the quantity of the antenna ports included in an SRS resource obtained by CSI for determining the codebook-based PUSCH, and at least one layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a first precoding set, and precoding matrix of the first precoding set meet the following conditions: the quantity of the antenna ports with the non-zero power of any precoding matrix is equal to the quantity of the antenna ports included in the SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, and the non-zero power ports of any two precoding matrixes are the same, but the transmission layer quantities of any two precoding matrixes are different.

Flows related to FIGS. 2 and 3 are illustrated below in detail.

Embodiment 1

User equipment reports the quantity of PAs supporting full power transmission of the user equipment and/or the quantity of antenna ports supporting full power transmission of the user equipment to a base station. The user equipment (or base station) determines a codebook subset of a codebook-based PUSCH based on the quantity of the PAs supporting full power transmission of the user equipment and/or the quantity of the antenna ports supporting full power transmission of the user equipment.

In one embodiment, the user equipment may determine the codebook subset of the codebook-based PUSCH according to codebook subset restriction information indicated by the base station.

In some embodiments, the determined codebook subset of the codebook-based PUSCH includes one or more precoding matrixes, and each precoding matrix meets the following conditions: the quantity of antenna ports with non-zero power is equal to the quantity of antenna ports contained in an SRS resource for determining a precoding matrix of the codebook-based PUSCH; or the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports, and N is the quantity of the PAs supporting the full power transmission of the user equipment, or N is the quantity of the antenna ports supporting the full power transmission of the user equipment.

In one embodiment, when the determined codebook subset of the codebook-based PUSCH is not related to a coherent transmission capability of the user equipment, the user equipment (or base station) determines that codebook subset restriction corresponding to full power transmission of the user equipment is as shown below.

When the number of transmission layers of two antenna ports is 1, and N=1, the precoding matrixes contained in the codebook subset restriction are precoding matrixes corresponding to TPMI index 2-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 1-2 in FIG. 1D and $$\frac{1}{\sqrt{2}} \begin{bmatrix} 1 & 1 \\ 0 & 0 \end{bmatrix}.$$

When the number of transmission layers of four antenna ports is 1, and N=1, the precoding matrixes contained in the codebook subset restriction are precoding matrix corresponding to TPMI index 12-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 12-27 in FIG. 1B or FIG. 1C and $$\frac{1}{\sqrt{2}} \begin{bmatrix} 1 \\ 1 \\ 0 \\ 0 \end{bmatrix},$$

and when N=3, the precoding matrixes contained in the codebook subset restriction are precoding matrixes corresponding to TPMI index 12-27 in FIG. 1B or FIG. 1C and $$\frac{1}{\sqrt{3}} \begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 14-21 in FIG. 1E and $$\frac{1}{\sqrt{2}} \begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 14-21 in FIG. 1E and $$\frac{1}{2} \begin{bmatrix} 1 & 1 \\ 1 & 1 \\ 0 & 0 \\ 0 & 0 \end{bmatrix},$$

and when N=3, the precoding matrixes contained in the codebook subset restriction are precoding matrixes corresponding to TPMI index 14-21 in FIG. 1E and $$\frac{1}{\sqrt{6}} \begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 3-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 3-6 in FIG. 1F and $$\frac{1}{\sqrt{6}}\begin{bmatrix} 1 & 1 & 1 \\ 1 & 1 & 1 \\ 0 & 0 & 0 \\ 0 & 0 & 0 \end{bmatrix},$$

and when N=3, the precoding matrixes contained in the codebook subset restriction are precoding matrixes corresponding to TPMI index 3-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 3-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 3-4 in FIG. 1G and $$\frac{1}{2\sqrt{2}}\begin{bmatrix} 1 & 1 & 1 & 1 \\ 1 & 1 & 1 & 1 \\ 0 & 0 & 0 & 0 \\ 0 & 0 & 0 & 0 \end{bmatrix},$$

and when N=3, the precoding matrixes contained in the codebook subset restriction are precoding matrixes corresponding to TPMI index 3-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some embodiments, the determined codebook subset of the codebook-based PUSCH includes one or more precoding matrixes, and each precoding matrix meets the following conditions: the quantity of antenna ports with non-zero power is equal to the quantity of antenna ports contained in an SRS resource for determining a precoding matrix of the codebook-based PUSCH; or when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are the first antenna port and a third antenna port, and if N=3, the antenna ports with the non-zero power are the first three antenna ports.

In one embodiment, when the determined codebook subset of the codebook-based PUSCH is not related to the coherent transmission capability of the user equipment, the user equipment (or base station) determines that the codebook subset restriction corresponding to full power transmission of the user equipment is as shown below.

When the number of transmission layers of two antenna ports is 1, and N=1, the precoding matrixes contained in the codebook subset restriction are precoding matrixes corresponding to TPMI index 2-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 1-2 in FIG. 1D and $$\frac{1}{\sqrt{2}}\begin{bmatrix} 1 & 1 \\ 0 & 0 \end{bmatrix}.$$

When the number of transmission layers of four antenna ports is 1, and N=1, the precoding matrixes contained in the codebook subset restriction are precoding matrixes corresponding to TPMI index 12-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 12-27 in FIG. 1B or FIG. 1C and $$\frac{1}{\sqrt{2}}\begin{bmatrix} 1 \\ 0 \\ 1 \\ 0 \end{bmatrix},$$

and when N=3, the precoding matrixes contained in the codebook subset restriction are precoding matrixes corresponding to TPMI index 12-27 in FIG. 1B or FIG. 1C and $$\frac{1}{\sqrt{3}}\begin{bmatrix}1\\1\\1\\0\end{bmatrix}.$$

When the number of transmission layers of four antenna ports is 2, and N=1, the precoding matrixes contained in the codebook subset restriction are precoding matrixes corresponding to TPMI index 14-21 in FIG. 1E and $$\frac{1}{\sqrt{2}}\begin{bmatrix}1 & 1\\0 & 0\\0 & 0\\0 & 0\end{bmatrix},$$

when N=2, the precoding matrixes contained in the codebook subset restriction are precoding matrixes corresponding to TPMI index 14-21 in FIG. 1E and $$\frac{1}{2}\begin{bmatrix}1 & 1\\0 & 0\\1 & 1\\0 & 0\end{bmatrix},$$

and when N=3, the precoding matrixes contained in the codebook subset restriction are precoding matrixes corresponding to TPMI index 14-21 in FIG. 1E and $$\frac{1}{\sqrt{6}}\begin{bmatrix}1 & 1\\1 & 1\\1 & 1\\0 & 0\end{bmatrix}.$$

When the number of transmission layers of four antenna ports is 3, and N=1, the precoding matrixes contained in the codebook subset restriction are precoding matrixes corresponding to TPMI index 3-6 in FIG. 1F and $$\frac{1}{\sqrt{3}}\begin{bmatrix}1 & 1 & 1\\0 & 0 & 0\\0 & 0 & 0\\0 & 0 & 0\end{bmatrix},$$

when N=2, the precoding matrixes contained in the codebook subset restriction are precoding matrixes corresponding to TPMI index 3-6 in FIG. 1F and $$\frac{1}{\sqrt{6}}\begin{bmatrix}1 & 1 & 1\\0 & 0 & 0\\1 & 1 & 1\\0 & 0 & 0\end{bmatrix},$$

and when N=3, the precoding matrixes contained in the codebook subset restriction are precoding matrixes corresponding to TPMI index 3-6 in FIG. 1F and $$\frac{1}{3}\begin{bmatrix}1 & 1 & 1\\1 & 1 & 1\\1 & 1 & 1\\0 & 0 & 0\end{bmatrix}.$$

When the number of transmission layers of four antenna ports is 4, and N=1, the precoding matrixes contained in the codebook subset restriction are precoding matrixes corresponding to TPMI index 3-4 in FIG. 1G and $$\frac{1}{2}\begin{bmatrix}1 & 1 & 1 & 1\\0 & 0 & 0 & 0\\0 & 0 & 0 & 0\\0 & 0 & 0 & 0\end{bmatrix},$$

when N=2, the precoding matrixes contained in the codebook subset restriction are precoding matrixes corresponding to TPMI index 3-4 in FIG. 1G and $$\frac{1}{2\sqrt{2}}\begin{bmatrix}1 & 1 & 1 & 1\\0 & 0 & 0 & 0\\1 & 1 & 1 & 1\\0 & 0 & 0 & 0\end{bmatrix},$$

and when N=3, the precoding matrixes contained in the codebook subset restriction are precoding matrixes corresponding to TPMI index 3-4 in FIG. 1G and $$\frac{1}{2\sqrt{3}}\begin{bmatrix}1 & 1 & 1 & 1\\1 & 1 & 1 & 1\\1 & 1 & 1 & 1\\0 & 0 & 0 & 0\end{bmatrix}.$$

In some embodiments, the determined codebook subset of the codebook-based PUSCH includes one or more precoding matrixes, and each precoding matrix meets the following conditions: the quantity of the antenna ports with the non-zero power is equal to the quantity of the antenna ports contained in the SRS resource for determining the precoding matrix of the codebook-based PUSCH; or when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a second antenna port and a fourth antenna port, and if N=3, the antenna ports with the non-zero power are the first three antenna ports.

In one embodiment, when the determined codebook subset of the codebook-based PUSCH is not related to the coherent transmission capability of the user equipment, the user equipment (or base station) determines that the codebook subset restriction corresponding to full power transmission of the user equipment is as shown below.

When the number of transmission layers of two antenna ports is 1, and N=1, the precoding matrixes contained in the codebook subset restriction are precoding matrixes corresponding to TPMI index 2-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 1-2 in FIG. 1D and $$\frac{1}{\sqrt{2}}\begin{bmatrix} 1 & 1 \\ 0 & 0 \end{bmatrix}.$$

When the number of transmission layers of four antenna ports is 1, and N=1, the precoding matrixes contained in the codebook subset restriction are precoding matrixes corresponding to TPMI index 12-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 12-27 in FIG. 1B or FIG. 1C and $$\frac{1}{\sqrt{2}}\begin{bmatrix} 0 \\ 1 \\ 0 \\ 1 \end{bmatrix},$$

and when N=3, the precoding matrixes contained in the codebook subset restriction are precoding matrixes corresponding to TPMI index 12-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 14-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 14-21 in FIG. 1E and $$\frac{1}{2}\begin{bmatrix} 0 & 0 \\ 1 & 1 \\ 0 & 0 \\ 1 & 1 \end{bmatrix},$$

and when N=3, the precoding matrixes contained in the codebook subset restriction are precoding matrixes corresponding to TPMI index 14-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 3-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 3-6 in FIG. 1F and $$\frac{1}{\sqrt{6}}\begin{bmatrix} 0 & 0 & 0 \\ 1 & 1 & 1 \\ 0 & 0 & 0 \\ 1 & 1 & 1 \end{bmatrix},$$

and when N=3, the precoding matrixes contained in the codebook subset restriction are precoding matrixes corresponding to TPMI index 3-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 3-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 3-4 in FIG. 1G and $$\frac{1}{2\sqrt{2}}\begin{bmatrix} 0 & 0 & 0 & 0 \\ 1 & 1 & 1 & 1 \\ 0 & 0 & 0 & 0 \\ 1 & 1 & 1 & 1 \end{bmatrix},$$

and when N=3, the precoding matrixes contained in the codebook subset restriction are precoding matrixes corresponding to TPMI index 3-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some other embodiments, the determined codebook subset of the codebook-based PUSCH includes one or more precoding matrixes, and each precoding matrix meets the following conditions: a combination of any layer of antenna ports with the non-zero power does not exceed the coherent transmission capability of the user equipment; or the quantity of the antenna ports with the non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports.

In one embodiment, when the determined codebook subset of the codebook-based PUSCH is related to the coherent transmission capability of the user equipment, the user equipment (or base station) determines that the codebook subset restriction corresponding to full power transmission of the user equipment is as shown below.

Case 1: the user equipment has two antenna ports, and the coherent transmission capability of the user equipment is noncoherent and fullcoherent.

When the number of transmission layers of two antenna ports is 1, and N=1, the precoding matrixes contained in the codebook subset restriction are precoding matrixes corresponding to TPMI index 0-5 in FIG. 1A and $$\begin{bmatrix} 1 \\ 0 \end{bmatrix}.$$

When the number of transmission layers of two antenna ports is 2, N=2, the precoding matrixes contained in the codebook subset restriction are precoding matrixes corresponding to TPMI index 0-2 in FIG. 1D and $$\frac{1}{\sqrt{2}}\begin{bmatrix} 1 & 1 \\ 0 & 0 \end{bmatrix}.$$

Case 2: the user equipment has four antenna ports, and the coherent transmission capability of the user equipment is noncoherent.

When the number of transmission layers of four antenna ports is 1, and N=1, the precoding matrixes contained in the codebook subset restriction are precoding matrixes corresponding to TPMI index 0-3 and 12-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-3 and 12-27 in FIG. 1B or FIG. 1C and $$\frac{1}{\sqrt{2}}\begin{bmatrix} 1 \\ 1 \\ 0 \\ 0 \end{bmatrix},$$

and when N=3, the precoding matrixes contained in the codebook subset restriction are precoding matrixes corresponding to TPMI index 0-3 and 12-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 0-5 and 14-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 0-5 and 14-21 in FIG. 1E and $$\frac{1}{2}\begin{bmatrix} 1 & 1 \\ 1 & 1 \\ 0 & 0 \\ 0 & 0 \end{bmatrix},$$

and when N=3, the precoding matrixes contained in the codebook subset restriction are precoding matrixes corresponding to TPMI index 0-5 and 14-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0 and 3-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0 and 3-6 in FIG. 1F and $$\frac{1}{\sqrt{6}}\begin{bmatrix} 1 & 1 & 1 \\ 1 & 1 & 1 \\ 0 & 0 & 0 \\ 0 & 0 & 0 \end{bmatrix},$$

and when N=3, the precoding matrixes contained in the codebook subset restriction are precoding matrixes corresponding to TPMI index 0 and 3-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0 and 3-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0 and 3-4 in FIG. 1G and $$\frac{1}{2\sqrt{2}}\begin{bmatrix} 1 & 1 & 1 & 1 \\ 1 & 1 & 1 & 1 \\ 0 & 0 & 0 & 0 \\ 0 & 0 & 0 & 0 \end{bmatrix},$$

and when N=3, the precoding matrixes contained in the codebook subset restriction are precoding matrixes corresponding to TPMI index 0 and 3-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

Case 3: the user equipment has four antenna ports, and the coherent transmission capability of the user equipment is partialcoherent and fullcoherent.

When the number of transmission layers of four antenna ports is 1, and N=1, the precoding matrixes contained in the codebook subset restriction are precoding matrixes corresponding to TPMI index 0-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-27 in FIG. 1B or FIG. 1C and $$\frac{1}{\sqrt{2}}\begin{bmatrix} 1 \\ 1 \\ 0 \\ 0 \end{bmatrix},$$

and when N=3, the precoding matrixes contained in the codebook subset restriction are precoding matrixes corresponding to TPMI index 0-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 0-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 0-21 in FIG. 1E and $$\frac{1}{2}\begin{bmatrix} 1 & 1 \\ 1 & 1 \\ 0 & 0 \\ 0 & 0 \end{bmatrix},$$

and when N=3, the precoding matrixes contained in the codebook subset restriction are precoding matrixes corresponding to TPMI index 0-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0-6 in FIG. 1F and $$\frac{1}{\sqrt{6}}\begin{bmatrix} 1 & 1 & 1 \\ 1 & 1 & 1 \\ 0 & 0 & 0 \\ 0 & 0 & 0 \end{bmatrix},$$

and when N=3, the precoding matrixes contained in the codebook subset restriction are precoding matrixes corresponding to TPMI index 0-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0-4 in FIG. 1G and $$\frac{1}{2\sqrt{2}}\begin{bmatrix} 1 & 1 & 1 & 1 \\ 1 & 1 & 1 & 1 \\ 0 & 0 & 0 & 0 \\ 0 & 0 & 0 & 0 \end{bmatrix},$$

and when N=3, the precoding matrixes contained in the codebook subset restriction are precoding matrixes corresponding to TPMI index 0-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some other embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; or, the quantity of the antenna ports with the non-zero power is equal to the quantity of antenna ports contained in an SRS resource for determining a precoding matrix of the codebook-based PUSCH; or when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are the first antenna port and a third antenna port, and if N=3, the antenna ports with the non-zero power are the first three antenna ports.

In one embodiment, when the determined codebook subset of the codebook-based PUSCH is related to the coherent transmission capability of the user equipment, the user equipment (or base station) determines that the codebook subset restriction corresponding to full power transmission of the user equipment is as shown below.

Case 1: the user equipment has two antenna ports, and the coherent transmission capability of the user equipment is noncoherent and fullcoherent.

When the number of transmission layers of two antenna ports is 1, and N=1, the precoding matrixes contained in the codebook subset restriction are precoding matrixes corresponding to TPMI index 0-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 0-2 in FIG. 1D and $$\frac{1}{\sqrt{2}}\begin{bmatrix} 1 & 1 \\ 0 & 0 \end{bmatrix}.$$

Case 2: the user equipment is four antenna ports, and the coherent transmission capability of the user equipment is noncoherent.

When the number of transmission layers of four antenna ports is 1, and N=1, the precoding matrixes contained in the codebook subset restriction are precoding matrixes corresponding to TPMI index 0-3 and 12-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-3 and 12-27 in FIG. 1B or FIG. 1C and $$\frac{1}{\sqrt{2}}\begin{bmatrix}1\\0\\1\\0\end{bmatrix},$$

and when N=3, the precoding matrixes contained in the codebook subset restriction are precoding matrixes corresponding to TPMI index 0-3 and 12-27 in FIG. 1B or FIG. 1C and $$\frac{1}{\sqrt{3}}\begin{bmatrix}1\\1\\1\\0\end{bmatrix}.$$

When the number of transmission layers of four antenna ports is 2, and N=1, the precoding matrixes contained in the codebook subset restriction are precoding matrixes corresponding to TPMI index 0-5 and 14-21 in FIG. 1E and $$\frac{1}{\sqrt{2}}\begin{bmatrix}1 & 1\\0 & 0\\0 & 0\\0 & 0\end{bmatrix},$$

when N=2, the precoding matrixes contained in the codebook subset restriction are precoding matrixes corresponding to TPMI index 0-5 and 14-21 in FIG. 1E and $$\frac{1}{2}\begin{bmatrix}1 & 1\\0 & 0\\1 & 1\\0 & 0\end{bmatrix},$$

and when N=3, the precoding matrixes contained in the codebook subset restriction are precoding matrixes corresponding to TPMI index 0-5 and 14-21 in FIG. 1E and $$\frac{1}{\sqrt{6}}\begin{bmatrix}1 & 1\\1 & 1\\1 & 1\\0 & 0\end{bmatrix}.$$

When the number of transmission layers of four antenna ports is 3, and N=1, the precoding matrixes contained in the codebook subset restriction are precoding matrixes corresponding to TPMI index 0 and 3-6 in FIG. 1F and $$\frac{1}{\sqrt{3}}\begin{bmatrix}1 & 1 & 1\\0 & 0 & 0\\0 & 0 & 0\\0 & 0 & 0\end{bmatrix},$$

when N=2, the precoding matrixes contained in the codebook subset restriction are precoding matrixes corresponding to TPMI index 0 and 3-6 in FIG. 1F and $$\frac{1}{\sqrt{6}}\begin{bmatrix}1 & 1 & 1\\0 & 0 & 0\\1 & 1 & 1\\0 & 0 & 0\end{bmatrix},$$

and when N=3, the precoding matrixes contained in the codebook subset restriction are precoding matrixes corresponding to TPMI index 0 and 3-6 in FIG. 1F and $$\frac{1}{3}\begin{bmatrix}1 & 1 & 1\\1 & 1 & 1\\1 & 1 & 1\\0 & 0 & 0\end{bmatrix}.$$

When the number of transmission layers of four antenna ports is 4, and N=1, the precoding matrixes contained in the codebook subset restriction are precoding matrixes corresponding to TPMI index 0 and 3-4 in FIG. 1G and $$\frac{1}{2}\begin{bmatrix}1 & 1 & 1 & 1\\0 & 0 & 0 & 0\\0 & 0 & 0 & 0\\0 & 0 & 0 & 0\end{bmatrix},$$

when N=2, the precoding matrixes contained in the codebook subset restriction are precoding matrixes corresponding to TPMI index 0 and 3-4 in FIG. 1G and $$\frac{1}{2\sqrt{2}}\begin{bmatrix}1 & 1 & 1 & 1\\0 & 0 & 0 & 0\\1 & 1 & 1 & 1\\0 & 0 & 0 & 0\end{bmatrix},$$

and when N=3, the precoding matrixes contained in the codebook subset restriction are precoding matrixes corresponding to TPMI index 0 and 3-4 in FIG. 1G and $$\frac{1}{2\sqrt{3}}\begin{bmatrix}1 & 1 & 1 & 1\\1 & 1 & 1 & 1\\1 & 1 & 1 & 1\\0 & 0 & 0 & 0\end{bmatrix}.$$

Case 3: the user equipment has four antenna ports, and the coherent transmission capability of the user equipment is partialcoherent and fullcoherent.

When the number of transmission layers of four antenna ports is 1, and N=1, the precoding matrixes contained in the codebook subset restriction are precoding matrixes corresponding to TPMI index 0-27 in FIG. 1B or FIG. 1C and $$\begin{bmatrix}1\\0\\0\\0\end{bmatrix},$$

when N=2, the precoding matrixes contained in the codebook subset restriction are precoding matrixes corresponding to TPMI index 0-27 in FIG. 1B or FIG. 1C and $$\frac{1}{\sqrt{2}}\begin{bmatrix}1\\0\\1\\0\end{bmatrix},$$

and when N=3, the precoding matrixes contained in the codebook subset restriction are precoding matrixes corresponding to TPMI index 0-27 in FIG. 1B or FIG. 1C and $$\frac{1}{\sqrt{3}}\begin{bmatrix}1\\1\\1\\0\end{bmatrix}.$$

When the number of transmission layers of four antenna ports is 2, and N=1, the precoding matrixes contained in the codebook subset restriction are precoding matrixes corresponding to TPMI index 0-21 in FIG. 1E and $$\frac{1}{\sqrt{2}}\begin{bmatrix}1&1\\0&0\\0&0\\0&0\end{bmatrix},$$

when N=2, the precoding matrixes contained in the codebook subset restriction are precoding matrixes corresponding to TPMI index 0-21 in FIG. 1E and $$\frac{1}{2}\begin{bmatrix}1&1\\0&0\\1&1\\0&0\end{bmatrix},$$

and when N=3, the precoding matrixes contained in the codebook subset restriction are precoding matrixes corresponding to TPMI index 0-21 in FIG. 1E and $$\frac{1}{\sqrt{6}}\begin{bmatrix}1&1\\1&1\\1&1\\0&0\end{bmatrix}.$$

When the number of transmission layers of four antenna ports is 3, and N=1, the precoding matrixes contained in the codebook subset restriction are precoding matrixes corresponding to TPMI index 0-6 in FIG. 1F and $$\frac{1}{\sqrt{3}}\begin{bmatrix}1&1&1\\0&0&0\\0&0&0\\0&0&0\end{bmatrix},$$

when N=2, the precoding matrixes contained in the codebook subset restriction are precoding matrixes corresponding to TPMI index 0-6 in FIG. 1F and $$\frac{1}{\sqrt{6}}\begin{bmatrix}1&1&1\\0&0&0\\1&1&1\\0&0&0\end{bmatrix},$$

and when N=3, the precoding matrixes contained in the codebook subset restriction are precoding matrixes corresponding to TPMI index 0-6 in FIG. 1F and $$\frac{1}{3}\begin{bmatrix}1&1&1\\1&1&1\\1&1&1\\0&0&0\end{bmatrix}.$$

When the number of transmission layers of four antenna ports is 4, and N=1, the precoding matrixes contained in the codebook subset restriction are precoding matrixes corresponding to TPMI index 0-4 in FIG. 1G and $$\frac{1}{2}\begin{bmatrix}1&1&1&1\\0&0&0&0\\0&0&0&0\\0&0&0&0\end{bmatrix},$$

when N=2, the precoding matrixes contained in the codebook subset restriction are precoding matrixes corresponding to TPMI index 0-4 in FIG. 1G and $$\frac{1}{2\sqrt{2}}\begin{bmatrix}1&1&1&1\\0&0&0&0\\1&1&1&1\\0&0&0&0\end{bmatrix},$$

and when N=3, the precoding matrixes contained in the codebook subset restriction are precoding matrixes corresponding to TPMI index 0-4 in FIG. 1G and $$\frac{1}{2\sqrt{3}}\begin{bmatrix}1&1&1&1\\1&1&1&1\\1&1&1&1\\0&0&0&0\end{bmatrix}.$$

In some other embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; or the quantity of the antenna ports with the non-zero power is equal to the quantity of the antenna ports contained in the SRS resource for determining the precoding matrix of the codebook-based PUSCH; or when the quantity of the antenna ports with the non-zero power is smaller than the quantity of the antenna ports contained in the SRS resource for determining the precoding matrix of the codebook-based PUSCH, if N=1, the antenna port with the non-zero power is the first antenna port, if N=2, the antenna ports with the non-zero power are a second antenna port and a fourth antenna port, and if N=3, the antenna ports with the non-zero power are the first three antenna ports.

In one embodiment, when the determined codebook subset of the codebook-based PUSCH is related to the coherent transmission capability of the user equipment, the user equipment (or base station) determines that the codebook subset restriction corresponding to full power transmission of the user equipment is as shown below.

Case 1: the user equipment has two antenna ports, and the coherent transmission capability of the user equipment is noncoherent and fullcoherent.

When the number of transmission layers of two antenna ports is 1, and N=1, the precoding matrixes contained in the codebook subset restriction are precoding matrixes corresponding to TPMI index 0-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 0-2 in FIG. 1D and $$\frac{1}{\sqrt{2}} \begin{bmatrix} 1 & 1 \\ 0 & 0 \end{bmatrix}.$$

Case 2: the user equipment has four antenna ports, and the coherent transmission capability of the user equipment is noncoherent.

When the number of transmission layers of four antenna ports is 1, and N=1, the precoding matrixes contained in the codebook subset restriction are precoding matrixes corresponding to TPMI index 0-3 and 12-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-3 and 12-27 in FIG. 1B or FIG. 1C and $$\frac{1}{\sqrt{2}} \begin{bmatrix} 0 \\ 1 \\ 0 \\ 1 \end{bmatrix},$$

and when N=3, the precoding matrixes contained in the codebook subset restriction are precoding matrixes corresponding to TPMI index 0-3 and 12-27 in FIG. 1B or FIG. 1C and $$\frac{1}{\sqrt{3}} \begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 0-5 and 14-21 in FIG. 1E and $$\frac{1}{\sqrt{2}} \begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 0-5 and 14-21 in FIG. 1E and $$\frac{1}{2} \begin{bmatrix} 0 & 0 \\ 1 & 1 \\ 0 & 0 \\ 1 & 1 \end{bmatrix},$$

and when N=3, the precoding matrixes contained in the codebook subset restriction are precoding matrixes corresponding to TPMI index 0-5 and 14-21 in FIG. 1E and $$\frac{1}{\sqrt{6}} \begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0 and 3-6 in FIG. 1F and $$\frac{1}{\sqrt{3}} \begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0 and 3-6 in FIG. 1F and $$\frac{1}{\sqrt{6}} \begin{bmatrix} 0 & 0 & 0 \\ 1 & 1 & 1 \\ 0 & 0 & 0 \\ 1 & 1 & 1 \end{bmatrix},$$

and when N=3, the precoding matrixes contained in the codebook subset restriction are precoding matrixes corresponding to TPMI index 0 and 3-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0 and 3-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0 and 3-4 in FIG. 1G and $$\frac{1}{2\sqrt{2}}\begin{bmatrix} 0 & 0 & 0 & 0 \\ 1 & 1 & 1 & 1 \\ 0 & 0 & 0 & 0 \\ 1 & 1 & 1 & 1 \end{bmatrix},$$

and when N=3, the precoding matrixes contained in the codebook subset restriction are precoding matrixes corresponding to TPMI index 0 and 3-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

Case 3: the user equipment has four antenna ports, and the coherent transmission capability of the user equipment is partialcoherent and fullcoherent.

When the number of transmission layers of four antenna ports is 1, and N=1, the precoding matrixes contained in the codebook subset restriction are precoding matrixes corresponding to TPMI index 0-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-27 in FIG. 1B or FIG. 1C and $$\frac{1}{\sqrt{2}}\begin{bmatrix} 0 \\ 1 \\ 0 \\ 1 \end{bmatrix},$$

and when N=3, the precoding matrixes contained in the codebook subset restriction are precoding matrixes corresponding to TPMI index 0-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 0-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 0-21 in FIG. 1E and $$\frac{1}{2}\begin{bmatrix} 0 & 0 \\ 1 & 1 \\ 0 & 0 \\ 1 & 1 \end{bmatrix},$$

and when N=3, the precoding matrixes contained in the codebook subset restriction are precoding matrixes corresponding to TPMI index 0-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0-6 in FIG. 1F and $$\frac{1}{\sqrt{6}}\begin{bmatrix} 0 & 0 & 0 \\ 1 & 1 & 1 \\ 0 & 0 & 0 \\ 1 & 1 & 1 \end{bmatrix},$$

and when N=3, the precoding matrixes contained in the codebook subset restriction are precoding matrixes corresponding to TPMI index 0-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0-4 in FIG. 1G and $$\frac{1}{2\sqrt{2}}\begin{bmatrix} 0 & 0 & 0 & 0 \\ 1 & 1 & 1 & 1 \\ 0 & 0 & 0 & 0 \\ 1 & 1 & 1 & 1 \end{bmatrix},$$

and when N=3, the precoding matrixes contained in the codebook subset restriction are precoding matrixes corresponding to TPMI index 0-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some other embodiments, the determined codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; the quantity of the antenna ports with the non-zero power is smaller than the quantity of the antenna ports contained in the SRS resource for determining the precoding matrix of the codebook-based PUSCH, and each antenna port with the non-zero power belongs to the first N antenna ports.

In one embodiment, when the determined codebook subset of the codebook-based PUSCH is related to the coherent transmission capability of the user equipment, the user equipment (or base station) determines that the codebook subset restriction corresponding to full power transmission of the user equipment is as shown below. The coherent transmission capability of the user equipment is noncoherent, partialcoherent and fullcoherent.

When the number of transmission layers of two antenna ports is 1, and N=1, the precoding matrixes contained in the codebook subset restriction are precoding matrixes corresponding to TPMI index 0-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 0-2 in FIG. 1D and $$\frac{1}{\sqrt{2}}\begin{bmatrix} 1 & 1 \\ 0 & 0 \end{bmatrix}.$$

When the number of transmission layers of four antenna ports is 1, and N=1, the precoding matrixes contained in the codebook subset restriction are precoding matrixes corresponding to TPMI index 0-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-27 in FIG. 1B or FIG. 1C and $$\frac{1}{\sqrt{2}}\begin{bmatrix} 1 \\ 1 \\ 0 \\ 0 \end{bmatrix},$$

and when N=3, the precoding matrixes contained in the codebook subset restriction are precoding matrixes corresponding to TPMI index 0-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 0-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 0-21 in FIG. 1E and $$\frac{1}{2}\begin{bmatrix} 1 & 1 \\ 1 & 1 \\ 0 & 0 \\ 0 & 0 \end{bmatrix},$$

and when N=3, the precoding matrixes contained in the codebook subset restriction are precoding matrixes corresponding to TPMI index 0-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0-6 in FIG. 1F and $$\frac{1}{\sqrt{6}}\begin{bmatrix} 1 & 1 & 1 \\ 1 & 1 & 1 \\ 0 & 0 & 0 \\ 0 & 0 & 0 \end{bmatrix},$$

and when N=3, the precoding matrixes contained in the codebook subset restriction are precoding matrixes corresponding to TPMI index 0-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0-4 in FIG. 1G and $$\frac{1}{2\sqrt{2}}\begin{bmatrix} 1 & 1 & 1 & 1 \\ 1 & 1 & 1 & 1 \\ 0 & 0 & 0 & 0 \\ 0 & 0 & 0 & 0 \end{bmatrix},$$

and when N=3, the precoding matrixes contained in the codebook subset restriction are precoding matrixes corresponding to TPMI index 0-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some other embodiments, the determined codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with the non-zero power exceeds the coherent transmission capability of the user equipment; and when the quantity of the antenna ports with the non-zero power is smaller than the quantity of the antenna ports contained in the SRS resource for determining the precoding matrix of the codebook-based PUSCH, and N=1, the antenna port with the non-zero power is a first antenna port, when N=2, the antenna ports with the non-zero power are the first antenna port and a third antenna port, and when N=3, the antenna ports with the non-zero power are the first three antenna ports.

In one embodiment, when the determined codebook subset of the codebook-based PUSCH is related to the coherent transmission capability of the user equipment, the user equipment (or base station) determines that the codebook subset restriction corresponding to full power transmission of the user equipment is as shown below. The coherent transmission capability of the user equipment is noncoherent, partialcoherent and fullcoherent.

When the number of transmission layers of two antenna ports is 1, and N=1, the precoding matrixes contained in the codebook subset restriction are precoding matrixes corresponding to TPMI index 0-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 0-2 in FIG. 1D and $$\frac{1}{\sqrt{2}}\begin{bmatrix} 1 & 1 \\ 0 & 0 \end{bmatrix}.$$

When the number of transmission layers of four antenna ports is 1, and N=1, the precoding matrixes contained in the codebook subset restriction are precoding matrixes corresponding to TPMI index 0-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-27 in FIG. 1B or FIG. 1C and $$\frac{1}{\sqrt{2}}\begin{bmatrix} 1 \\ 0 \\ 1 \\ 0 \end{bmatrix},$$

and when N=3, the precoding matrixes contained in the codebook subset restriction are precoding matrixes corresponding to TPMI index 0-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrix contained in the codebook subset restriction is the precoding matrix corresponding to TPMI index 0-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrix contained in the codebook subset restriction is the precoding matrix corresponding to TPMI index 0-21 in FIG. 1E and $$\frac{1}{2}\begin{bmatrix} 1 & 1 \\ 0 & 0 \\ 1 & 1 \\ 0 & 0 \end{bmatrix},$$

and when N=3, the precoding matrix contained in the codebook subset restriction is the precoding matrix corresponding to TPMI index 0-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0-6 in FIG. 1F and $$\frac{1}{\sqrt{6}}\begin{bmatrix} 1 & 1 & 1 \\ 0 & 0 & 0 \\ 1 & 1 & 1 \\ 0 & 0 & 0 \end{bmatrix},$$

and when N=3, the precoding matrixes contained in the codebook subset restriction are precoding matrixes corresponding to TPMI index 0-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0-4 in FIG. 1G and $$\frac{1}{2\sqrt{2}}\begin{bmatrix} 1 & 1 & 1 & 1 \\ 0 & 0 & 0 & 0 \\ 1 & 1 & 1 & 1 \\ 0 & 0 & 0 & 0 \end{bmatrix},$$

and when N=3, the precoding matrixes contained in the codebook subset restriction are precoding matrixes corresponding to TPMI index 0-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some other embodiments, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; and when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a second antenna port and a fourth antenna port, and if N=3, the antenna ports with the non-zero power are the first three antenna ports.

In one embodiment, when the determined codebook subset of the codebook-based PUSCH is related to the coherent transmission capability of the user equipment, the user equipment (or base station) determines that the codebook subset restriction corresponding to full power transmission of the user equipment is as shown below. The coherent transmission capability of the user equipment is noncoherent, partialcoherent and fullcoherent.

When the number of transmission layers of two antenna ports is 1, and N=1, the precoding matrixes contained in the codebook subset restriction are precoding matrixes corresponding to TPMI index 0-5 in FIG. 1A and $$\begin{bmatrix} 1 \\ 0 \end{bmatrix}.$$

When the number of transmission layers of two antenna ports is 2, and N=2, the precoding matrixes contained in the codebook subset restriction are precoding matrixes corresponding to TPMI index 0-2 in FIG. 1D and $$\frac{1}{\sqrt{2}}\begin{bmatrix} 1 & 1 \\ 0 & 0 \end{bmatrix}.$$

When the number of transmission layers of four antenna ports is 1, and N=1, the precoding matrixes contained in the codebook subset restriction are precoding matrixes corresponding to TPMI index 0-27 in FIG. 1B or FIG. 1C and $$\begin{bmatrix} 1 \\ 0 \\ 0 \\ 0 \end{bmatrix},$$

when N=2, the precoding matrixes contained in the codebook subset restriction are precoding matrixes corresponding to TPMI index 0-27 in FIG. 1B or FIG. 1C and $$\frac{1}{\sqrt{2}}\begin{bmatrix} 0 \\ 1 \\ 0 \\ 1 \end{bmatrix},$$

and when N=3, the precoding matrixes contained in the codebook subset restriction are precoding matrixes corresponding to TPMI index 0-27 in FIG. 1B or FIG. 1C and $$\frac{1}{\sqrt{3}}\begin{bmatrix} 1 \\ 1 \\ 1 \\ 0 \end{bmatrix}.$$

When the number of transmission layers of four antenna ports is 2, and N=1, the precoding matrixes contained in the codebook subset restriction are precoding matrixes corresponding to TPMI index 0-21 in FIG. 1E and $$\frac{1}{\sqrt{2}}\begin{bmatrix} 1 & 1 \\ 0 & 0 \\ 0 & 0 \\ 0 & 0 \end{bmatrix},$$

when N=2, the precoding matrixes contained in the codebook subset restriction are precoding matrixes corresponding to TPMI index 0-21 in FIG. 1E and $$\frac{1}{2}\begin{bmatrix} 0 & 0 \\ 1 & 1 \\ 0 & 0 \\ 1 & 1 \end{bmatrix},$$

and when N=3, the precoding matrixes contained in the codebook subset restriction are precoding matrixes corresponding to TPMI index 0-21 in FIG. 1E and $$\frac{1}{\sqrt{6}}\begin{bmatrix} 1 & 1 \\ 1 & 1 \\ 1 & 1 \\ 0 & 0 \end{bmatrix}.$$

When the number of transmission layers of four antenna ports is 3, and N=1, the precoding matrixes contained in the codebook subset restriction are precoding matrixes corresponding to TPMI index 0-6 in FIG. 1F and $$\frac{1}{\sqrt{3}}\begin{bmatrix} 1 & 1 & 1 \\ 0 & 0 & 0 \\ 0 & 0 & 0 \\ 0 & 0 & 0 \end{bmatrix},$$

when N=2, the precoding matrixes contained in the codebook subset restriction are precoding matrixes corresponding to TPMI index 0-6 in FIG. 1F and $$\frac{1}{\sqrt{6}}\begin{bmatrix} 0 & 0 & 0 \\ 1 & 1 & 1 \\ 0 & 0 & 0 \\ 1 & 1 & 1 \end{bmatrix},$$

and when N=3, the precoding matrixes contained in the codebook subset restriction are precoding matrixes corresponding to TPMI index 0-6 in FIG. 1F and $$\frac{1}{3}\begin{bmatrix} 1 & 1 & 1 \\ 1 & 1 & 1 \\ 1 & 1 & 1 \\ 0 & 0 & 0 \end{bmatrix}.$$

When the number of transmission layers of four antenna ports is 4, and N=1, the precoding matrixes contained in the codebook subset restriction are precoding matrixes corresponding to TPMI index 0-4 in FIG. 1G and $$\frac{1}{2}\begin{bmatrix} 1 & 1 & 1 & 1 \\ 0 & 0 & 0 & 0 \\ 0 & 0 & 0 & 0 \\ 0 & 0 & 0 & 0 \end{bmatrix},$$

when N=2, the precoding matrixes contained in the codebook subset restriction are precoding matrixes corresponding to TPMI index 0-4 in FIG. 1G and $$\frac{1}{2\sqrt{2}}\begin{bmatrix} 0 & 0 & 0 & 0 \\ 1 & 1 & 1 & 1 \\ 0 & 0 & 0 & 0 \\ 1 & 1 & 1 & 1 \end{bmatrix},$$

and when N=3, the precoding matrixes contained in the codebook subset restriction are precoding matrixes corresponding to TPMI index 0-4 in FIG. 1G and $$\frac{1}{2\sqrt{3}}\begin{bmatrix} 1 & 1 & 1 & 1 \\ 1 & 1 & 1 & 1 \\ 1 & 1 & 1 & 1 \\ 0 & 0 & 0 & 0 \end{bmatrix}.$$

In some embodiment, as for the user equipment, transmission power of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH, and with the antenna ports belonging to the first N antenna ports is 1 or a predefined positive number; and a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH, and with the antenna ports not belonging to the first N antenna ports is X/I, and X is the quantity of the antenna ports with the non-zero power in the precoding matrix, and I is the quantity of the antenna ports contained in the SRS resource for determining the precoding matrix of the codebook-based PUSCH.

In some embodiment, as for the user equipment, transmission power of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being the first antenna ports is 1 or a predefined positive number, if N=2, a power control scaling factor of PUSCH corresponding to the precoding matrix with the antenna ports with the non-zero power not containing antenna ports other than the first antenna port and the third antenna port is 1 or a predefined positive number, and if N=3, a power control scaling factor of PUSCH corresponding to the precoding matrix with the antenna ports with the non-zero power not containing antenna ports other than the first three antenna ports is 1 or a predefined positive number; and when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power not being the first antenna ports is X/I, if N=2, a power control scaling factor of PUSCH corresponding to the precoding matrix with the antenna ports with the non-zero power containing antenna ports other than the first antenna port and the third antenna port is X/I, and if N=3, a power control scaling factor of PUSCH corresponding to the precoding matrix with the at least one antenna port with the non-zero power being the antenna ports other than the first three antenna ports is X/I.

In some embodiments, as for the user equipment, transmission power of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being the first antenna ports is 1 or a predefined positive number, if N=2, a power control scaling factor of PUSCH corresponding to the precoding matrix with the antenna ports with the non-zero power not containing antenna ports other than a second antenna port and a fourth antenna port is 1 or a predefined positive number, and if N=3, a power control scaling factor of PUSCH corresponding to the precoding matrix with the antenna ports with the non-zero power not containing antenna ports other than the first three antenna ports is 1 or a predefined positive number; and when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power not being the first antenna ports is X/I, if N=2, a power control scaling factor of PUSCH corresponding to the precoding matrix with the antenna ports with the non-zero power containing the antenna ports other than the second antenna port and the fourth antenna port is X/I, and if N=3, a power control scaling factor of PUSCH corresponding to the precoding matrix with the at least one antenna port with the non-zero power being the antenna ports other than the first three antenna ports is X/I.

In some other embodiments, as for a base station side, reference power or reference amplitude of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH, and with the antenna ports belonging to the first N antenna ports is 1 or a predefined positive number; and a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH, and with the antenna ports not belonging to the first N antenna ports is X/I.

In some other embodiment, as for a base station side, reference power or reference amplitude of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being the first antenna ports is 1 or a predefined positive number, if N=2, a power control scaling factor of PUSCH corresponding to the precoding matrix with the antenna ports with the non-zero power not containing antenna ports other than the first antenna port and the third antenna port is 1 or a predefined positive number, and if N=3, a power control scaling factor of PUSCH corresponding to the precoding matrix with the antenna ports with the non-zero power not containing antenna ports other than the first three antenna ports is 1 or a predefined positive number; and when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power not being the first antenna ports is X/I, if N=2, a power control scaling factor of PUSCH corresponding to the precoding matrix with the antenna ports with the non-zero power containing antenna ports other than the first antenna port and the third antenna port is X/I, and if N=3, a power control scaling factor of PUSCH corresponding to the precoding matrix with the at least one antenna port with the non-zero power being the antenna ports other than the first three antenna ports is X/I.

In some embodiments, as for a base station side, reference power or reference amplitude of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being the first antenna ports is 1 or a predefined positive number, if N=2, a power control scaling factor of PUSCH corresponding to the precoding matrix with the antenna ports with the non-zero power not containing antenna ports other than a second antenna port and a fourth antenna port is 1 or a predefined positive number, and if N=3, a power control scaling factor of PUSCH corresponding to the precoding matrix with the antenna ports with the non-zero power not containing antenna ports other than the first three antenna ports is 1 or a predefined positive number; and when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power not being the first antenna ports is X/I, if N=2, a power control scaling factor of PUSCH corresponding to the precoding matrix with the antenna ports with the non-zero power containing the antenna ports other than the second antenna port and the fourth antenna port is X/I, and if N=3, a power control scaling factor of PUSCH corresponding to the precoding matrix with the at least one antenna port with the non-zero power being the antenna ports other than the first three antenna ports is X/I.

In one embodiment, the codebook subset of the codebook-based PUSCH only includes single-layer precoding matrixes.

Some possible indication methods of codebook subset restriction are listed below.

N=1, the pusch-TransCoherence reported by the user equipment is noncoherent, and when the user equipment performs two-port transmission, codebook subset restriction information, sent by the base station, received by the user equipment is: when the number of transmission layers is 1, the precoding matrixes contained in the codebook subset restriction information is precoding matrixes corresponding to TPMI index 0 in FIG. 1A and FIG. 1C.

N=2, the pusch-TransCoherence reported by the user equipment is noncoherent, and when the user equipment performs two-port transmission, codebook subset restriction information, sent by the base station, received by the user equipment is: when the number of transmission layers is 1, the precoding matrixes contained in the codebook subset restriction information is precoding matrixes corresponding to TPMI index 0-1 in FIG. 1A and FIG. 1C.

N=1, the pusch-TransCoherence reported by the user equipment is noncoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0 in FIG. 1B and FIG. 1C.

N=1, the pusch-TransCoherence reported by the user equipment is partialcoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0 in FIG. 1B and FIG. 1C.

N=2, the pusch-TransCoherence reported by the user equipment is noncoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0 and 1 in FIG. 1B and FIG. 1C; and when the number of transmission layers is 2, the precoding matrixes contained in the codebook subset restriction information is precoding matrixes corresponding to TPMI index 0 in FIG. 1E.

N=2, the pusch-TransCoherence reported by the user equipment is noncoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0 and 2 in FIG. 1B and FIG. 1C; and when the number of transmission layers is 2, the precoding matrixes contained in the codebook subset restriction information is precoding matrixes corresponding to TPMI index 1 in FIG. 1E.

N=2, the pusch-TransCoherence reported by the user equipment is partialcoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0 and 1 in FIG. 1B and FIG. 1C; and when the number of transmission layers is 2, the precoding matrixes contained in the codebook subset restriction information is precoding matrixes corresponding to TPMI index 0 in FIG. 1E.

N=2, the pusch-TransCoherence reported by the user equipment is partialcoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0, 2, and 4-7 in FIG. 1B and FIG. 1C; and when the number of transmission layers is 2, the precoding matrixes contained in the codebook subset restriction information is precoding matrixes corresponding to TPMI index 1 in FIG. 1E.

N=3, the pusch-TransCoherence reported by the user equipment is noncoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0, 1, and 2 in FIG. 1B and FIG. 1C; and when the number of transmission layers is 2, the precoding matrixes contained in the codebook subset restriction information is precoding matrixes corresponding to TPMI index 0, 1 and 3 in FIG. 1E.

N=3, the pusch-TransCoherence reported by the user equipment is partialcoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0-2, and 4-7 in FIG. 1B and FIG. 1C; and when the number of transmission layers is 2, the precoding matrixes contained in the codebook subset restriction information is precoding matrixes corresponding to TPMI index 0, 1 and 3 in FIG. 1E.

N=4, the pusch-TransCoherence reported by the user equipment is noncoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0-3 in FIG. 1B and FIG. 1C; and when the number of transmission layers is 2, the precoding matrixes contained in the codebook subset restriction information is precoding matrixes corresponding to TPMI index 0-5 in FIG. 1E.

N=4, the pusch-TransCoherence reported by the user equipment is partialcoherent, and when the user equipment performs four-port transmission, codebook subset restriction information, sent by the base station, received by the user equipment is: when the number of transmission layers is 1, the precoding matrixes contained in the codebook subset restriction information is precoding matrixes corresponding to TPMI index 0-11 in FIG. 1B and FIG. 1C; and when the number of transmission layers is 2, the precoding matrixes contained in the codebook subset restriction information is precoding matrixes corresponding to TPMI index 0-13 in FIG. 1E.

Embodiment 2

User equipment reports an identifier of PAs supporting full power transmission of the user equipment, or the user equipment reports an identifier of antenna ports supporting full power transmission of the user equipment. The user equipment (or base station) determines a codebook subset of a codebook-based PUSCH based on the identifier of the PAs supporting full power transmission of the user equipment and/or the identifier of the antenna ports supporting full power transmission of the user equipment.

As for user equipment capable of supporting at most two ports, the user equipment may report the identifier of the PAs or the identifier of the antenna ports supporting full power transmission of the user equipment to be one of the following combinations: {1, 2, 1+2}, and the number reported by the user equipment represents the identifier of the PAs or the identifier of the antenna ports supporting the full power transmission. For example, the identifier of the antenna ports reported by the user equipment is {2}, which represents that a second antenna port supports the full power transmission, or the identifier of the antenna ports reported by the user equipment is {1+2}, which represents that a first antenna port and the second antenna port may perform the full power transmission, that is, the first antenna port supports the full power transmission, the second antenna port supports the full power transmission, and the first antenna port and the second antenna port also support the full power transmission when being used simultaneously. Here the numbers 1 and 2 are only reference symbols for indicating the antenna ports or the PAs, and the antenna ports or the PAs may be indicated with other symbols in an actual system, which is not limited in the present disclosure.

As for user equipment capable of supporting at most four ports (or supporting at most four-layer transmission), the user equipment may report the identifier of the PAs or the identifier of the antenna ports supporting full power transmission of the user equipment to be one of the following combinations: {1, 2, 3, 4, 1+2, 1+3, 1+4, 2+3, 1+2+3, 1+2+4, 1+3+4, 2+3+4, 1+2+3+4}, and the number reported by the user equipment represents the identifier of the PAs or the identifier of the antenna ports supporting the full power transmission. For example, the antenna ports reported by the user equipment is {2}, which represents that a second antenna port supports the full power transmission, or the identifier of the antenna ports reported by the user equipment is {1+3}, which represents that a first antenna port and a third antenna port support the full power transmission, that is, the first antenna port supports the full power transmission, the third antenna port supports the full power transmission, and the first antenna port and the third antenna port also support the full power transmission when being used simultaneously. Here the numbers 1, 2, 3 and 4 are only reference symbols for indicating the antenna ports or the PAs, and the antenna ports or the PAs may be indicated with other symbols in an actual system, which is not limited in the present disclosure.

In some embodiments, the user equipment reports the antenna ports supporting the full power transmission of the user equipment or reports the antenna ports supporting the full power transmission of the user equipment in a bitmap scheme. For example, if the maximum SRS antenna port quantity supported by the user equipment is 4, the user equipment sends 4 bit information, and each bit corresponds to one antenna port or PA, bit 1 represents that the antenna port corresponding to it supports the full power transmission, and bit 0 represents that the antenna port corresponding to it does not support the full power transmission. Certainly, it may also be that bit 0 represents that the full power transmission is supported, and bit 1 represents that the full power transmission is not supported, which is not limited in the present disclosure. For example, if the $n^{th}$ bit represents the $n^{th}$ antenna port, 4 bit reported by the user equipment is 1101, and it represents that the first, second and fourth antenna ports support the full power transmission, and the third antenna port does not support the full power transmission.

In some embodiments, the determined codebook subset of the codebook-based PUSCH includes one or more precoding matrixes, and each precoding matrix meets the following conditions: the quantity of antenna ports with non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and any identifier of the antenna ports with the non-zero power belongs to the identifier of the antenna ports sent by the user equipment.

In some embodiments, the determined codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and any identifier of the antenna ports with the non-zero power belongs to the identifier of the antenna ports sent by the user equipment.

In some other embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; or a combination of at least one layer of the antenna ports with the non-zero power exceeds the coherent transmission capability of the user equipment, and the quantity of the antenna ports with the non-zero power is equal to the quantity of antenna ports contained in an SRS resource for determining the precoding matrix of the codebook-based PUSCH; or the combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and any identifier of the antenna ports with the non-zero power belongs to the identifier of the antenna ports sent by the user equipment.

In some other embodiments, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment, and the quantity of the antenna ports with the non-zero power is equal to the quantity of antenna ports contained in an SRS resource for determining the precoding matrix of the codebook-based PUSCH; or the combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, the quantity of the antenna ports with the non-zero power is not smaller than M, and any identifier of the antenna ports with the non-zero power belongs to the identifier of the antenna ports sent by the user equipment.

In some embodiments, as for the user equipment, transmission power of PUSCH corresponding to each precoding matrix in the codebook subset of the codebook-based PUSCH meets the following conditions: a power control scaling factor of PUSCH corresponding to the precoding matrix with the quantity of antenna ports with non-zero power being equal to the quantity of antenna ports contained in an SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH and any identifier of the antenna ports with the non-zero power belongs to the identifier of the antenna ports sent by the user equipment, a power control scaling factor of PUSCH corresponding to the precoding matrix of the antenna ports with the non-zero power is 1 or a predefined positive number; and when the quantity of the antenna ports with the non-zero power is smaller than the quantity of the antenna ports contained in the SRS resource for determining the precoding matrix of the codebook-based PUSCH and the identifier of at least one antenna port with the non-zero power does not belong to the identifier of the antenna ports sent by the user equipment, a power control scaling factor of PUSCH corresponding to the precoding matrix of the at least one antenna port with the non-zero power is X/I.

In some other embodiments, as for a base station side, reference power or reference amplitude of PUSCH corresponding to each precoding matrix in the codebook subset of the codebook-based PUSCH meets the following conditions: a power control scaling factor of PUSCH corresponding to the precoding matrix with the quantity of antenna ports with non-zero power being equal to the quantity of antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH and any identifier of the antenna ports with the non-zero power belongs to the identifier of the antenna ports sent by the user equipment, a power control scaling factor of PUSCH corresponding to the precoding matrix of the antenna ports with the non-zero power is 1 or a predefined positive number; and when the quantity of the antenna ports with the non-zero power is smaller than the quantity of the antenna ports contained in the SRS resource for determining the precoding matrix of the codebook-based PUSCH and the identifier of at least one antenna port with the non-zero power does not belong to the identifier of the antenna ports sent by the user equipment, a power control scaling factor of PUSCH corresponding to the precoding matrix of the at least one antenna port with the non-zero power is X/I.

In one embodiment, the codebook subset of the codebook-based PUSCH only includes single-layer precoding matrixes.

Embodiment 3

User equipment reports a sending combination of PAs supporting full power transmission of the user equipment and/or a sending combination of antenna ports supporting full power transmission of the user equipment to a base station. The user equipment (or base station) determines a codebook subset of a codebook-based PUSCH based on the quantity of the PAs supporting full power transmission of the user equipment and/or the quantity of the antenna ports supporting full power transmission of the user equipment.

As for user equipment capable of supporting at most two ports (or supporting at most two-layer transmission), the user equipment may report the sending combination of the PAs or the sending combination of the antenna ports supporting full power transmission of the user equipment to be one of the following combinations: {1, 2, 1+2}, and the number reported by the user equipment represents the sending combination of the PAs or the sending combination of the antenna ports supporting the full power transmission. For example, the sending combination of the antenna ports reported by the user equipment is {2}, which represents that a second antenna port supports the full power transmission during separate sending, or the sending combination of the antenna ports reported by the user equipment is only {1+2}, which represents that a first antenna port and the second antenna port support the full power transmission during simultaneous transmission, and the first antenna port or the second antenna port does not support the full power transmission during separate sending. Here the numbers 1, 2 and 1+2 are only reference symbols for indicating the antenna ports or the PAs, and the antenna ports or the PAs may be indicated with other symbols in an actual system, which is not limited in the present disclosure.

As for user equipment capable of supporting at most four ports (or supporting at most four-layer transmission), the user equipment may report the sending combination of the PAs or the sending combination of the antenna ports supporting full power transmission of the user equipment to be one of the following combinations: {1, 2, 3, 4, 1+2, 1+3, 1+4, 2+3, 1+2+3, 1+2+4, 1+3+4, 2+3+4, 1+2+3+4}, and the number reported by the user equipment represents the sending combination of the PAs or the sending combination of the antenna ports supporting the full power transmission. For example, the sending combination of the antenna ports reported by the user equipment is {2}, which represents that a second antenna port supports the full power transmission during separate sending, or the sending combination of the antenna ports reported by the user equipment is only {1+3}, which represents that a first antenna port and a third antenna port support the full power transmission during simultaneous transmission, and the first antenna port or the third antenna port does not support the full power transmission during separate sending. 1, 2, 3, 4 and the like are only reference symbols for indicating the antenna ports or the PAs, and the antenna ports or the PAs may be indicated with other symbols in an actual system, which is not limited in the present disclosure.

In some embodiments, the determined codebook subset of the codebook-based PUSCH includes one or more precoding matrixes, and each precoding matrix meets the following conditions: the quantity of antenna ports with non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the sending combination of the antenna ports with the non-zero power is the sending combination of the antenna ports sent by the user equipment.

In some embodiments, the determined codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the sending combination of the antenna ports with the non-zero power is the sending combination of the antenna ports sent by the user equipment.

In some embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; or the quantity of the antenna ports with the non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the sending combination of the antenna ports with the non-zero power is the sending combination of the antenna ports sent by the user equipment.

In some embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; a combination of any layer of the antenna ports with the non-zero power exceeds the coherent transmission capability of the user equipment, and the quantity of the antenna ports with the non-zero power is equal to the quantity of antenna ports contained in an SRS resource for determining the precoding matrix of the codebook-based PUSCH; or the combination of any layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the sending combination of the antenna ports with the non-zero power is the sending combination of the antenna ports sent by the user equipment.

In some other embodiments, the codebook subset of the codebook-based PUSCH is a full set or subset of a set composed of the precoding matrixes meeting any one of following conditions: a codeword does not exceed the coherent transmission capability of the user equipment; a combination of any layer of antenna ports with non-zero power exceeds the coherent transmission capability of the user equipment; the quantity of the antenna ports with the non-zero power is equal to the quantity of antenna ports contained in an SRS resource for determining the precoding matrix of the codebook-based PUSCH; and the quantity of the antenna ports with the non-zero power is smaller than the quantity of the antenna ports contained in the SRS resource for determining the precoding matrix of the codebook-based PUSCH, and the sending combination of the antenna ports with the non-zero power is the sending combination of the antenna ports sent by the user equipment.

In some embodiments, as for the user equipment, transmission power of PUSCH corresponding to each precoding matrix in the codebook subset of the codebook-based PUSCH meets the following conditions: a power control scaling factor of PUSCH corresponding to the precoding matrix with the quantity of antenna ports with non-zero power being equal to the quantity of antenna ports contained in an SRS resource for determining the precoding matrix of the codebook-based PUSCH is 1 or a predefined positive number; a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH and with the sending combination of the antenna ports with the non-zero power being the sending combination of the antenna ports sent by the user equipment is 1 or a predefined positive number; and a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH and with the sending combination of the antenna ports with the non-zero power not belonging to the sending combination of the antenna ports sent by the user equipment is X/I.

In some other embodiments, as for the base station, reference power or reference amplitude of PUSCH corresponding to each precoding matrix in the codebook subset of the codebook-based PUSCH meets the following conditions: a power control scaling factor of PUSCH corresponding to the precoding matrix with the quantity of antenna ports with non-zero power being equal to the quantity of antenna ports contained in an SRS resource for determining the precoding matrix of the codebook-based PUSCH is 1 or a predefined positive number; a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH and with the sending combination of the antenna ports with the non-zero power being the sending combination of the antenna ports sent by the user equipment is 1 or a predefined positive number; and a power control scaling factor of PUSCH corresponding to the precoding matrix with the quantity of the antenna ports with the non-zero power being smaller than the quantity of the antenna ports contained in the SRS resource for determining the precoding matrix of the codebook-based PUSCH and with the sending combination of the antenna ports with the non-zero power not belonging to the sending combination of the antenna ports sent by the user equipment is X/I.

In one embodiment, the codebook subset of the codebook-based PUSCH only includes single-layer precoding matrixes.

Embodiment 4

User equipment reports fourth instruction to a base station, or reports fifth instruction to the base station. The user equipment (or the base station) determines a codebook subset of a codebook-based PUSCH based on the fourth instruction and/or the fifth instruction.

The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment; and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In some embodiments, the codebook subset of the codebook-based PUSCH includes one or more precoding matrixes, and each precoding matrix meets the following conditions: the quantity of antenna ports with non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In some embodiments, the codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In some embodiment, the codebook subset of the codebook-based PUSCH includes one or more precoding matrixes, and each precoding matrix meets the following conditions: a combination of any layer of antenna ports with non-zero power does not exceed the coherent transmission capability of the user equipment; or the quantity of the antenna ports with the non-zero power is equal to the quantity of antenna ports contained in an SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In some embodiments, the codebook subset of the codebook-based PUSCH includes one or more precoding matrixes, and each precoding matrix meets the following conditions: a combination of any layer of antenna ports with non-zero power does not exceed the coherent transmission capability of the user equipment; a combination of any layer of the antenna ports with the non-zero power exceeds the coherent transmission capability of the user equipment, and the quantity of the antenna ports with the non-zero power is equal to the quantity of antenna ports contained in an SRS resource for determining the precoding matrix of the codebook-based PUSCH; or the combination of any layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In some other embodiments, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment, and the quantity of the antenna ports with the non-zero power is equal to the quantity of antenna ports contained in the SRS resource for determining the precoding matrix of the codebook-based PUSCH; or the combination of any layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In some embodiments, as for the user equipment, transmission power of PUSCH corresponding to each precoding matrix in the codebook subset of the codebook-based PUSCH meets the following condition: a power control scaling factor of PUSCH corresponding to the precoding matrix with the antenna ports with the non-zero power is a minimum value between (MX)/I and 1.

In some other embodiments, for the base station, reference power or reference amplitude of PUSCH corresponding to each precoding matrix in the codebook subset of the codebook-based PUSCH meets the following condition: a power control scaling factor of PUSCH corresponding to the precoding matrix with the antenna ports with the non-zero power is a minimum value between (MX)/I and 1.

In one embodiment, M is equal to 2.

In one embodiment, the codebook subset of the codebook-based PUSCH only includes single-layer precoding matrixes.

For example, the full power transmission capability of the user equipment is that the sending combination of the two PAs of the user equipment supports the full power transmission, or the full power transmission capability of the user equipment is that the sending combination of the two antenna ports of the user equipment supports the full power transmission; and the coherent transmission capability of the user equipment is noncoherent transmission (or codebook subset restriction corresponding to the coherent transmission capability reported by the user equipment is a noncoherent codebook subset, for example, the pusch-TransCoherence reported by the user equipment is nonCoherent).

The user equipment (or base station) determines that the codebook subset restriction corresponding to full power transmission of the user equipment is: when the number of transmission layers of two antenna ports is 1, the precoding matrixes contained in the codebook subset restriction are precoding matrixes corresponding to TPMI index 2 in FIG. 1A; when the number of transmission layers of two antenna ports is 2, the precoding matrixes contained in the codebook subset restriction are precoding matrixes corresponding to TPMI index 0-1 in FIG. 1D; when the number of transmission layers of four antenna ports is 1, the precoding matrixes contained in the codebook subset restriction are precoding matrixes corresponding to TPMI index 4, 8 and 12 in FIG.

1B and FIG. 1C; when the number of transmission layers of four antenna ports is 2, the precoding matrixes contained in the codebook subset restriction are precoding matrixes corresponding to TPMI index 0-5 in FIG. 1E; when the number of transmission layers of four antenna ports is 3, a precoding matrix contained in the codebook subset restriction is the precoding matrix corresponding to TPMI index 0 in FIG. 1F; and when the number of transmission layers of four antenna ports is 4, the precoding matrixes contained in the codebook subset restriction are precoding matrixes corresponding to TPMI index 0 in FIG. 1G.

An overhead indicated by the precoding matrix and the number of transmission layers of the codebook-based PUSCH is: when the maximum number of transmission layers of two antenna ports is 1, the overhead indicated by the precoding matrix and the number of transmission layers of the codebook-based PUSCH is 1 bit; when the maximum number of transmission layers of two antenna ports is 2, the overhead indicated by the precoding matrix and the number of transmission layers of the codebook-based PUSCH is 2 bit; when the maximum number of transmission layers of four antenna ports is 1, the overhead indicated by the precoding matrix and the number of transmission layers of the codebook-based PUSCH is 2 bit; when the maximum number of transmission layers of four antenna ports is 2, the overhead indicated by the precoding matrix and the number of transmission layers of the codebook-based PUSCH is 4 bit; when the maximum number of transmission layers of four antenna ports is 3, the overhead indicated by the precoding matrix and the number of transmission layers of the codebook-based PUSCH is 4 bit; and when the maximum number of transmission layers of four antenna ports is 4, the overhead indicated by the precoding matrix and the number of transmission layers of the codebook-based PUSCH is 4 bit.

An encoding mode indicated by the precoding matrix and the number of transmission layers of the codebook-based PUSCH is as shown in Table 6.

TABLE 6

Encoding mode indicated by precoding matrix and number of transmission layers of codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 4 |
| 1 | 2 layers: TPMI = 0 | 1 | 1 layer: TPMI = 8 |
| 2 | 2 layers: TPMI = 1 | 2 | 1 layer: TPMI = 12 |
|  |  | 3 | 2 layers: TPMI = 0 |
|  |  | 4 | 2 layers: TPMI = 1 |
|  |  | 5 | 2 layers: TPMI = 2 |
|  |  | 6 | 2 layers: TPMI = 3 |
|  |  | 7 | 2 layers: TPMI = 4 |
|  |  | 8 | 2 layers: TPMI = 5 |
|  |  | 9 | 3 layers: TPMI = 0 |
|  |  | 10 | 4 layers: TPMI = 0 |
|  |  | 11 | Reserved |

Embodiment 5

User equipment reports a precoding matrix set to a base station, and the user equipment (or base station) determines a codebook subset of a codebook-based PUSCH based on the precoding matrix set.

In some embodiments, any two precoding matrixes in the precoding matrix set meet the following conditions: at least one layer of ports with non-zero power in any two precoding matrixes are different; or the non-zero power ports in any two precoding matrixes are the same, but the transmission layer quantities of any two precoding matrixes are different.

In some embodiments, any two precoding matrixes in the precoding matrix set meet the following condition: antenna ports with non-zero power in any two precoding matrixes are different.

In some embodiments, the codebook subset of the codebook-based PUSCH includes one or more precoding matrixes, and each precoding matrix meets the following condition: each precoding matrix belongs to precoding matrixes in the precoding matrix set reported by the user equipment.

In some embodiments, the codebook subset of the codebook-based PUSCH determined by the user equipment includes one or more precoding matrixes, and each precoding matrix meets the following conditions: non-zero ports of any precoding matrix are the same as non-zero ports of at least one precoding matrix in the precoding matrix set reported by the user equipment; and the non-zero power ports and the transmission layer quantities of the at least two precoding matrixes are the same, and relative phases between the non-zero antenna ports corresponding to the at least two precoding matrixes are different.

In some other embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; or a combination of at least one layer of the antenna ports with the non-zero power exceeds the coherent transmission capability of the user equipment, and non-zero ports contained in the combination of at least one layer of the antenna ports with the non-zero power are the same as non-zero ports contained by at least one precoding matrix in the precoding matrix set reported by the user equipment.

In one embodiment, the base station (or user equipment) further determines the codebook subset of the codebook-based PUSCH according to the precoding matrix set and the coherent transmission capability of the user equipment, and the different coherent transmission capabilities correspond to the different codebook subsets of the codebook-based PUSCH in the case that the user equipment sends the same precoding matrix set.

In some embodiments, the determined codebook subset of the codebook-based PUSCH includes one or more precoding matrixes, and each precoding matrix meets the following conditions: non-zero ports of any precoding matrix are the same as non-zero ports of at least one precoding matrix in the precoding matrix set reported by the user equipment; the non-zero power ports and the transmission layer quantities of the at least two precoding matrixes are the same, and relative phases between the non-zero antenna ports corresponding to the at least two precoding matrixes are different.

In some embodiments, the determined codebook subset of the codebook-based PUSCH includes one or more precoding matrixes, and each precoding matrix meets the following conditions: a combination of any layer of antenna ports with non-zero power does not exceed the coherent transmission capability of the user equipment; or a combination of at least one layer of the antenna ports with the non-zero power exceeds the coherent transmission capability of the user equipment, and the non-zero ports are the same as non-zero ports of at least one precoding matrix in the precoding matrix set sent by the user equipment.

In some other embodiments, the codebook subset of the codebook-based PUSCH is a full set or subset of a set composed of the precoding matrixes meeting any one of following conditions: a codeword does not exceed the coherent transmission capability of the user equipment; or the contained non-zero antenna ports are the same as non-zero antenna ports corresponding to one precoding matrix in the precoding matrix set reported by the user equipment.

In some embodiments, as for the user equipment, transmission power of PUSCH corresponding to each precoding matrix in the codebook subset of the codebook-based PUSCH meets the following conditions: when the non-zero antenna ports of one precoding matrix in the codebook subset of the codebook-based PUSCH are the same as non-zero antenna ports corresponding to one precoding matrix in the precoding matrix set sent by the user equipment, a power control scaling factor of PUSCH corresponding to the precoding matrix in the codebook subset of the codebook-based PUSCH is 1 or a predefined positive number; and when the non-zero antenna ports of one precoding matrix in the codebook subset of the codebook-based PUSCH are different from the non-zero antenna ports corresponding to any precoding matrix in the precoding matrix set sent by the user equipment, a power control scaling factor of PUSCH corresponding to the precoding matrix in the codebook subset of the codebook-based PUSCH is X/I.

In some other embodiments, as for the base station, reference power or reference amplitude of PUSCH corresponding to each precoding matrix in the codebook subset of the codebook-based PUSCH meets the following conditions: when the non-zero antenna ports of one precoding matrix in the codebook subset of the codebook-based PUSCH are the same as non-zero antenna ports corresponding to one precoding matrix in the precoding matrix set sent by the user equipment, a power control scaling factor of PUSCH corresponding to the precoding matrix in the codebook subset of the codebook-based PUSCH is 1 or a predefined positive number; and when the non-zero antenna ports of one precoding matrix in the codebook subset of the codebook-based PUSCH are different from the non-zero antenna ports corresponding to any precoding matrix in the precoding matrix set sent by the user equipment, a power control scaling factor of PUSCH corresponding to the precoding matrix in the codebook subset of the codebook-based PUSCH is X/I.

In one embodiment, the codebook subset of the codebook-based PUSCH only includes single-layer precoding matrixes.

In one embodiment, the same value of codebook subset restriction information sent by the base station to the user equipment corresponds to the different codebook subset restrictions of the codebook-based PUSCH when the base station indicates the user equipment to perform full power transmission and does not indicate full power transmission of the user equipment (or indicates the user equipment not to perform full power transmission).

Embodiment 6

A full power transmission capability reported by user equipment to a base station is a sending combination of any two PAs in the user equipment, or a sending combination of any two antenna ports in the user equipment. Coherent transmission capability reported by the user equipment is noncoherent transmission. Or, the full power transmission capability reported by the user equipment is the sending combination of any two PAs in the user equipment, or the sending combination of any two antenna ports in the user equipment. A codebook subset corresponding to the coherent transmission capability reported by the user equipment is a noncoherent codebook subset, for example, the pusch-TransCoherence reported by the user equipment is nonCoherent.

Precoding matrixes contained by the codebook subset of the codebook-based PUSCH and determined by the user equipment (or base station) are as shown below.

When the number of transmission layers of two antenna ports is 1, the precoding matrixes contained in the codebook subset are precoding matrixes corresponding to TPMI index 2 in FIG. 1A.

When the number of transmission layers of two antenna ports is 2, the precoding matrixes contained in the codebook subset are precoding matrixes corresponding to TPMI index 0-1 in FIG. 1D (when an uplink transmission waveform is a CP-OFDM waveform).

When the number of transmission layers of four antenna ports is 1, the precoding matrixes contained in the codebook subset are precoding matrixes corresponding to TPMI index 4, 8 and 12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset are precoding matrixes corresponding to TPMI index 0-5 in FIG. 1E (when an uplink transmission waveform is a CP-OFDM waveform).

When the number of transmission layers of four antenna ports is 3, the precoding matrixes contained in the codebook subset are precoding matrixes corresponding to TPMI index 0 in FIG. 1F (when an uplink transmission waveform is a CP-OFDM waveform).

When the number of transmission layers of four antenna ports is 4, the precoding matrixes contained in the codebook subset are precoding matrix corresponding to TPMI index 0 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 2 bit; and in the case of the four antenna ports, the overhead indicated by the precoding matrix and the number of transmission layers of the codebook-based PUSCH is 4 bit.

An encoding mode indicated by the precoding matrix and the number of transmission layers of the codebook-based PUSCH is as shown in following Table 7A.

TABLE 7A

Encoding mode indicated by precoding matrix and number of transmission layers of codebook-based PUSCH

| Bit field mapped to index | Two ports | Bit field mapped to index | Four ports |
|---|---|---|---|
| 0 | 1 layer: TPMI = 2 | 0 | 1 layer: TPMI = 4 |
| 1 | 2 layers: TPMI = 0 | 1 | 1 layer: TPMI = 8 |
| 2 | 2 layers: TPMI = 1 | 2 | 1 layer: TPMI = 12 |
| 3 | Reserved | 3 | 2 layers: TPMI = 0 |
|  |  | 4 | 2 layers: TPMI = 1 |
|  |  | 5 | 2 layers: TPMI = 2 |
|  |  | 6 | 2 layers: TPMI = 3 |
|  |  | 7 | 2 layers: TPMI = 4 |
|  |  | 8 | 2 layers: TPMI = 5 |
|  |  | 9 | 3 layers: TPMI = 0 |
|  |  | 10 | 3 layers: TPMI = 0 |
|  |  | 11-15 | Reserved |

In a realizable scene, the base station sends maximum number of transmission layers information to the user equipment, and the user equipment receives the maximum number of transmission layers information, and determines second information based on the maximum number of transmission layers information. The maximum number of transmission layers information is configured to indicate the maximum layer quantity that cannot be exceeded by transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 4 bit.

When the maximum number of transmission layers indicated by the maximum number of transmission layers information is 4, an overhead indicated by the precoding matrix and the number of transmission layers of the codebook-based PUSCH and corresponding to four antenna ports is 4 bit.

An encoding mode indicated by the precoding matrix and the number of transmission layers of the codebook-based PUSCH is as shown in Table 7b.

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 4 bit.

When the maximum number of transmission layers indicated by the maximum number of transmission layers information is 4, an overhead indicated by the precoding matrix and the number of transmission layers of the codebook-based PUSCH and corresponding to four antenna ports is 4 bit.

Another encoding mode indicated by the precoding matrix and the number of transmission layers of the codebook-based PUSCH is as shown in following Table 7C and Table 7D.

TABLE 7b

Encoding mode indicated by precoding matrix and number of transmission layers of codebook-based PUSCH

| maxRank = 1 | | maxRank = 2, or 3, or 4 | |
| --- | --- | --- | --- |
| Bit field mapped to index Two ports | Bit field mapped to index Four ports | Bit field mapped to index Two ports | Bit field mapped to index Four ports |
| 0  1 layer: TPMI = 2 | 0  1 layer: TPMI = 4 | 0  1 layer: TPMI = 2 | 0  1 layer: TPMI = 4 |
| 1  Reserved | 1  1 layer: TPMI = 8 | 1  2 layers: TPMI = 0 | 1  1 layer: TPMI = 8 |
|  | 2  1 layer: TPMI = 12 | 2  2 layers: TPMI = 1 | 2  1 layer: TPMI = 12 |
|  | 3  Reserved | 3  Reserved | 3  2 layers: TPMI = 0 |
|  |  |  | 4  2 layers: TPMI = 1 |
|  |  |  | 5  2 layers: TPMI = 2 |
|  |  |  | 6  2 layers: TPMI = 3 |
|  |  |  | 7  2 layers: TPMI = 4 |
|  |  |  | 8  2 layers: TPMI = 5 |
|  |  |  | 9  3 layers: TPMI = 0 |
|  |  |  | 10  4 layers: TPMI = 0 |
|  |  |  | 11-15  Reserved |

TABLE 7C

Encoding mode indicated by precoding matrix and number of transmission layers of codebook-based PUSCH

| | maxRank = 1 | | | | maxRank = 2 | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 4 | 0 | 1 layer: TPMI = 2 | 0 | 1 layer: TPMI = 4 |
| 1 | Reserved | 1 | 1 layer: TPMI = 8 | 1 | 2 layers: TPMI = 0 | 1 | 1 layer: TPMI = 8 |
| | | 2 | 1 layer: TPMI = 12 | 2 | 2 layers: TPMI = 1 | 2 | 1 layer: TPMI = 12 |
| | | 3 | Reserved | 3 | Reserved | 3 | 2 layers: TPMI = 0 |
| | | | | | | 4 | 2 layers: TPMI = 1 |
| | | | | | | 5 | 2 layers: TPMI = 2 |
| | | | | | | 6 | 2 layers: TPMI = 3 |
| | | | | | | 7 | 2 layers: TPMI = 4 |
| | | | | | | 8 | 2 layers: TPMI = 5 |
| | | | | | | 9-15 | Reserved |

TABLE 7D

Encoding mode indicated by precoding matrix and number of transmission layers of codebook-based PUSCH

| | maxRank = 3 | | maxRank = 4 |
|---|---|---|---|
| Bit field mapped to index | Four ports | Bit field mapped to index | Four ports |
| 0 | 1 layer: TPMI = 4 | 0 | 1 layer: TPMI = 4 |
| 1 | 1 layer: TPMI = 8 | 1 | 1 layer: TPMI = 8 |
| 2 | 1 layer: TPMI = 12 | 2 | 1 layer: TPMI = 12 |
| 3 | 2 layers: TPMI = 0 | 3 | 2 layers: TPMI = 0 |
| 4 | 2 layers: TPMI = 1 | 4 | 2 layers: TPMI = 1 |
| 5 | 2 layers: TPMI = 2 | 5 | 2 layers: TPMI = 2 |
| 6 | 2 layers: TPMI = 3 | 6 | 2 layers: TPMI = 3 |
| 7 | 2 layers: TPMI = 4 | 7 | 2 layers: TPMI = 4 |
| 8 | 2 layers: TPMI = 5 | 8 | 2 layers: TPMI = 5 |
| 9 | 3 layers: TPMI = 0 | 9 | 3 layers: TPMI = 0 |
| 10-15 | Reserved | 10 | 3 layers: TPMI = 0 |
| | | 11-15 | Reserved |

The example given in the above embodiment 6 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset not greater than the H layers, and H is an integer greater than or equal to 1.

Taking an example that H=1, the overhead indicated by the corresponding precoding matrix and number of transmission layers of the codebook-based PUSCH is: in the case of the two antenna ports, the overhead is 1 bit; and in the case of the four antenna ports, the overhead is 2 bit. An encoding mode indicated by the corresponding precoding matrix and number of transmission layers of the codebook-based PUSCH is as shown in Table 7E.

TABLE 7E

Encoding mode indicated by precoding matrix and number of transmission layers of codebook-based PUSCH

| Bit field mapped to index | Two ports | Bit field mapped to index | Four ports |
|---|---|---|---|
| 0 | 1 layer: TPMI = 2 | 0 | 1 layer: TPMI = 4 |
| 1 | Reserved | 1 | 1 layer: TPMI = 8 |
| | | 2 | 1 layer: TPMI = 12 |
| | | 3 | Reserved |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 7

A full power transmission capability reported by user equipment to a base station is the user equipment supporting full power transmission but at least one PA not supporting the full power transmission, and a coherent transmission capability reported by the user equipment is noncoherent transmission; or the full power transmission capability reported by the user equipment is the user equipment supporting but at least one PA not supporting the full power transmission, codebook subset restriction corresponding to the coherent transmission capability reported by the user equipment is a noncoherent codebook subset, for example, the pusch-TransCoherence reported by the user equipment is nonCoherent.

Precoding matrixes in the codebook subset of a codebook-based PUSCH determined by the user equipment (or base station) meet one of the following conditions: the quantity of antenna ports with non-zero power of any precoding matrix is equal to the quantity of antenna ports contained in an SRS resource for determining PUSCH transmission, and at least one corresponding layer of the antenna ports with the non-zero power in any two precoding matrixes are different; or the quantity of the antenna ports with the non-zero power of any precoding matrix is equal to the quantity of the antenna ports contained in the SRS resource for determining PUSCH transmission, and the antenna ports with the non-zero power of any two precoding matrixes are the same, but the transmission layer quantities of the two precoding matrixes are different.

The precoding matrixes contained by the codebook subset of the codebook-based PUSCH and determined by the user equipment (or base station) are as shown below.

When the number of transmission layers of two antenna ports is 1, the precoding matrixes contained in the codebook subset of the codebook-based PUSCH are precoding matrixes corresponding to TPMI index 2 in FIG. 1A.

When the number of transmission layers of two antenna ports is 2, the precoding matrixes contained in the codebook subset of the codebook-based PUSCH are precoding matrixes corresponding to TPMI index 0-1 in FIG. 1D (when an uplink transmission waveform is a CP-OFDM waveform).

When the number of transmission layers of four antenna ports is 1, the precoding matrixes contained in the codebook subset of the codebook-based PUSCH are precoding matrixes corresponding to TPMI index 12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 6 and 14 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 1 and 3 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0, 1 and 3 in FIG. 1G (when an uplink transmission waveform is a CP-OFDM waveform).

An overhead indicated by the precoding matrix and the number of transmission layers of the codebook-based PUSCH is: in the case of two antenna ports, the overhead indicated by the precoding matrix and the number of transmission layers of the codebook-based PUSCH is 2 bit; and in the case of the four antenna ports, the overhead indicated by the precoding matrix and the number of transmission layers of the codebook-based PUSCH is 3 bit.

An encoding mode indicated by the precoding matrix and the number of transmission layers of the codebook-based PUSCH is as shown in Table 8A.

TABLE 8A

Encoding mode indicated by the precoding matrix and the number of transmission layers of the codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 12 |
| 1 | 2 layers: TPMI = 0 | 1 | 2 layers: TPMI = 6 |
| 2 | 2 layers: TPMI = 1 | 2 | 2 layers: TPMI = 14 |
| 3 | Reserved | 3 | 3 layers: TPMI = 1 |
|   |   | 4 | 3 layers: TPMI = 3 |
|   |   | 5 | 4 layers: TPMI = 0 |
|   |   | 6 | 4 layers: TPMI = 1 |
|   |   | 7 | 4 layers: TPMI = 3 |

In a realizable scene, the base station sends maximum number of transmission layers information to the user equipment, and the user equipment receives the maximum number of transmission layers information, and determines second information based on the maximum number of transmission layers information. The maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 1 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 3 bit.

When the maximum number of transmission layers indicated by the maximum number of transmission layers information is 3, an overhead indicated by the precoding matrix and the number of transmission layers of the codebook-based PUSCH and corresponding to four antenna ports is 3 bit.

When the maximum number of transmission layers indicated by the maximum number of transmission layers information is 4, an overhead indicated by the precoding matrix and the number of transmission layers of the codebook-based PUSCH and corresponding to four antenna ports is 3 bit.

An encoding mode indicated by the precoding matrix and the number of transmission layers of the codebook-based PUSCH is as shown in Table 8B.

TABLE 8B

Encoding mode indicated by the precoding matrix and the
number of transmission layers of the codebook-based PUSCH

| maxRank = 1 | | | | maxRank = 2, or 3, or 4 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 12 | 0 | 1 layer: TPMI = 2 | 0 | 1 layer: TPMI = 12 |
| 1 | Reserved | 1 | Reserved | 1 | 2 layers: TPMI = 0 | 1 | 2 layers: TPMI = 6 |
| | | | | 2 | 2 layers: TPMI = 1 | 2 | 2 layers: TPMI = 14 |
| | | | | 3 | Reserved | 3 | 3 layers: TPMI = 1 |
| | | | | | | 4 | 3 layers: TPMI = 3 |
| | | | | | | 5 | 4 layers: TPMI = 0 |
| | | | | | | 6 | 4 layers: TPMI = 1 |
| | | | | | | 7 | 4 layers: TPMI = 3 |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 1 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 3, an overhead indicated by the precoding matrix and the number of transmission layers of the codebook-based PUSCH and corresponding to four antenna ports is 3 bit.

When the maximum number of transmission layers indicated by the maximum number of transmission layers information is 4, an overhead indicated by the precoding matrix and the number of transmission layers of the codebook-based PUSCH and corresponding to four antenna ports is 3 bit.

Another encoding mode indicated by the precoding matrix and the number of transmission layers of the codebook-based PUSCH is as shown in Table 8C and Table 8D.

TABLE 8D

Encoding mode indicated by precoding matrix and number
of transmission layers of codebook-based PUSCH

| maxRank = 3 | | maxRank = 4 | |
|---|---|---|---|
| Bit field mapped to index | Four ports | Bit field mapped to index | Four ports |
| 0 | 1 layer: TPMI = 12 | 0 | 1 layer: TPMI = 12 |
| 1 | 2 layers: TPMI = 6 | 1 | 2 layers: TPMI = 6 |
| 2 | 2 layers: TPMI = 14 | 2 | 2 layers: TPMI = 14 |
| 3 | 3 layers: TPMI = 1 | 3 | 3 layers: TPMI = 1 |
| 4 | 3 layers: TPMI = 3 | 4 | 3 layers: TPMI = 3 |
| 5-7 | Reserved | 5 | 4 layers: TPMI = 0 |
| | | 6 | 4 layers: TPMI = 1 |
| | | 7 | 4 layers: TPMI = 3 |

The example given in the above embodiment 7 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset not greater than the H layers, and H is an integer greater than or equal to 1.

Taking an example that H=1, the overhead indicated by the corresponding precoding matrix and number of transmission layers of the codebook-based PUSCH is: in the case of the two antenna ports, the overhead is 1 bit; and in the case of the four antenna ports, the overhead is 1 bit. An encoding mode indicated by the corresponding precoding matrix and number of transmission layers of the codebook-based PUSCH is as shown in Table 8E.

TABLE 8C

Encoding mode indicated by precoding matrix and number of transmission layers of codebook-based PUSCH

| maxRank = 1 | | | | maxRank = 2 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 12 | 0 | 1 layer: TPMI = 2 | 0 | 1 layer: TPMI = 12 |
| 1 | Reserved | 1 | Reserved | 1 | 2 layers: TPMI = 0 | 1 | 2 layers: TPMI = 6 |
| | | | | 2 | 2 layers: TPMI = 1 | 2 | 2 layers: TPMI = 14 |
| | | | | 3 | Reserved | 3 | Reserved |

TABLE 8E

Encoding mode indicated by precoding matrix and number
of transmission layers of codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 12 |
| 1 | Reserved | 1 | Reserved |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 8

A full power transmission capability reported by user equipment to a base station is the user equipment supporting full power transmission but at least one PA not supporting the full power transmission, and a coherent transmission capability reported by the user equipment is partialcoherent transmission; or the full power transmission capability reported by the user equipment is the user equipment supporting full power transmission but at least one PA not supporting the full power transmission, the full power transmission, codebook subset restriction corresponding to the coherent transmission capability reported by the user equipment is a partialcoherent codebook subset, for example, the pusch-TransCoherence reported by the user equipment is partialNonCoherent.

Precoding matrixes in the codebook subset of a codebook-based PUSCH determined by the user equipment (or base station) meets any one of the following conditions: the quantity of antenna ports with non-zero power of any precoding matrix is equal to the quantity of antenna ports included in an SRS resource for determining PUSCH transmission, and the at least one layer of the antenna ports with the non-zero power in any two precoding matrixes are different; or the quantity of the antenna ports with the non-zero power of any precoding matrix is equal to the quantity of the antenna ports included in the SRS resource for determining PUSCH transmission, and the antenna ports with the non-zero power of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining PUSCH transmission, and the antenna ports with the non-zero power and the transmission layer quantities of any two precoding matrixes are the same, but relative phases of at least one coherent transmission antenna group in the coherent transmission antenna groups corresponding to any two precoding matrixes are different.

The precoding matrixes contained by the codebook subset of the codebook-based PUSCH and determined by the user equipment (or base station) are as shown below.

When the number of transmission layers of four antenna ports is 1, the precoding matrixes contained in the codebook subset of the codebook-based PUSCH are precoding matrixes corresponding to TPMI index 12-15 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 6, 8, 11 and 13-15 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 1-4 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0-4 in FIG. 1G (when an uplink transmission waveform is a CP-OFDM waveform).

An overhead indicated by the precoding matrix and the number of transmission layers of the codebook-based PUSCH is: in the case of the four antenna ports, the overhead indicated by the precoding matrix and the number of transmission layers of the codebook-based PUSCH is 5 bit.

An encoding mode indicated by the precoding matrix and the number of transmission layers of the codebook-based PUSCH is as shown in Table 9A.

TABLE 9A

Encoding mode indicated by precoding matrix and number
of transmission layers of codebook-based PUSCH

| Bit field mapped to index | Four ports |
| --- | --- |
| 0 | 1 layer: TPMI = 12 |
| 1 | 1 layer: TPMI = 13 |
| 2 | 1 layer: TPMI = 14 |
| 3 | 1 layer: TPMI = 15 |
| 4 | 2 layers: TPMI = 6 |
| 5 | 2 layers: TPMI = 8 |
| 6 | 2 layers: TPMI = 11 |
| 7 | 2 layers: TPMI = 13 |
| 8 | 2 layers: TPMI = 14 |
| 9 | 2 layers: TPMI = 15 |
| 10 | 3 layers: TPMI = 1 |
| 11 | 3 layers: TPMI = 2 |
| 12 | 3 layers: TPMI = 3 |
| 13 | 3 layers: TPMI = 4 |
| 14 | 4 layers: TPMI = 0 |
| 15 | 4 layers: TPMI = 1 |
| 16 | 4 layers: TPMI = 2 |
| 17 | 4 layers: TPMI = 3 |
| 18 | 4 layers: TPMI = 4 |
| 19-31 | Reserved |

In a realizable scene, the base station sends maximum number of transmission layers information to the user equipment, and the user equipment receives the maximum number of transmission layers information, and determines second information based on the maximum number of transmission layers information. The maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 2 bit.

When the maximum number of transmission layers indicated by the maximum number of transmission layers information is 2, an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 5 bit.

When the maximum number of transmission layers indicated by the maximum number of transmission layers information is 4, an overhead indicated by the precoding matrix and the number of transmission layers of the codebook-based PUSCH and corresponding to four antenna ports is 5 bit.

A mode indicated by the precoding matrix and the number of transmission layers of the codebook-based PUSCH is as shown in Table 9B.

TABLE 9B

Mode indicated by precoding matrix and number of transmission layers of codebook-based PUSCH

| maxRank = 1 | | maxRank = 2, or 3, or 4 | |
|---|---|---|---|
| Bit field mapped to index | Four ports | Bit field mapped to index | Four ports |
| 0 | 1 layer: TPMI = 12 | 0 | 1 layer: TPMI = 12 |
| 1 | 1 layer: TPMI = 13 | 1 | 1 layer: TPMI = 13 |
| 2 | 1 layer: TPMI = 14 | 2 | 1 layer: TPMI = 14 |
| 3 | 1 layer: TPMI = 15 | 3 | 1 layer: TPMI = 15 |
| | | 4 | 2 layers: TPMI = 6 |
| | | 5 | 2 layers: TPMI = 8 |
| | | 6 | 2 layers: TPMI = 11 |
| | | 7 | 2 layers: TPMI = 13 |
| | | 8 | 2 layers: TPMI = 14 |
| | | 9 | 2 layers: TPMI = 15 |
| | | 10 | 3 layers: TPMI = 1 |
| | | 11 | 3 layers: TPMI = 2 |
| | | 12 | 3 layers: TPMI = 3 |
| | | 13 | 3 layers: TPMI = 4 |
| | | 14 | 4 layers: TPMI = 0 |
| | | 15 | 4 layers: TPMI = 1 |
| | | 16 | 4 layers: TPMI = 2 |
| | | 17 | 4 layers: TPMI = 3 |
| | | 18 | 4 layers: TPMI = 4 |
| | | 19-31 | Reserved |

An overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 2 bit.

When the maximum number of transmission layers indicated by the maximum number of transmission layers information is 2, an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 5 bit.

When the maximum number of transmission layers indicated by the maximum number of transmission layers information is 4, an overhead indicated by the precoding matrix and the number of transmission layers of the codebook-based PUSCH and corresponding to four antenna ports is 5 bit.

Another encoding mode indicated by the precoding matrix and the number of transmission layers of the codebook-based PUSCH is as shown in Table 9C.

TABLE 9C

Encoding mode indicated by precoding matrix and number of transmission layers of codebook-based PUSCH

| maxRank = 1 | | maxRank = 2 | | maxRank = 3 | | maxRank = 4 | |
|---|---|---|---|---|---|---|---|
| Bit field mapped to index | Four ports | Bit field mapped to index | Four ports | Bit field mapped to index | Four ports | Bit field mapped to index | Four ports |
| 0 | 1 layer: TPMI = 12 | 0 | 1 layer: TPMI = 12 | 0 | 1 layer: TPMI = 12 | 0 | 1 layer: TPMI = 12 |
| 1 | 1 layer: TPMI = 13 | 1 | 1 layer: TPMI = 13 | 1 | 1 layer: TPMI = 13 | 1 | 1 layer: TPMI = 13 |
| 2 | 1 layer: TPMI = 14 | 2 | 1 layer: TPMI = 14 | 2 | 1 layer: TPMI = 14 | 2 | 1 layer: TPMI = 14 |
| 3 | 1 layer: TPMI = 15 | 3 | 1 layer: TPMI = 15 | 3 | 1 layer: TPMI = 15 | 3 | 1 layer: TPMI = 15 |
| | | 4 | 2 layers: TPMI = 6 | 4 | 2 layers: TPMI = 6 | 4 | 2 layers: TPMI = 6 |
| | | 5 | 2 layers: TPMI = 8 | 5 | 2 layers: TPMI = 8 | 5 | 2 layers: TPMI = 8 |
| | | 6 | 2 layers: TPMI = 11 | 6 | 2 layers: TPMI = 11 | 6 | 2 layers: TPMI = 11 |
| | | 7 | 2 layers: TPMI = 13 | 7 | 2 layers: TPMI = 13 | 7 | 2 layers: TPMI = 13 |
| | | 8 | 2 layers: TPMI = 14 | 8 | 2 layers: TPMI = 14 | 8 | 2 layers: TPMI = 14 |
| | | 9 | 2 layers: TPMI = 15 | 9 | 2 layers: TPMI = 15 | 9 | 2 layers: TPMI = 15 |
| | | 10-15 | Reserved | 10 | 3 layers: TPMI = 1 | 10 | 3 layers: TPMI = 1 |
| | | | | 11 | 3 layers: TPMI = 2 | 11 | 3 layers: TPMI = 2 |

TABLE 9C-continued

Encoding mode indicated by precoding matrix and number of transmission layers of codebook-based PUSCH

| maxRank = 1 | maxRank = 2 | maxRank = 3 | | maxRank = 4 | |
| --- | --- | --- | --- | --- | --- |
| Bit field mapped to index Four ports | Bit field mapped to index Four ports | Bit field mapped to index | Four ports | Bit field mapped to index | Four ports |
| | | 12 | 3 layers: TPMI = 3 | 12 | 3 layers: TPMI = 3 |
| | | 13 | 3 layers: TPMI = 4 | 13 | 3 layers: TPMI = 4 |
| | | 14-15 | Reserved | 14 | 4 layers: TPMI = 0 |
| | | | | 15 | 4 layers: TPMI = 1 |
| | | | | 16 | 4 layers: TPMI = 2 |
| | | | | 17 | 4 layers: TPMI = 3 |
| | | | | 18 | 4 layers: TPMI = 4 |
| | | | | 19-31 | Reserved |

The example given in the above embodiment 8 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset not greater than the H layers, and H is an integer greater than or equal to 1.

Taking an example that H=1, the overhead indicated by the corresponding precoding matrix and number of transmission layers of the codebook-based PUSCH is: in the case of the four antenna ports, the overhead is 2 bit. An encoding mode indicated by the corresponding precoding matrix and number of transmission layers of the codebook-based PUSCH is as shown in Table 9D.

TABLE 9D

Encoding mode indicated by precoding matrix and number of transmission layers of codebook-based PUSCH

| Bit field mapped to index | Four ports |
| --- | --- |
| 0 | 1 layer: TPMI = 12 |
| 1 | 1 layer: TPMI = 13 |
| 2 | 1 layer: TPMI = 14 |
| 3 | 1 layer: TPMI = 15 |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 9

A full power transmission capability reported by user equipment to a base station is the user equipment supporting full power transmission but at least one PA not supporting the full power transmission, and a coherent transmission capability reported by the user equipment is fullcoherent transmission; or the full power transmission capability reported by the user equipment is supporting, by the user equipment, the full power transmission, but not supporting, by at least one PA, the full power transmission, codebook subset restriction corresponding to the coherent transmission capability reported by the user equipment is a fullcoherent codebook subset, for example, the pusch-TransCoherence reported by a terminal is fullCoherent.

Precoding matrixes in the codebook subset of a codebook-based PUSCH determined by the user equipment (or base station) meets any one of the following conditions: the quantity of antenna ports with non-zero power of any precoding matrix is equal to the quantity of antenna ports included in an SRS resource for determining PUSCH transmission, and the at least one layer of the antenna ports with the non-zero power in any two precoding matrixes are different; the quantity of the antenna ports with the non-zero power of any precoding matrix is equal to the quantity of the antenna ports included in the SRS resource for determining PUSCH transmission, and the antenna ports with the non-zero power of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining PUSCH transmission, and the antenna ports with the non-zero power and the transmission layer quantities of any two precoding matrixes are the same, but relative phases of at least one coherent transmission antenna group in the coherent transmission antenna groups corresponding to any two precoding matrixes are different.

The precoding matrixes contained by the codebook subset of the codebook-based PUSCH and determined by the user equipment (or base station) are as shown below.

When the number of transmission layers of two antenna ports is 1, the precoding matrixes contained in the codebook subset of the codebook-based PUSCH are precoding matrixes corresponding to TPMI index 2-5 in FIG. 1A.

When the number of transmission layers of two antenna ports is 2, the precoding matrixes contained in the codebook subset of the codebook-based PUSCH are precoding matrixes corresponding to TPMI index 0-2 in FIG. 1D (when an uplink transmission waveform is a CP-OFDM waveform).

When the number of transmission layers of four antenna ports is 1, the precoding matrixes contained in the codebook subset of the codebook-based PUSCH are precoding matrixes corresponding to TPMI index 12-27 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 6-21 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 1-6 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0-4 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 3 bit; and in the case of the four antenna ports, the overhead indicated by the precoding matrix and the number of transmission layers of the codebook-based PUSCH is 6 bit.

An encoding mode indicated by the precoding matrix and the number of transmission layers of the codebook-based PUSCH is as shown in Table 10A.

TABLE 10A

Encoding mode indicated by precoding matrix and number of transmission layers of codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 12 |
| 1 | 1 layer: TPMI = 3 | . . . | .. |
| 2 | 1 layer: TPMI = 4 | 15 | 1 layer: TPMI = 27 |
| 3 | 1 layer: TPMI = 5 | 16 | 2 layers: TPMI = 6 |
| 4 | 2 layers: TPMI = 0 | . . . | . . . |
| 5 | 2 layers: TPMI = 1 | 31 | 2 layers: TPMI = 21 |
| 6 | 2 layers: TPMI = 2 | 32 | 3 layers: TPMI = 1 |
| 7 | Reserved | 33 | 3 layers: TPMI = 2 |
|  |  | 34 | 3 layers: TPMI = 3 |
|  |  | 35 | 3 layers: TPMI = 4 |
|  |  | 36 | 3 layers: TPMI = 5 |
|  |  | 37 | 3 layers: TPMI = 6 |
|  |  | 38 | 4 layers: TPMI = 0 |
|  |  | 39 | 4 layers: TPMI = 1 |
|  |  | 40 | 4 layers: TPMI = 2 |
|  |  | 41 | 4 layers: TPMI = 3 |
|  |  | 42 | 4 layers: TPMI = 4 |
|  |  | 43-63 | Reserved |

In the above Table 10A, " . . . " represents that with progressive increase of a numerical value of mapping from the bit field to the index, an index value corresponding to TPMI is progressively increased on the basis of a TPMI index value shown in the previous row. For example, when the numerical value of mapping from the bit field to the serial number is 1, the index value corresponding to layer-1 TPMI is 13. For another example, when the numerical value of mapping from the bit field to the serial number is 30, the index value corresponding to layer-2 TPMI is 20. The " . . . " in subsequent embodiments has the same meaning, which is not repeated in the present disclosure.

In a realizable scene, the base station sends maximum number of transmission layers information to the user equipment, and the user equipment receives the maximum number of transmission layers information, and determines second information based on the maximum number of transmission layers information. The maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to two antenna ports is 3 bit; and an overhead indicated by the precoding matrix and the number of transmission layers of the codebook-based PUSCH and corresponding to four antenna ports is 6 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

An encoding mode indicated by the precoding matrix and the number of transmission layers of the codebook-based PUSCH is as shown in Table 10B.

TABLE 10B

Encoding mode indicated by precoding matrix and number of transmission layers of codebook-based PUSCH

| maxRank = 1 | | | | maxRank = 2, or 3, or 4 | | | |
| --- | --- | --- | --- | --- | --- | --- | --- |
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 12 | 0 | 1 layer: TPMI = 2 | 0 | 1 layer: TPMI = 12 |
| . . . | . . . | . . . | . . . | . . . | . . . | . . . | . . . |
| 3 | 1 layer: TPMI = 5 | 15 | 1 layer: TPMI = 27 | 3 | 1 layer: TPMI = 5 | 15 | 1 layer: TPMI = 27 |
|  |  |  |  | 4 | 2 layers: TPMI = 0 | 16 | 2 layers: TPMI = 6 |
|  |  |  |  | . . . | . . . | . . . | . . . |

TABLE 10B-continued

Encoding mode indicated by precoding matrix and number of transmission layers of codebook-based PUSCH

| maxRank = 1 | | maxRank = 2, or 3, or 4 | |
| --- | --- | --- | --- |
| Bit field mapped to index Two ports | Bit field mapped to index Four ports | Bit field mapped to index Two ports | Bit field mapped to index Four ports |
| | | 6  2 layers: TPMI = 2 | 31  2 layers: TPMI = 21 |
| | | 7  Reserved | 32  3 layers: TPMI = 1 |
| | | | . . .  . . . |
| | | | 37  3 layers: TPMI = 6 |
| | | | 38  4 layers: TPMI = 0 |
| | | | . . .  . . . |
| | | | 42  4 layers: TPMI = 4 |
| | | | 43-63  Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to two antenna ports is 3 bit; and an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

Another encoding mode indicated by the precoding matrix and the number of transmission layers of the codebook-based PUSCH is as shown in Table 10C and Table 10D.

TABLE 10C

Encoding mode indicated by precoding matrix and number of transmission layers of codebook-based PUSCH

| maxRank = 1 | | maxRank = 2 | |
| --- | --- | --- | --- |
| Bit field mapped to index Two ports | Bit field mapped to index Four ports | Bit field mapped to index Two ports | Bit field mapped to index Four ports |
| 0  1 layer: TPMI = 2 | 0  1 layer: TPMI = 12 | 0  1 layer: TPMI = 2 | 0  1 layer: TPMI = 12 |
| . . . | . . .  . . . | . . .  . . . | . . .  . . . |
| 3  1 layer: TPMI = 5 | 15  1 layer: TPMI = 27 | 3  1 layer: TPMI = 5 | 15  1 layer: TPMI = 27 |
| | | 4  2 layers: TPMI = 0 | 16  2 layers: TPMI = 6 |
| | | . . .  . . . | . . .  . . .h |
| | | 6  2 layers: TPMI = 2 | 31  2 layers: TPMI = 21 |
| | | 7  Reserved | |

TABLE 10D

Encoding mode indicated by precoding matrix and number of transmission layers of codebook-based PUSCH

| maxRank = 3 | | maxRank = 4 | |
| --- | --- | --- | --- |
| Bit field mapped to index | Four ports | Bit field mapped to index | Four ports |
| 0 | 1 layer: TPMI = 12 | 0 | 1 layer: TPMI = 12 |
| . . . | . . . | . . . | . . . |
| 15 | 1 layer: TPMI = 27 | 15 | 1 layer: TPMI = 27 |
| 16 | 2 layers: TPMI = 6 | 16 | 2 layers: TPMI = 6 |
| . . . | . . . | . . . | . . . |
| 31 | 2 layers: TPMI = 21 | 31 | 2 layers: TPMI = 21 |
| 32 | 3 layers: TPMI = 1 | 32 | 3 layers: TPMI = 1 |
| . . . | . . . | . . . | . . . |
| 37 | 3 layers: TPMI = 6 | 37 | 3 layers: TPMI = 6 |
| 38-63 | Reserved | 38 | 4 layers: TPMI = 0 |
| | | . . . | . . . |
| | | 42 | 4 layers: TPMI = 4 |
| | | 43-63 | Reserved |

The example given in the above embodiment 9 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset not greater than the H layers, and H is an integer greater than or equal to 1.

Taking an example that H=1, the overhead indicated by the corresponding precoding matrix and number of transmission layers of the codebook-based PUSCH is: in the case of the two antenna ports, the overhead is 1 bit; and in the case of the four antenna ports, the overhead is 4 bit. An encoding mode indicated by the corresponding precoding matrix and number of transmission layers of the codebook-based PUSCH is as shown in Table 10E.

TABLE 10E

Encoding mode indicated by precoding matrix and number of transmission layers of codebook-based PUSCH

| Bit field mapped to index | Two ports | Bit field mapped to index | Four ports |
|---|---|---|---|
| 0 | 1 layer: TPMI = 2 | 0 | 1 layer: TPMI = 12 |
| 1 | 1 layer: TPMI = 3 | 1 | 1 layer: TPMI = 13 |
| 2 | 1 layer: TPMI = 4 | 2 | 1 layer: TPMI = 14 |
| 3 | 1 layer: TPMI = 5 | 3 | 1 layer: TPMI = 15 |
|   |   | 4 | 1 layer: TPMI = 16 |
|   |   | 5 | 1 layer: TPMI = 17 |
|   |   | 6 | 1 layer: TPMI = 18 |
|   |   | 7 | 1 layer: TPMI = 19 |
|   |   | 8 | 1 layer: TPMI = 20 |
|   |   | 9 | 1 layer: TPMI = 21 |
|   |   | 10 | 1 layer: TPMI = 22 |
|   |   | 11 | 1 layer: TPMI = 23 |
|   |   | 12 | 1 layer: TPMI = 24 |
|   |   | 13 | 1 layer: TPMI = 25 |
|   |   | 14 | 1 layer: TPMI = 26 |
|   |   | 15 | 1 layer: TPMI = 27 |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 10

A full power transmission capability reported by user equipment to a base station is the user equipment supporting full power transmission but at least one PA not supporting the full power transmission, and a coherent transmission capability reported by the user equipment is noncoherent transmission; or the full power transmission capability reported by the user equipment is the user equipment supporting full power transmission but at least one PA not supporting the full power transmission, codebook subset restriction corresponding to the coherent transmission capability reported by the user equipment is a noncoherent codebook subset, for example, the pusch-TransCoherence reported by the user equipment is nonCoherent; and the codebook subset includes a codebook subset composed of noncoherent transmission codebooks and a first precoding set.

Precoding matrixes in the first precoding set meet one of the following conditions: the quantity of antenna ports with non-zero power of any precoding matrix is equal to the quantity of antenna ports included in an SRS resource for determining PUSCH transmission, and at least one corresponding layer of the antenna ports with the non-zero power in any two precoding matrixes are different; or the quantity of the antenna ports with the non-zero power of any precoding matrix is equal to the quantity of the antenna ports included in the SRS resource for determining PUSCH transmission, and the antenna ports with the non-zero power of any two precoding matrixes are the same, but the transmission layer quantities of any two precoding matrixes are different.

The precoding matrixes contained by the codebook subset of the codebook-based PUSCH and determined by the user equipment (or base station) are as shown below.

When the number of transmission layers of two antenna ports is 1, the precoding matrixes contained in the codebook subset of the codebook-based PUSCH are precoding matrixes corresponding to TPMI index 0-2 in FIG. 1A.

When the number of transmission layers of two antenna ports is 2, the precoding matrixes contained in the codebook subset of the codebook-based PUSCH are precoding matrixes corresponding to TPMI index 0-1 in FIG. 1D (when an uplink transmission waveform is a CP-OFDM waveform).

When the number of transmission layers of four antenna ports is 1, the precoding matrixes contained in the codebook subset of the codebook-based PUSCH are precoding matrixes corresponding to TPMI index 0-3 and 12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 0-5 and 14 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 0, 1 and 3 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0, 1 and 3 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 3 bit; and in the case of the four antenna ports, the overhead indicated by the precoding matrix and the number of transmission layers of the codebook-based PUSCH is 5 bit.

An encoding mode indicated by the precoding matrix and the number of transmission layers of the codebook-based PUSCH is as shown in Table 11A.

TABLE 11A

Encoding mode indicated by precoding matrix and number of transmission layers of codebook-based PUSCH

| Bit field mapped to index | Four ports | Bit field mapped to index | Four ports |
|---|---|---|---|
| 0 | 1 layer: TPMI = 0 | 0 | 1 layer: TPMI = 0 |
| 1 | 1 layer: TPMI = 1 | . . . | . . . |

TABLE 11A-continued

Encoding mode indicated by precoding matrix and number of transmission layers of codebook-based PUSCH

| Bit field mapped to index | Four ports | Bit field mapped to index | Four ports |
|---|---|---|---|
| 2 | 1 layer: TPMI = 2 | 3 | 1 layer: TPMI = 3 |
| 3 | 2 layers: TPMI = 0 | 4 | 1 layer: TPMI = 12 |
| 4 | 2 layers: TPMI = 1 | 5 | 2 layers: TPMI = 0 |
| 5-7 | Reserved | ... | ... |
| | | 10 | 2 layers: TPMI = 5 |
| | | 11 | 2 layers: TPMI = 14 |
| | | 12 | 3 layers: TPMI = 0 |
| | | 13 | 3 layers: TPMI = 1 |
| | | 14 | 3 layers: TPMI = 3 |
| | | 15 | 4 layers: TPMI = 0 |
| | | 16 | 4 layers: TPMI = 1 |
| | | 17 | 4 layers: TPMI = 3 |
| | | 18-31 | Reserved |

In a realizable scene, the base station sends maximum number of transmission layers information to the user equipment, and the user equipment receives the maximum number of transmission layers information, and determines second information based on the maximum number of transmission layers information. The maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 3 bit.

When the maximum number of transmission layers indicated by the maximum number of transmission layers information is 2, an overhead indicated by the precoding matrix and the number of transmission layers of the codebook-based PUSCH and corresponding to two antenna ports is 3 bit; and an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 5 bit.

When the maximum number of transmission layers indicated by the maximum number of transmission layers information is 4, an overhead indicated by the precoding matrix and the number of transmission layers of the codebook-based PUSCH and corresponding to four antenna ports is 5 bit.

An encoding mode indicated by the precoding matrix and the number of transmission layers of the codebook-based PUSCH is as shown in Table 11B.

TABLE 11B

Encoding mode indicated by precoding matrix and number of transmission layers of codebook-based PUSCH

| maxRank = 1 | | | | maxRank = 2, or 3, or 4 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 0 | 0 | 1 layer: TPMI = 0 | 0 | 1 layer: TPMI = 0 | 0 | 1 layer: TPMI = 0 |
| 1 | 1 layer: TPMI = 1 | ... | ... | 1 | 1 layer: TPMI = 1 | ... | ... |
| 2 | 1 layer: TPMI = 2 | 3 | 1 layer: TPMI = 3 | 2 | 1 layer: TPMI = 2 | 3 | 1 layer: TPMI = 3 |
| 3 | Reserved | 4 | 1 layer: TPMI = 12 | 3 | 2 layers: TPMI = 0 | 4 | 1 layer: TPMI = 12 |
| | | 5-7 | Reserved | 4 | 2 layers: TPMI = 1 | 5 | 2 layers: TPMI = 0 |
| | | | | 5-7 | Reserved | ... | ... |
| | | | | | | 10 | 2 layers: TPMI = 5 |
| | | | | | | 11 | 2 layers: TPMI = 14 |
| | | | | | | 12 | 3 layers: TPMI = 0 |
| | | | | | | 13 | 3 layers: TPMI = 1 |
| | | | | | | 14 | 3 layers: TPMI = 3 |
| | | | | | | 15 | 4 layers: TPMI = 0 |
| | | | | | | 16 | 4 layers: TPMI = 1 |
| | | | | | | 17 | 4 layers: TPMI = 3 |
| | | | | | | 18-31 | Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 3 bit.

When the maximum number of transmission layers indicated by the maximum number of transmission layers information is 2, an overhead indicated by the precoding matrix and the number of transmission layers of the codebook-based PUSCH and corresponding to two antenna ports is 3 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 4 bit.

When the maximum number of transmission layers indicated by the maximum number of transmission layers information is 4, an overhead indicated by the precoding matrix and the number of transmission layers of the codebook-based PUSCH and corresponding to four antenna ports is 5 bit.

Another encoding mode indicated by the precoding matrix and the number of transmission layers of the codebook-based PUSCH is as shown in Table 11C and Table 11D.

greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, the overhead indicated by the corresponding precoding matrix and number of transmission layers of the codebook-based PUSCH is: in the case of the two antenna ports, the overhead is 2 bit; and in the case of the four antenna ports, the overhead is 3 bit. An encoding mode indicated by the corresponding precoding matrix and number of transmission layers of the codebook-based PUSCH is as shown in Table 11E.

TABLE 11C

Encoding mode indicated by precoding matrix and number of transmission layers of codebook-based PUSCH

| maxRank = 1 | | | | maxRank = 2 | | | |
| --- | --- | --- | --- | --- | --- | --- | --- |
| Bit field mapped to index | Two ports | Bit field mapped to index | Four ports | Bit field mapped to index | Two ports | Bit field mapped to index | Four ports |
| 0 | 1 layer: TPMI = 0 | 0 | 1 layer: TPMI = 0 | 0 | 1 layer: TPMI = 0 | 0 | 1 layer: TPMI = 0 |
| 1 | 1 layer: TPMI = 1 | ... | ... | 1 | 1 layer: TPMI = 1 | ... | ... |
| 2 | 1 layer: TPMI = 2 | 3 | 1 layer: TPMI = 3 | 2 | 1 layer: TPMI = 2 | 3 | 1 layer: TPMI = 3 |
| 3 | Reserved | 4 | 1 layer: TPMI = 12 | 3 | 2 layers: TPMI = 0 | 4 | 1 layer: TPMI = 12 |
| | | 5-7 | Reserved | 4 | 2 layers: TPMI = 1 | 5 | 2 layers: TPMI = 0 |
| | | | | 5-7 | Reserved | ... | ... |
| | | | | | | 10 | 2 layers: TPMI = 5 |
| | | | | | | 11 | 2 layers: TPMI = 14 |
| | | | | | | 12-15 | Reserved |

TABLE 11D

Encoding mode indicated by the precoding matrix and the number of transmission layers of the codebook-based PUSCH

| maxRank = 3 | | maxRank = 4 | |
| --- | --- | --- | --- |
| Bit field mapped to index | Four ports | Bit field mapped to index | Four ports |
| 0 | 1 layer: TPMI = 0 | 0 | 1 layer: TPMI = 0 |
| ... | ... | ... | ... |
| 3 | 1 layer: TPMI = 3 | 3 | 1 layer: TPMI = 3 |
| 4 | 1 layer: TPMI = 12 | 4 | 1 layer: TPMI = 12 |
| 5 | 2 layers: TPMI = 0 | 5 | 2 layers: TPMI = 0 |
| ... | ... | ... | ... |
| 10 | 2 layers: TPMI = 5 | 10 | 2 layers: TPMI = 5 |
| 11 | 2 layers: TPMI = 14 | 11 | 2 layers: TPMI = 14 |
| 12 | 3 layers: TPMI = 0 | 12 | 3 layers: TPMI = 0 |
| 13 | 3 layers: TPMI = 1 | 13 | 3 layers: TPMI = 1 |
| 14 | 3 layers: TPMI = 3 | 14 | 3 layers: TPMI = 3 |
| 15 | Reserved | 15 | 4 layers: TPMI = 0 |
| | | 16 | 4 layers: TPMI = 1 |
| | | 17 | 4 layers: TPMI = 3 |
| | | 18-31 | Reserved |

TABLE 11E

Encoding mode indicated by precoding matrix and number of transmission layers of codebook-based PUSCH

| Bit field mapped to index | Two ports | Bit field mapped to index | Four ports |
| --- | --- | --- | --- |
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | 2 | 1 layer: TPMI = 2 |
| 3 | Reserved | 3 | 1 layer: TPMI = 3 |
| | | 4 | 1 layer: TPMI = 12 |
| | | 5-7 | Reserved |

The example given in the above embodiment 10 is that the codebook subset restriction includes the precoding matrixes with all the layer quantities.

In one embodiment, the codebook subset only includes the precoding matrixes of which the number of layers is not In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 11

A full power transmission capability reported by user equipment to a base station is the user equipment supporting full power transmission but at least one PA not supporting the full power transmission, and a coherent transmission capability reported by the user equipment is partialcoherent transmission; or the full power transmission capability reported by the user equipment is the user equipment supporting full power transmission but at least one PA not supporting the full power transmission, codebook subset restriction corresponding to the coherent transmission capability reported by the user equipment is a noncoherent codebook subset, for example, pusch-TransCoherence reported by the user equipment is partialNonCoherent; and the codebook subset includes a codebook subset composed of noncoherent transmission codewords, a codebook subset composed of partialcoherent transmission codewords and a second precoding set.

Precoding matrixes in the second precoding set meet any one of the following conditions: the quantity of antenna ports with non-zero power of any precoding matrix is equal to the quantity of antenna ports included in an SRS resource for determining PUSCH transmission, and the at least one layer of the antenna ports with the non-zero power in any two precoding matrixes are different; the quantity of the antenna ports with the non-zero power of any precoding matrix is equal to the quantity of the antenna ports included in the SRS resource for determining PUSCH transmission, the antenna ports with the non-zero power of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining PUSCH transmission, the antenna ports with the non-zero power and the transmission layer quantities of any two precoding matrixes are the same, but relative phases of at least one coherent transmission antenna group in coherent transmission antenna groups corresponding to any two precoding matrixes are different.

The precoding matrixes contained by the codebook subset of the codebook-based PUSCH and determined by the user equipment (or base station) are shown below.

When the number of transmission layers of four antenna ports is 1, the precoding matrixes contained in the codebook subset of the codebook-based PUSCH are precoding matrixes corresponding to TPMI index 0-15 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 0-15 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 0-4 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0-4 in FIG. 1G (when an uplink transmission waveform is a CP-OFDM waveform).

An overhead indicated by the precoding matrix and the number of transmission layers of the codebook-based PUSCH is: in the case of the four antenna ports, the overhead indicated by the precoding matrix and the number of transmission layers of the codebook-based PUSCH is 6 bit.

An encoding mode indicated by the precoding matrix and the number of transmission layers of the codebook-based PUSCH is shown in Table 12A.

TABLE 12A

Encoding mode indicated by precoding matrix and number of transmission layers of codebook-based PUSCH

| Bit field mapped to index | Four ports |
|---|---|
| 0 | 1 layer: TPMI = 0 |
| ... | ... |
| 15 | 1 layer: TPMI = 15 |
| 16 | 2 layers: TPMI = 0 |
| ... | ... |
| 31 | 2 layers: TPMI = 15 |
| 32 | 3 layers: TPMI = 0 |
| ... | ... |
| 36 | 3 layers: TPMI = 4 |
| 37 | 4 layers: TPMI = 0 |
| ... | ... |
| 41 | 4 layers: TPMI = 4 |
| 42-63 | Reserved |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to four antenna ports is 6 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

An encoding mode indicated by the precoding matrix and the number of transmission layers of the codebook-based PUSCH is as shown in Table 12B.

TABLE 12B

Encoding mode indicated by precoding matrix and number of transmission layers of codebook-based PUSCH

| maxRank = 1 | | maxRank = 2, or 3, or 4 | |
|---|---|---|---|
| Bit field mapped to index | Four ports | Bit field mapped to index | Four ports |
| 0 | 1 layer: TPMI = 0 | 0 | 1 layer: TPMI = 0 |
| ... | ... | ... | ... |
| 15 | 1 layer: TPMI = 15 | 15 | 1 layer: TPMI = 15 |
| | | 16 | 2 layers: TPMI = 0 |
| | | ... | ... |
| | | 31 | 2 layers: TPMI = 15 |
| | | 32 | 3 layers: TPMI = 0 |
| | | ... | ... |
| | | 36 | 3 layers: TPMI = 4 |

TABLE 12B-continued

Encoding mode indicated by precoding matrix and number of transmission layers of codebook-based PUSCH

| maxRank = 1 | | maxRank = 2, or 3, or 4 | |
|---|---|---|---|
| Bit field mapped to index | Four ports | Bit field mapped to index | Four ports |
| | | 37 | 4 layers: TPMI = 0 |
| | | ... | ... |
| | | 41 | 4 layers: TPMI = 4 |
| | | 42-63 | Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

Another encoding mode indicated by the precoding matrix and the number of transmission layers of the codebook-based PUSCH is as shown in Table 12C.

TABLE 12C

Encoding mode indicated by precoding matrix and number of transmission layers of codebook-based PUSCH

| maxRank = 1 | | maxRank = 2 | | maxRank = 3 | | maxRank = 4 | |
|---|---|---|---|---|---|---|---|
| Bit field mapped to index | Four ports | Bit field mapped to index | Four ports | Bit field mapped to index | Four ports | Bit field mapped to index | Four ports |
| 0 | 1 layer: TPMI = 0 | 0 | 1 layer: TPMI = 0 | 0 | 1 layer: TPMI = 0 | 0 | 1 layer: TPMI = 0 |
| ... | ... | ... | ... | ... | ... | ... | ... |
| 15 | 1 layer: TPMI = 15 | 15 | 1 layer: TPMI = 15 | 15 | 1 layer: TPMI = 15 | 15 | 1 layer: TPMI = 15 |
| | | 16 | 2 layers: TPMI = 0 | 16 | 2 layers: TPMI = 0 | 16 | 2 layers: TPMI = 0 |
| | | ... | ... | ... | ... | ... | ... |
| | | 31 | 2 layers: TPMI = 15 | 31 | 2 layers: TPMI = 15 | 31 | 2 layers: TPMI = 15 |
| | | | | 32 | 3 layers: TPMI = 0 | 32 | 3 layers: TPMI = 0 |
| | | | | ... | ... | ... | ... |
| | | | | 36 | 3 layers: TPMI = 4 | 36 | 3 layers: TPMI = 4 |
| | | | | 37-63 | Reserved | 37 | 4 layers: TPMI = 0 |
| | | | | | | ... | ... |
| | | | | | | 41 | 4 layers: TPMI = 4 |
| | | | | | | 42-63 | Reserved |

The example given in the above embodiment 11 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, an overhead indicated by the corresponding precoding matrix and number of transmission layers of the codebook-based PUSCH is: in the case of the four antenna ports, the overhead is 4 bit. An encoding mode indicated by the corresponding precoding matrix and number of transmission layers of the codebook-based PUSCH is shown in Table 12D.

TABLE 12D

Encoding mode indicated by precoding matrix and number of transmission layers of codebook-based PUSCH

| Bit field mapped to index | Four ports |
|---|---|
| 0 | 1 layer: TPMI = 0 |
| 1 | 1 layer: TPMI = 1 |

TABLE 12D-continued

Encoding mode indicated by precoding matrix and number
of transmission layers of codebook-based PUSCH

| Bit field mapped to index | Four ports |
|---|---|
| 2 | 1 layer: TPMI = 2 |
| 3 | 1 layer: TPMI = 3 |
| 4 | 1 layer: TPMI = 4 |
| 5 | 1 layer: TPMI = 5 |
| 6 | 1 layer: TPMI = 6 |
| 7 | 1 layer: TPMI = 7 |
| 8 | 1 layer: TPMI = 8 |
| 9 | 1 layer: TPMI = 9 |
| 10 | 1 layer: TPMI = 10 |
| 11 | 1 layer: TPMI = 11 |
| 12 | 1 layer: TPMI = 12 |
| 13 | 1 layer: TPMI = 13 |
| 14 | 1 layer: TPMI = 14 |
| 15 | 1 layer: TPMI = 15 |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 12

A full power transmission capability reported by user equipment to a base station is the user equipment supporting full power transmission but at least one PA not supporting the full power transmission, and a coherent transmission capability reported by the user equipment is partialcoherent transmission; or the full power transmission capability reported by the user equipment the user equipment supporting full power transmission but at least one PA not supporting the full power transmission, codebook subset restriction corresponding to the coherent transmission capability reported by the user equipment is a partialcoherent codebook subset, for example, pusch-TransCoherence reported by the user equipment is partialNonCoherent; and the codebook subset includes a codebook subset composed of non-coherent transmission codewords, a codebook subset composed of partialcoherent transmission codewords and a first precoding set.

Precoding matrixes in the first precoding set meet one of the following conditions: the quantity of antenna ports with non-zero power of any precoding matrix is equal to the quantity of antenna ports included in an SRS resource for determining PUSCH transmission, and at least one corresponding layer of the antenna ports with the non-zero power in any two precoding matrixes are different; or the quantity of the antenna ports with the non-zero power of any precoding matrix is equal to the quantity of the antenna ports included in the SRS resource for determining PUSCH transmission, the antenna ports with the non-zero power of any two precoding matrixes are the same, but the transmission layer quantities of any two precoding matrixes are different.

The precoding matrixes contained by the codebook subset of the codebook-based PUSCH and determined by the user equipment (or base station) are shown below.

When the number of transmission layers of four antenna ports is 1, the precoding matrixes contained in the codebook subset of the codebook-based PUSCH are precoding matrixes corresponding to TPMI index 0-12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 0-13 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 0-2 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0-2 in FIG. 1G (when an uplink transmission waveform is a CP-OFDM waveform).

An overhead indicated by the precoding matrix and the number of transmission layers of the codebook-based PUSCH is: in the case of the four antenna ports, the overhead indicated by the precoding matrix and the number of transmission layers of the codebook-based PUSCH is 6 bit.

An encoding mode indicated by the precoding matrix and the number of transmission layers of the codebook-based PUSCH is as shown in Table 13A.

TABLE 13A

Encoding mode indicated by precoding matrix and number
of transmission layers of codebook-based PUSCH

| Bit field mapped to index | Four ports |
|---|---|
| 0 | 1 layer: TPMI = 0 |
| ... | ... |
| 12 | 1 layer: TPMI = 12 |
| 13 | 2 layers: TPMI = 0 |
| ... | ... |
| 26 | 2 layers: TPMI = 13 |
| 27 | 3 layers: TPMI = 0 |
| ... | ... |
| 29 | 3 layers: TPMI = 2 |
| 30 | 4 layers: TPMI = 0 |
| ... | ... |
| 32 | 4 layers: TPMI = 2 |
| 33-63 | Reserved |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to four antenna ports is 6 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

An encoding mode indicated by the precoding matrix and the number of transmission layers of the codebook-based PUSCH is as shown in Table 13B.

TABLE 13B

Encoding mode indicated by precoding matrix and number of transmission layers of codebook-based PUSCH

| maxRank = 1 | | maxRank = 2, or 3, or 4 | |
| --- | --- | --- | --- |
| Bit field mapped to index | PartialCoherent UE | Bit field mapped to index | PartialCoherent UE |
| 0 | 1 layer: TPMI = 0 | 0 | 1 layer: TPMI = 0 |
| ... | ... | ... | ... |
| 12 | 1 layer: TPMI = 12 | 12 | 1 layer: TPMI = 12 |
| 13-15 | Reserved | 13 | 2 layers: TPMI = 0 |
| | | ... | ... |
| | | 26 | 2 layers: TPMI = 13 |
| | | 27 | 3 layers: TPMI = 0 |
| | | ... | ... |
| | | 29 | 3 layers: TPMI = 2 |
| | | 30 | 4 layers: TPMI = 0 |
| | | ... | ... |
| | | 32 | 4 layers: TPMI = 2 |
| | | 33-63 | Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

Another encoding mode indicated by the precoding matrix and the number of transmission layers of the codebook-based PUSCH is as shown in Table 13C.

TABLE 13C

Encoding mode indicated by precoding matrix and number of transmission layers of codebook-based PUSCH

| maxRank = 1 | | maxRank = 2 | | maxRank = 3 | | maxRank = 4 | |
| --- | --- | --- | --- | --- | --- | --- | --- |
| Bit field mapped to index | Four ports | Bit field mapped to index | Four ports | Bit field mapped to index | Four ports | Bit field mapped to index | Four ports |
| 0 | 1 layer: TPMI = 0 | 0 | 1 layer: TPMI = 0 | 0 | 1 layer: TPMI = 0 | 0 | 1 layer: TPMI = 0 |
| ... | ... | ... | ... | ... | ... | ... | ... |
| 12 | 1 layer: TPMI = 12 | 12 | 1 layer: TPMI = 12 | 12 | 1 layer: TPMI = 12 | 12 | 1 layer: TPMI = 12 |
| 13-15 | Reserved | 13 | 2 layers: TPMI = 0 | 13 | 2 layers: TPMI = 0 | 13 | 2 layers: TPMI = 0 |
| | | ... | ... | ... | ... | ... | ... |
| | | 26 | 2 layers: TPMI = 13 | 26 | 2 layers: TPMI = 13 | 26 | 2 layers: TPMI = 13 |
| | | 27-31 | Reserved | 27 | 3 layers: TPMI = 0 | 27 | 3 layers: TPMI = 0 |
| | | | | ... | ... | ... | ... |
| | | | | 29 | 3 layers: TPMI = 2 | 29 | 3 layers: TPMI = 2 |
| | | | | 30-31 | Reserved | 30 | 4 layers: TPMI = 0 |
| | | | | | | ... | ... |
| | | | | | | 32 | 4 layers: TPMI = 2 |
| | | | | | | 33-63 | Reserved |

The example given in the above embodiment 12 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, an overhead indicated by the corresponding precoding matrix and number of transmission layers of the codebook-based PUSCH is: in the case of the four antenna ports, the overhead is 4 bit. An encoding mode indicated by the corresponding precoding matrix and number of transmission layers of the codebook-based PUSCH is shown in Table 13D.

TABLE 13D

Encoding mode indicated by precoding matrix and number of transmission layers of codebook-based PUSCH

| Bit field mapped to index | Four ports |
| --- | --- |
| 0 | 1 layer: TPMI = 0 |
| 1 | 1 layer: TPMI = 1 |
| 2 | 1 layer: TPMI = 2 |
| 3 | 1 layer: TPMI = 3 |
| 4 | 1 layer: TPMI = 4 |
| 5 | 1 layer: TPMI = 5 |
| 6 | 1 layer: TPMI = 6 |
| 7 | 1 layer: TPMI = 7 |
| 8 | 1 layer: TPMI = 8 |
| 9 | 1 layer: TPMI = 9 |
| 10 | 1 layer: TPMI = 10 |
| 11 | 1 layer: TPMI = 11 |
| 12 | 1 layer: TPMI = 12 |
| 13-15 | Reserved |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 13

A full power transmission capability reported by user equipment to a base station is the user equipment supporting full power transmission but at least one PA not supporting the full power transmission, and a coherent transmission capability reported by the user equipment is partialcoherent transmission; or the full power transmission capability reported by the user equipment is the user equipment supporting full power transmission but at least one PA not supporting the full power transmission, codebook subset restriction corresponding to the coherent transmission capability reported by the user equipment is a noncoherent codebook subset, for example, pusch-TransCoherence reported by the user equipment is partialNonCoherent; and the codebook subset includes a codebook subset composed of noncoherent transmission codewords, a codebook subset composed of partialcoherent transmission codewords and a second precoding set.

Precoding matrixes in the second precoding set meet any one of the following conditions: the quantity of antenna ports with non-zero power of any precoding matrix is equal to the quantity of antenna ports included in an SRS resource for determining PUSCH transmission, and the at least one layer of the antenna ports with the non-zero power in any two precoding matrixes are different; the quantity of the antenna ports with the non-zero power of any precoding matrix is equal to the quantity of the antenna ports included in the SRS resource for determining PUSCH transmission, the antenna ports with the non-zero power of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining PUSCH transmission, the antenna ports with the non-zero power and the transmission layer quantities of any two precoding matrixes are the same, but relative phases of at least one coherent transmission antenna group in the coherent transmission antenna groups corresponding to any two precoding matrixes are different.

The precoding matrixes contained by the codebook subset of the codebook-based PUSCH and determined by the user equipment (or base station) are shown below.

When the number of transmission layers of four antenna ports is 1, the precoding matrixes contained in the codebook subset of the codebook-based PUSCH are precoding matrixes corresponding to TPMI index 0-15 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 0-15 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 0-3 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0-3 in FIG. 1G (when an uplink transmission waveform is a CP-OFDM waveform).

An overhead indicated by the precoding matrix and the number of transmission layers of the codebook-based PUSCH is: in the case of the four antenna ports, the overhead indicated by the precoding matrix and the number of transmission layers of the codebook-based PUSCH is 6 bit.

An encoding mode indicated by the precoding matrix and the number of transmission layers of the codebook-based PUSCH is shown in Table 14A.

TABLE 14A

Encoding mode indicated by precoding matrix and number of transmission layers of codebook-based PUSCH

| Bit field mapped to index | Four ports |
|---|---|
| 0 | 1 layer: TPMI = 0 |
| ... | ... |
| 15 | 1 layer: TPMI = 15 |
| 16 | 2 layers: TPMI = 0 |
| ... | ... |
| 31 | 2 layers: TPMI = 15 |
| 32 | 3 layers: TPMI = 0 |
| ... | ... |
| 35 | 3 layers: TPMI = 3 |
| 36 | 4 layers: TPMI = 0 |
| ... | ... |
| 39 | 4 layers: TPMI = 3 |
| 40-63 | Reserved |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to four antenna ports is 6 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

An encoding mode indicated by the precoding matrix and the number of transmission layers of the codebook-based PUSCH is as shown in Table 14B.

TABLE 14B

Encoding mode indicated by precoding matrix and number of transmission layers of codebook-based PUSCH

| maxRank = 1 | | maxRank = 2, or 3, or 4 | |
|---|---|---|---|
| Bit field mapped to index | Four ports | Bit field mapped to index | Four ports |
| 0 | 1 layer: TPMI = 0 | 0 | 1 layer: TPMI = 0 |
| ... | ... | ... | ... |
| 15 | 1 layer: TPMI = 15 | 15 | 1 layer: TPMI = 15 |
| | | 16 | 2 layers: TPMI = 0 |
| | | ... | ... |
| | | 31 | 2 layers: TPMI = 15 |
| | | 32 | 3 layers: TPMI = 0 |
| | | ... | ... |
| | | 35 | 3 layers: TPMI = 3 |
| | | 36 | 4 layers: TPMI = 0 |
| | | ... | ... |
| | | 39 | 4 layers: TPMI = 3 |
| | | 40-63 | Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

Another encoding mode indicated by the precoding matrix and the number of transmission layers of the codebook-based PUSCH is shown in Table 14C.

TABLE 14C

Encoding mode indicated by precoding matrix and number of transmission layers of codebook-based PUSCH

| maxRank = 1 | | maxRank = 2 | | maxRank = 3 | | maxRank = 4 | |
|---|---|---|---|---|---|---|---|
| Bit field mapped to index | Four ports | Bit field mapped to index | Four ports | Bit field mapped to index | Four ports | Bit field mapped to index | Four ports |
| 0 | 1 layer: TPMI = 0 | 0 | 1 layer: TPMI = 0 | 0 | 1 layer: TPMI = 0 | 0 | 1 layer: TPMI = 0 |
| ... | ... | ... | ... | ... | ... | ... | ... |
| 15 | 1 layer: TPMI = 15 | 15 | 1 layer: TPMI = 15 | 15 | 1 layer: TPMI = 15 | 15 | 1 layer: TPMI = 15 |
| | | 16 | 2 layers: TPMI = 0 | 16 | 2 layers: TPMI = 0 | 16 | 2 layers: TPMI = 0 |
| | | ... | ... | ... | ... | ... | ... |
| | | 31 | 2 layers: TPMI = 15 | 31 | 2 layers: TPMI = 15 | 31 | 2 layers: TPMI = 15 |
| | | | | 32 | 3 layers: TPMI = 0 | 32 | 3 layers: TPMI = 0 |
| | | | | ... | ... | ... | ... |
| | | | | 35 | 3 layers: TPMI = 3 | 35 | 3 layers: TPMI = 3 |
| | | | | 36-63 | Reserved | 36 | 4 layers: TPMI = 0 |
| | | | | | | ... | ... |
| | | | | | | 39 | 4 layers: TPMI = 3 |
| | | | | | | 40-63 | Reserved |

The example given in the above embodiment 13 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, an overhead indicated by the corresponding precoding matrix and number of transmission layers of the codebook-based PUSCH is: in the case of the four antenna ports, the overhead is 4 bit. An encoding mode indicated by the corresponding precoding matrix and number of transmission layers of the codebook-based PUSCH is as shown in Table 14D.

TABLE 14D

Encoding mode indicated by precoding matrix and number of transmission layers of codebook-based PUSCH

| Bit field mapped to index | Four ports |
|---|---|
| 0 | 1 layer: TPMI = 0 |
| 1 | 1 layer: TPMI = 1 |
| 2 | 1 layer: TPMI = 2 |
| 3 | 1 layer: TPMI = 3 |
| 4 | 1 layer: TPMI = 4 |
| 5 | 1 layer: TPMI = 5 |
| 6 | 1 layer: TPMI = 6 |
| 7 | 1 layer: TPMI = 7 |
| 8 | 1 layer: TPMI = 8 |
| 9 | 1 layer: TPMI = 9 |
| 10 | 1 layer: TPMI = 10 |
| 11 | 1 layer: TPMI = 11 |
| 12 | 1 layer: TPMI = 12 |
| 13 | 1 layer: TPMI = 13 |
| 14 | 1 layer: TPMI = 14 |
| 15 | 1 layer: TPMI = 15 |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 14

A full power transmission capability reported by user equipment to a base station is the user equipment supporting full power transmission but at least one PA not supporting the full power transmission.

Precoding matrixes in the codebook subset of a codebook-based PUSCH determined by the user equipment (or base station) meet any one of the following conditions: the quantity of antenna ports with non-zero power of any precoding matrix is equal to the quantity of antenna ports included in an SRS resource for determining PUSCH transmission, and the at least one corresponding layer of the antenna ports with the non-zero power in any two precoding matrixes are different; the quantity of the antenna ports with the non-zero power of any precoding matrix is equal to the quantity of the antenna ports included in the SRS resource for determining PUSCH transmission, the antenna ports with the non-zero power of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining PUSCH transmission, the antenna ports with the non-zero power and the transmission layer quantities of any two precoding matrixes are the same, but relative phases of at least one coherent transmission antenna group in the coherent transmission antenna groups corresponding to any two precoding matrixes are different.

The precoding matrixes contained by the codebook subset of the codebook-based PUSCH and determined by the user equipment (or base station) are shown below.

When the number of transmission layers of two antenna ports is 1, the precoding matrixes contained in the codebook subset of the codebook-based PUSCH are precoding matrixes corresponding to TPMI index 2-5 in FIG. 1A.

When the number of transmission layers of two antenna ports is 2, the precoding matrixes contained in the codebook subset of the codebook-based PUSCH are precoding matrixes corresponding to TPMI index 0-2 in FIG. 1D (when an uplink transmission waveform is a CP-OFDM waveform).

When the number of transmission layers of four antenna ports is 1, the precoding matrices contained in the codebook subset of the codebook-based PUSCH are precoding matrices corresponding to TPMI index 12-27 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrices corresponding to TPMI index 6-21 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrices corresponding to TPMI index 1-6 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrices corresponding to TPMI index 0-4 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 3 bit; and in the case of the four antenna ports, the overhead indicated by the precoding matrix and the number of transmission layers of the codebook-based PUSCH is 6 bit.

An encoding mode indicated by the precoding matrix and the number of transmission layers of the codebook-based PUSCH is as shown in Table 15A.

TABLE 15A

Encoding mode indicated by precoding matrix and number of transmission layers of the codebook-based PUSCH

| Bit field mapped to index | Two ports | Bit field mapped to index | Four ports |
|---|---|---|---|
| 0 | 1 layer: TPMI = 2 | 0 | 1 layer: TPMI = 12 |
| ... | ... | ... | ... |
| 3 | 1 layer: TPMI = 5 | 15 | 1 layer: TPMI = 27 |
| 4 | 2 layers: TPMI = 0 | 16 | 2 layers: TPMI = 6 |
| ... | ... | ... | ... |
| 6 | 2 layers: TPMI = 2 | 31 | 2 layers: TPMI = 21 |
| 7 | Reserved | 32 | 3 layers: TPMI = 1 |
|  |  | ... | ... |
|  |  | 37 | 3 layers: TPMI = 6 |
|  |  | 38 | 4 layers: TPMI = 0 |
|  |  | ... | ... |
|  |  | 42 | 4 layers: TPMI = 4 |
|  |  | 43-63 | Reserved |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to two antenna ports is 3 bit; and an overhead indicated by the precoding matrix and the number of transmission layers of the codebook-based PUSCH and corresponding to four antenna ports is 6 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers indicated by the maximum number of transmission layers information is 4, an overhead indicated by the precoding matrix and the number of transmission layers of the codebook-based PUSCH and corresponding to four antenna ports is 6 bit.

An encoding mode indicated by the precoding matrix and the number of transmission layers of the codebook-based PUSCH is as shown in Table 15B.

TABLE 15B

Encoding mode indicated by precoding matrix and number of transmission layers of codebook-based PUSCH

| maxRank = 1 | | maxRank = 2, or 3, or 4 | |
|---|---|---|---|
| Bit field mapped to index Two ports | Bit field mapped to index Four ports | Bit field mapped to index Two ports | Bit field mapped to index Four ports |
| 0    1 layer: TPMI = 2 | 0    1 layer: TPMI = 12 | 0    1 layer: TPMI = 2 | 0    1 layer: TPMI = 12 |
| ...    ... | ...    ... | ...    ... | ...    ... |

TABLE 15B-continued

Encoding mode indicated by precoding matrix and number of transmission layers of codebook-based PUSCH

| maxRank = 1 | | | | maxRank = 2, or 3, or 4 | | | |
|---|---|---|---|---|---|---|---|
| Bit field mapped to index | Two ports | Bit field mapped to index | Four ports | Bit field mapped to index | Two ports | Bit field mapped to index | Four ports |
| 3 | 1 layer: TPMI = 5 | 15 | 1 layer: TPMI = 27 | 3 | 1 layer: TPMI = 5 | 15 | 1 layer: TPMI = 27 |
| | | | | 4 | 2 layers: TPMI = 0 | 16 | 2 layers: TPMI = 6 |
| | | | | ... | ... | ... | ... |
| | | | | 6 | 2 layers: TPMI = 2 | 31 | 2 layers: TPMI = 21 |
| | | | | 7 | Reserved | 32 | 3 layers: TPMI = 1 |
| | | | | | | ... | ... |
| | | | | | | 37 | 3 layers: TPMI = 6 |
| | | | | | | 38 | 4 layers: TPMI = 0 |
| | | | | | | ... | ... |
| | | | | | | 42 | 4 layers: TPMI = 4 |
| | | | | | | 43-63 | Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 2, an overhead indicated by the precoding matrix and the number of transmission layers of the codebook-based PUSCH and corresponding to two antenna ports is 3 bit; and an overhead indicated by the precoding matrix and the number of transmission layers of the codebook-based PUSCH and corresponding to four antenna ports is 5 bit.

When the maximum number of transmission layers indicated by the maximum number of transmission layers information is 3, an overhead indicated by the precoding matrix and the number of transmission layers of the codebook-based PUSCH and corresponding to four antenna ports is 6 bit.

When the maximum number of transmission layers information is 4, an overhead indicated by the precoding matrix and the number of transmission layers of the codebook-based PUSCH and corresponding to four antenna ports is 6 bit.

Another encoding mode indicated by the precoding matrix and the number of transmission layers of the codebook-based PUSCH is shown in Table 15C and Table 15D.

TABLE 15C

Encoding mode indicated by precoding matrix and number of transmission layers of codebook-based PUSCH

| maxRank = 1 | | | | maxRank = 2 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 12 | 0 | 1 layer: TPMI = 2 | 0 | 1 layer: TPMI = 12 |
| ... | ... | ... | ... | ... | ... | ... | ... |
| 3 | 1 layer: TPMI = 5 | 15 | 1 layer: TPMI = 27 | 3 | 1 layer: TPMI = 5 | 15 | 1 layer: TPMI = 27 |
| | | | | 4 | 2 layers: TPMI = 0 | 16 | 2 layers: TPMI = 6 |
| | | | | ... | ... | ... | ... |
| | | | | 6 | 2 layers: TPMI = 2 | 31 | 2 layers: TPMI = 21 |
| | | | | 7 | Reserved | | |

TABLE 15D

Encoding mode indicated by precoding matrix and number of transmission layers of codebook-based PUSCH

| maxRank = 3 | | maxRank = 4 | |
|---|---|---|---|
| Bit field mapped to index | Four ports | Bit field mapped to index | Four ports |
| 0 | 1 layer: TPMI = 12 | 0 | 1 layer: TPMI = 12 |
| ... | ... | ... | ... |
| 15 | 1 layer: TPMI = 27 | 15 | 1 layer: TPMI = 27 |
| 16 | 2 layers: TPMI = 6 | 16 | 2 layers: TPMI = 6 |
| ... | ... | ... | ... |
| 31 | 2 layers: TPMI = 21 | 31 | 2 layers: TPMI = 21 |
| 32 | 3 layers: TPMI = 1 | 32 | 3 layers: TPMI = 1 |
| ... | ... | ... | ... |
| 37 | 3 layers: TPMI = 6 | 37 | 3 layers: TPMI = 6 |
| 38-63 | Reserved | 38 | 4 layers: TPMI = 0 |
| | | ... | ... |
| | | 42 | 4 layers: TPMI = 4 |
| | | 43-63 | Reserved |

The example given in the above embodiment 14 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, the overhead indicated by the corresponding precoding matrix and number of transmission layers of the codebook-based PUSCH is: in the case of the two antenna ports, the overhead is 2 bit; and in the case of the four antenna ports, the overhead is 4 bit. An encoding mode indicated by the corresponding precoding matrix and number of transmission layers of the codebook-based PUSCH is shown in Table 15E.

TABLE 15E

Encoding mode indicated by precoding matrix and number of transmission layers of codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 0 |
| 1 | 1 layer: TPMI = 3 | 1 | 1 layer: TPMI = 1 |
| 2 | 1 layer: TPMI = 4 | 2 | 1 layer: TPMI = 2 |
| 3 | 1 layer: TPMI = 5 | 3 | 1 layer: TPMI = 3 |
|  |  | 4 | 1 layer: TPMI = 4 |
|  |  | 5 | 1 layer: TPMI = 5 |
|  |  | 6 | 1 layer: TPMI = 6 |
|  |  | 7 | 1 layer: TPMI = 7 |
|  |  | 8 | 1 layer: TPMI = 8 |
|  |  | 9 | 1 layer: TPMI = 9 |
|  |  | 10 | 1 layer: TPMI = 10 |
|  |  | 11 | 1 layer: TPMI = 11 |
|  |  | 12 | 1 layer: TPMI = 12 |
|  |  | 13 | 1 layer: TPMI = 13 |
|  |  | 14 | 1 layer: TPMI = 14 |
|  |  | 15 | 1 layer: TPMI = 15 |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 15

A full power transmission capability reported by user equipment to a base station is the user equipment supporting full power transmission but at least one PA not supporting the full power transmission.

Precoding matrixes in a codebook subset of a codebook-based PUSCH determined by the user equipment (or base station) meet one of the following conditions: the quantity of antenna ports with non-zero power of any precoding matrix is equal to the quantity of antenna ports contained in an SRS resource for determining PUSCH transmission, and at least one corresponding layer of the power ports with the non-zero power in any two precoding matrixes are different; or the quantity of the antenna ports with the non-zero power of any precoding matrix is equal to the quantity of the antenna ports contained in the SRS resource for determining PUSCH transmission, the antenna ports with the non-zero power of any two precoding matrixes are the same, but the transmission layer quantities of any two precoding matrixes are different.

The precoding matrixes contained by the codebook subset of the codebook-based PUSCH and determined by the user equipment (or base station) are shown below.

When the number of transmission layers of two antenna ports is 1, the precoding matrixes contained in the codebook subset of the codebook-based PUSCH are precoding matrix corresponding to TPMI index 2 in FIG. 1A.

When the number of transmission layers of two antenna ports is 2, the precoding matrixes contained in the codebook subset of the codebook-based PUSCH are precoding matrixes corresponding to TPMI index 0-1 in FIG. 1D (when an uplink transmission waveform is a CP-OFDM waveform).

When the number of transmission layers of four antenna ports is 1, the precoding matrixes contained in the codebook subset of the codebook-based PUSCH are precoding matrixes corresponding to TPMI index 12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 6 and 14 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 1 and 3 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0, 1 and 3 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 2 bit; and in the case of the four antenna ports, the overhead indicated by the precoding matrix and the number of transmission layers of the codebook-based PUSCH is 3 bit.

An encoding mode indicated by the precoding matrix and the number of transmission layers of the codebook-based PUSCH is as shown in Table 16A.

TABLE 16A

Encoding mode indicated by precoding matrix and number of transmission layers of codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 12 |
| 1 | 2 layers: TPMI = 0 | 1 | 2 layers: TPMI = 6 |
| 2 | 2 layers: TPMI = 1 | 2 | 2 layers: TPMI = 14 |
| 3 | Reserved | 3 | 3 layers: TPMI = 1 |
|  |  | 4 | 3 layers: TPMI = 3 |

TABLE 16A-continued

Encoding mode indicated by precoding matrix and number of transmission layers of codebook-based PUSCH

| Bit field mapped to index | Two ports | Bit field mapped to index | Four ports |
|---|---|---|---|
| | | 5 | 4 layers: TPMI = 0 |
| | | 6 | 4 layers: TPMI = 1 |
| | | 7 | 4 layers: TPMI = 3 |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 1 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 3 bit.

When the maximum number of transmission layers indicated by the maximum number of transmission layers information is 3, an overhead indicated by the precoding matrix and the number of transmission layers of the codebook-based PUSCH and corresponding to four antenna ports is 3 bit.

When the maximum number of transmission layers indicated by the maximum number of transmission layers information is 4, an overhead indicated by the precoding matrix and the number of transmission layers of the codebook-based PUSCH and corresponding to four antenna ports is 3 bit.

An encoding mode indicated by the precoding matrix and the number of transmission layers of the codebook-based PUSCH is as shown in Table 16B.

TABLE 16B

Encoding mode indicated by precoding matrix and number of transmission layers of codebook-based PUSCH

| maxRank = 1 | | | | maxRank = 2, or 3, or 4 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 12 | 0 | 1 layer: TPMI = 2 | 0 | 1 layer: TPMI = 12 |
| 1 | Reserved | 1 | Reserved | 1 | 2 layers: TPMI = 0 | 1 | 2 layers: TPMI = 6 |
| | | | | 2 | 2 layers: TPMI = 1 | 2 | 2 layers: TPMI = 14 |
| | | | | 3 | Reserved | 3 | 3 layers: TPMI = 1 |
| | | | | | | 4 | 3 layers: TPMI = 3 |
| | | | | | | 5 | 4 layers: TPMI = 0 |
| | | | | | | 6 | 4 layers: TPMI = 1 |
| | | | | | | 7 | 4 layers: TPMI = 3 |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 1 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 3, an overhead indicated by the precoding matrix and the number of transmission layers of the codebook-based PUSCH and corresponding to four antenna ports is 3 bit.

When the maximum number of transmission layers indicated by the maximum number of transmission layers information is 4, an overhead indicated by the precoding matrix and the number of transmission layers of the codebook-based PUSCH and corresponding to four antenna ports is 3 bit.

Another encoding mode indicated by the precoding matrix and the number of transmission layers of the codebook-based PUSCH is as shown in Table 16C and Table 16D.

TABLE 16C

Encoding mode indicated by precoding matrix and number of transmission layers of codebook-based PUSCH

| maxRank = 1 | | | | maxRank = 2 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 12 | 0 | 1 layer: TPMI = 2 | 0 | 1 layer: TPMI = 12 |
| 1 | Reserved | 1 | Reserved | 1 | 2 layers: TPMI = 0 | 1 | 2 layers: TPMI = 6 |
|  |  |  |  | 2 | 2 layers: TPMI = 1 | 2 | 2 layers: TPMI = 14 |
|  |  |  |  | 3 | Reserved | 3 | Reserved |

TABLE 16D

Encoding mode indicated by precoding matrix and number of transmission layers of codebook-based PUSCH

| maxRank = 3 | | maxRank = 4 | |
|---|---|---|---|
| Bit field mapped to index | Four ports | Bit field mapped to index | Four ports |
| 0 | 1 layer: TPMI = 12 | 0 | 1 layer: TPMI = 12 |
| 1 | 2 layers: TPMI = 6 | 1 | 2 layers: TPMI = 6 |
| 2 | 2 layers: TPMI = 14 | 2 | 2 layers: TPMI = 14 |
| 3 | 3 layers: TPMI = 1 | 3 | 3 layers: TPMI = 1 |
| 4 | 3 layers: TPMI = 3 | 4 | 3 layers: TPMI = 3 |
| 5-7 | Reserved | 5 | 4 layers: TPMI = 0 |
|  |  | 6 | 4 layers: TPMI = 1 |
|  |  | 7 | 4 layers: TPMI = 3 |

The example given in the above embodiment 15 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, the overhead indicated by the corresponding precoding matrix and number of transmission layers of the codebook-based PUSCH is: in the case of the two antenna ports, the overhead is 1 bit; and in the case of the four antenna ports, the overhead is 1 bit. An encoding mode indicated by the corresponding precoding matrix and number of transmission layers of the codebook-based PUSCH is as shown in Table 16E.

TABLE 16E

Encoding mode indicated by precoding matrix and number of transmission layers of codebook-based PUSCH

| Bit field mapped to index | Two ports | Bit field mapped to index | Four ports |
|---|---|---|---|
| 0 | 1 layer: TPMI = 2 | 0 | 1 layer: TPMI = 12 |
| 1 | Reserved | 1 | Reserved |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment 16

A full power transmission capability reported by user equipment to a base station is the user equipment supporting full power transmission but at least one PA not supporting the full power transmission, and a coherent transmission capability reported by the user equipment is noncoherent transmission; or the full power transmission capability reported by the user equipment is the user equipment supporting full power transmission but at least one PA not supporting the full power transmission, and codebook subset restriction corresponding to the coherent transmission capability reported by the user equipment is a noncoherent codebook subset, for example, the pusch-TransCoherence reported by the user equipment is nonCoherent.

Precoding matrixes contained by the codebook subset of the codebook-based PUSCH and determined by the user equipment (or base station) are as shown below.

When the number of transmission layers of two antenna ports is 1, the precoding matrixes contained in the codebook subset of the codebook-based PUSCH are precoding matrixes corresponding to TPMI index 0 and 2 in FIG. 1A.

When the number of transmission layers of two antenna ports is 2, the precoding matrixes contained in the codebook subset of the codebook-based PUSCH are precoding matrixes corresponding to TPMI index 0-1 in FIG. 1D (when an uplink transmission waveform is a CP-OFDM waveform).

When the number of transmission layers of four antenna ports is 1, the precoding matrixes contained in the codebook subset of the codebook-based PUSCH are precoding matrixes corresponding to TPMI index 0 and 12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 6 and 14 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 1 and 3 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0, 1 and 3 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 2 bit; and in the case of the four antenna ports, the overhead indicated by the precoding matrix and the number of transmission layers of the codebook-based PUSCH is 4 bit.

An encoding mode indicated by the precoding matrix and the number of transmission layers of the codebook-based PUSCH is as shown in Table 17A.

TABLE 17A

Encoding mode indicated by precoding matrix and number of transmission layers of codebook-based PUSCH

| Bit field mapped to index | Two ports | Bit field mapped to index | Four ports |
|---|---|---|---|
| 0 | 1 layer: TPMI = 0 | 0 | 1 layer: TPMI = 0 |
| 1 | 1 layer: TPMI = 2 | 1 | 1 layer: TPMI = 12 |
| 2 | 2 layers: TPMI = 0 | 2 | 2 layers: TPMI = 6 |
| 3 | 2 layers: TPMI = 1 | 3 | 2 layers: TPMI = 14 |
|  |  | 4 | 3 layers: TPMI = 1 |
|  |  | 5 | 3 layers: TPMI = 3 |
|  |  | 6 | 4 layers: TPMI = 0 |
|  |  | 7 | 4 layers: TPMI = 1 |
|  |  | 8 | 4 layers: TPMI = 3 |
|  |  | 9-15 | Reserved | and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 1 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 4 bit.

When the maximum number of transmission layers indicated by the maximum number of transmission layers information is 4, an overhead indicated by the precoding matrix and the number of transmission layers of the codebook-based PUSCH and corresponding to four antenna ports is 4 bit.

An encoding mode indicated by the precoding matrix and the number of transmission layers of the codebook-based PUSCH is as shown in Table 17B.

TABLE 17B

Encoding mode indicated by precoding matrix and number of transmission layers of codebook-based PUSCH

| maxRank = 1 | | | | maxRank = 2, or 3, or 4 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 0 | 0 | 1 layer: TPMI = 0 | 0 | 1 layer: TPMI = 0 | 0 | 1 layer: TPMI = 0 |
| 1 | 1 layer: TPMI = 2 | 1 | 1 layer: TPMI = 0 | 1 | 1 layer: TPMI = 2 | 1 | 1 layer: TPMI = 12 |
|  |  |  |  | 2 | 2 layers: TPMI = 0 | 2 | 2 layers: TPMI = 6 |
|  |  |  |  | 3 | 2 layers: TPMI = 1 | 3 | 2 layers: TPMI = 14 |
|  |  |  |  |  |  | 4 | 3 layers: TPMI = 1 |
|  |  |  |  |  |  | 5 | 3 layers: TPMI = 3 |
|  |  |  |  |  |  | 6 | 4 layers: TPMI = 0 |
|  |  |  |  |  |  | 7 | 4 layers: TPMI = 1 |
|  |  |  |  |  |  | 8 | 4 layers: TPMI = 3 |
|  |  |  |  |  |  | 9-15 | Reserved |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 1 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 3, an overhead indicated by the precoding matrix and the number of transmission layers of the codebook-based PUSCH and corresponding to four antenna ports is 3 bit.

When the maximum number of transmission layers indicated by the maximum number of transmission layers information is 4, an overhead indicated by the precoding matrix and the number of transmission layers of the codebook-based PUSCH and corresponding to four antenna ports is 4 bit.

Another encoding mode indicated by the precoding matrix and the number of transmission layers of the codebook-based PUSCH is as shown in Table 17C and Table 17D.

of the two antenna ports, the overhead is 1 bit; and in the case of the four antenna ports, the overhead is 1 bit. An encoding mode indicated by the corresponding precoding matrix and number of transmission layers of the codebook-based PUSCH is as shown in Table 17E.

TABLE 17E

Encoding mode indicated by precoding matrix and number of transmission layers of codebook-based PUSCH

| Bit field mapped to index | Two ports | Bit field mapped to index | Four ports |
|---|---|---|---|
| 0 | 1 layer: TPMI = 0 | 0 | 1 layer: TPMI = 0 |
| 1 | 1 layer: TPMI = 2 | 1 | 1 layer: TPMI = 12 |

In one embodiment, when the codebook subset only includes one codeword, an overhead indicated by the precoding matrix and the number of transmission layers of the codebook-based PUSCH is 0 bit. The user equipment may

TABLE 17C

Encoding mode indicated by precoding matrix and number of transmission layers of codebook-based PUSCH

| Two ports | | Four ports | | Two ports | | Four ports | |
|---|---|---|---|---|---|---|---|
| Bit field mapped to index | NonCoherent UE | Bit field mapped to index | NonCoherent UE | Bit field mapped to index | NonCoherent UE | Bit field mapped to index | NonCoherent UE |
| 0 | 1 layer: TPMI = 0 | 0 | 1 layer: TPMI = 0 | 0 | 1 layer: TPMI = 2 | 0 | 1 layer: TPMI = 0 |
| 1 | 1 layer: TPMI = 2 | 1 | 1 layer: TPMI = 12 | 1 | 2 layers: TPMI = 0 | 1 | 1 layer: TPMI = 12 |
| | | | | 2 | 2 layers: TPMI = 1 | 2 | 2 layers: TPMI = 6 |
| | | | | 3 | Reserved | 3 | 2 layers: TPMI = 14 |

TABLE 17D

Encoding mode indicated by precoding matrix and number of transmission layers of codebook-based PUSCH

| maxRank = 3 | | maxRank = 4 | |
|---|---|---|---|
| Bit field mapped to index | Four ports | Bit field mapped to index | Four ports |
| 0 | 1 layer: TPMI = 0 | 0 | 1 layer: TPMI = 0 |
| 1 | 1 layer: TPMI = 12 | 1 | 1 layer: TPMI = 12 |
| 2 | 2 layers: TPMI = 6 | 2 | 2 layers: TPMI = 6 |
| 3 | 2 layers: TPMI = 14 | 3 | 2 layers: TPMI = 14 |
| 4 | 3 layers: TPMI = 1 | 4 | 3 layers: TPMI = 1 |
| 5 | 3 layers: TPMI = 3 | 5 | 3 layers: TPMI = 3 |
| 6-7 | Reserved | 6 | 4 layers: TPMI = 0 |
| | | 7 | 4 layers: TPMI = 1 |
| | | 8 | 4 layers: TPMI = 3 |
| | | 9-15 | Reserved |

The example given in the above embodiment 16 is that codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, the overhead indicated by the corresponding precoding matrix and number of transmission layers of the codebook-based PUSCH is: in the case directly determine the overhead indicated by the precoding matrix and the number of transmission layers of the codebook-based PUSCH.

Embodiment 17

A full power transmission capability reported by user equipment to a base station is that a combination of two PAs of the user equipment supports full power transmission, and a coherent transmission capability reported by the user equipment is noncoherent transmission; or the full power transmission capability reported by the user equipment is that the combination of the two PAs of the user equipment supports the full power transmission, and codebook subset restriction corresponding to the coherent transmission capability reported by the user equipment is a noncoherent codebook subset, for example, pusch-TransCoherence reported by the user equipment is nonCoherent.

Precoding matrixes contained by the codebook subset of the codebook-based PUSCH and determined by the user equipment (or base station) are as shown below.

When the number of transmission layers of two antenna ports is 1, the precoding matrixes contained in the codebook subset of the codebook-based PUSCH are precoding matrix corresponding to TPMI index 2 in FIG. 1A.

When the number of transmission layers of two antenna ports is 2, the precoding matrixes contained in the codebook subset of the codebook-based PUSCH are precoding matrixes corresponding to TPMI index 0-1 in FIG. 1D (when an uplink transmission waveform is a CP-OFDM waveform).

When the number of transmission layers of four antenna ports is 1, the precoding matrixes contained in the codebook subset of the codebook-based PUSCH are precoding matrixes corresponding to TPMI index 4, 8 and 12 in FIG. 1B (when an uplink transmission waveform is a DFT-S-OFDM waveform) or FIG. 1C (when an uplink transmission waveform is a CP-OFDM waveform).

When the number of transmission layers of four antenna ports is 2, the precoding matrixes contained in the codebook subset of the codebook-based PUSCH are precoding matrixes corresponding to TPMI index 0-5 in FIG. 1E (when an uplink transmission waveform is a CP-OFDM waveform).

When the number of transmission layers of four antenna ports is 3, the precoding matrixes contained in the codebook subset of the codebook-based PUSCH are precoding matrixes corresponding to TPMI index 0 in FIG. 1F (when an uplink transmission waveform is a CP-OFDM waveform).

When the number of transmission layers of four antenna ports is 4, the precoding matrixes contained in the codebook subset of the codebook-based PUSCH are precoding matrixes corresponding to TPMI index 0 in FIG. 1G (when an uplink transmission waveform is a CP-OFDM waveform).

An overhead indicated by the precoding matrix and the number of transmission layers of the codebook-based PUSCH is: in the case of the two antenna ports, the overhead indicated by the precoding matrix and the number of transmission layers of the codebook-based PUSCH is 2 bit; and in the case of the four antenna ports, the overhead indicated by the precoding matrix and the number of transmission layers of the codebook-based PUSCH is 4 bit.

An encoding mode indicated by the precoding matrix and the number of transmission layers of the codebook-based PUSCH is as shown in Table 18A.

TABLE 18A

Encoding mode indicated by precoding matrix and number of transmission layers of codebook-based PUSCH

| Bit field mapped to index | Two ports E | Bit field mapped to index | Four ports |
|---|---|---|---|
| 0 | 1 layer: TPMI = 2 | 0 | 1 layer: TPMI = 4 |
| 1 | 2 layers: TPMI = 0 | 1 | 1 layer: TPMI = 8 |
| 2 | 2 layers: TPMI = 1 | 2 | 1 layer: TPMI = 12 |
| 3 | Reserved | 3 | 2 layers: TPMI = 0 |
|  | . . . | . . . | . . . |
|  |  | 8 | 2 layers: TPMI = 5 |
|  |  | 9 | 3 layers: TPMI = 0 |
|  |  | 10 | 4 layers: TPMI = 0 |
|  |  | 11-15 | Reserved |

In a realizable scene, the base station sends maximum number of transmission layers information to the user equipment, and the user equipment receives the maximum number of transmission layers information, and determines second information based on the maximum number of transmission layers information, and the maximum number of transmission layers information is configured to indicate the maximum layer quantity which cannot be exceeded for the transmission of the codebook-based PUSCH.

In this case, an overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 4 bit.

When the maximum number of transmission layers indicated by the maximum number of transmission layers information is 4, an overhead indicated by the precoding matrix and the number of transmission layers of the codebook-based PUSCH and corresponding to four antenna ports is 4 bit.

An encoding mode indicated by the precoding matrix and the number of transmission layers of the codebook-based PUSCH is as shown in Table 18B.

TABLE 18B

Encoding mode indicated by precoding matrix and number of transmission layers of codebook-based PUSCH

| maxRank = 1 | | | | maxRank = 2, or 3, or 4 | | | |
|---|---|---|---|---|---|---|---|
| Bit field mapped to index | Two ports | Bit field mapped to index | Four ports | Bit field mapped to index | Two ports | Bit field mapped to index | Four ports |
| 0 | 1 layer: TPMI = 2 | 0 | 1 layer: TPMI = 4 | 0 | 1 layer: TPMI = 2 | 0 | 1 layer: TPMI = 4 |
| 1 | Reserved | 1 | 1 layer: TPMI = 8 | 1 | 2 layers: TPMI = 0 | 1 | 1 layer: TPMI = 8 |
|  |  | 2 | 1 layer: TPMI = 12 | 2 | 2 layers: TPMI = 1 | 2 | 1 layer: TPMI = 12 |
|  |  | 3 | Reserved | 3 | Reserved | 3 | 2 layers: TPMI = 0 |
|  |  |  |  |  | . . . | . . . | . . . |
|  |  |  |  |  |  | 8 | 2 layers: TPMI = 5 |
|  |  |  |  |  |  | 9 | 3 layers: TPMI = 0 |
|  |  |  |  |  |  | 10 | 4 layers: TPMI = 0 |
|  |  |  |  |  |  | 11-15 | Reserved |

Another overhead indicated by the precoding matrix and the number of transmission layers of the codebook-based PUSCH is as follows.

When the maximum number of transmission layers indicated by the maximum number of transmission layers information is 1, an overhead indicated by the precoding matrix and the number of transmission layers of the codebook-based PUSCH and corresponding to two antenna ports is 1 bit; and an overhead indicated by the precoding matrix and the number of transmission layers of the codebook-based PUSCH and corresponding to four antenna ports is 2 bit.

When the maximum number of transmission layers indicated by the maximum number of transmission layers information is 2, an overhead indicated by the precoding matrix and the number of transmission layers of the codebook-based PUSCH and corresponding to two antenna ports is 2 bit; and an overhead indicated by the precoding matrix and the number of transmission layers of the codebook-based PUSCH and corresponding to four antenna ports is 4 bit.

When the maximum number of transmission layers indicated by the maximum number of transmission layers information is 3, an overhead indicated by the precoding matrix and the number of transmission layers of the codebook-based PUSCH and corresponding to four antenna ports is 4 bit.

When the maximum number of transmission layers indicated by the maximum number of transmission layers information is 4, an overhead indicated by the precoding matrix and the number of transmission layers of the codebook-based PUSCH and corresponding to four antenna ports is 4 bit.

Another encoding mode indicated by the precoding matrix and the number of transmission layers of the codebook-based PUSCH is as shown in Table 18C and Table 18D.

TABLE 18C

Encoding mode indicated by precoding matrix and number of transmission layers of codebook-based PUSCH

| maxRank = 1 | | maxRank = 2 | |
| --- | --- | --- | --- |
| Bit field mapped to index / Two ports | Bit field mapped to index / Four ports | Bit field mapped to index / Two ports | Bit field mapped to index / Four ports |
| 0  1 layer: TPMI = 2 | 0  1 layer: TPMI = 4 | 0  1 layer: TPMI = 2 | 0  1 layer: TPMI = 4 |
| 1  Reserved | 1  1 layer: TPMI = 8 | 1  2 layers: TPMI = 0 | 1  1 layer: TPMI = 8 |
|  | 2  1 layer: TPMI = 12 | 2  2 layers: TPMI = 1 | 2  1 layer: TPMI = 12 |
|  | 3  Reserved | 3  Reserved | 3  2 layers: TPMI = 0 |
|  |  |  | ... ... |
|  |  |  | 8  2 layers: TPMI = 5 |
|  |  |  | 9-15  Reserved |

TABLE 18D

Encoding mode indicated by precoding matrix and number of transmission layers of codebook-based PUSCH

| maxRank = 3 | | maxRank = 4 | |
| --- | --- | --- | --- |
| Bit field mapped to index | Four ports | Bit field mapped to index | Four ports |
| 0 | 1 layer: TPMI = 4 | 0 | 1 layer: TPMI = 4 |
| 1 | 1 layer: TPMI = 8 | 1 | 1 layer: TPMI = 8 |
| 2 | 1 layer: TPMI = 12 | 2 | 1 layer: TPMI = 12 |
| 3 | 2 layers: TPMI = 0 | 3 | 2 layers: TPMI = 0 |
| ... | ... | ... | ... |
| 8 | 2 layers: TPMI = 5 | 8 | 2 layers: TPMI = 5 |
| 9 | 3 layers: TPMI = 0 | 9 | 3 layers: TPMI = 0 |
| 10-15 | Reserved | 10 | 4 layers: TPMI = 0 |
|  |  | 11-15 | Reserved |

The example given in the above embodiment 17 is that the codebook subset restriction includes the precoding matrixes with all the layer quantities.

In one embodiment, the codebook subset only includes the precoding matrixes of which the number of layers is not greater than H, and thus the overhead indicated by the corresponding precoding matrix and number of transmission layers of the codebook-based PUSCH is an overhead of the codebook subset only including precoding matrixes of which the number of layers is not greater than H, and H is an integer greater than or equal to 1.

Taking an example that H=1, the overhead indicated by the corresponding precoding matrix and number of transmission layers of the codebook-based PUSCH is: in the case of the two antenna ports, the overhead is 1 bit; and in the case of the four antenna ports, the overhead is 2 bit. An encoding mode indicated by the corresponding precoding matrix and number of transmission layers of the codebook-based PUSCH is as shown in Table 18E.

TABLE 18E

Encoding mode indicated by precoding matrix and number of transmission layers of codebook-based PUSCH

| Bit field mapped to index | Two ports | Bit field mapped to index | Four ports |
| --- | --- | --- | --- |
| 0 | 1 layer: TPMI = 2 | 0 | 1 layer: TPMI = 4 |
| 1 | Reserved | 1 | 1 layer: TPMI = 8 |
|  |  | 2 | 1 layer: TPMI = 12 |
|  |  | 3 | Reserved |

In one embodiment, when the codebook subset only includes one codeword, an overhead indicated by the precoding matrix and the number of transmission layers of the codebook-based PUSCH is 0 bit. The user equipment may directly determine the overhead indicated by the precoding matrix and the number of transmission layers of the codebook-based PUSCH.

Embodiment of the present disclosure further provides user equipment, which can implement the flows executed in FIG. 2 of the aforementioned embodiments.

Figure 4:
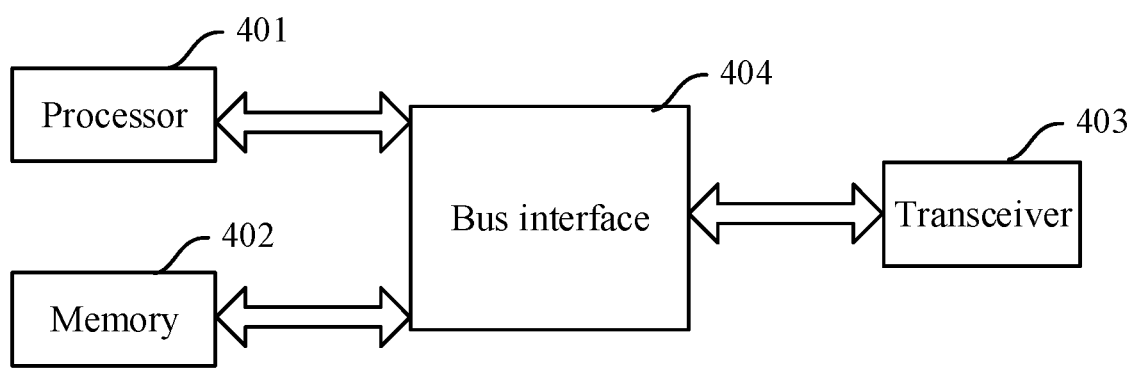
FIG. 4 is a schematic structural diagram of a UE provided by an embodiment of the present disclosure.

Referring to FIG. 4, which is a schematic structural diagram of the user equipment provided by the embodiment of the present disclosure, as shown in figure, the user equipment may include: a processor 401, a memory 402, a transceiver 403 and a bus interface 404.

The processor 401 is responsible for managing a bus architecture and usual processing, and the memory 402 may store data used by the processor 401 during operation execution. The transceiver 403 is configured to receive and send data under control of the processor 401.

The bus architecture may include any number of interconnected buses and bridges, which are specifically linked together by various circuits of one or more processors represented by the processor 401 and a memory represented by the memory 402. The bus architecture may further link various other circuits such as a peripheral device, a voltage stabilizer and a power management circuit together, which are publicly known in the art and therefore not further described herein. The bus interface provides an interface. The processor 401 is responsible for managing a bus architecture and usual processing, and the memory 402 may store data used by the processor 401 during operation execution.

A flow disclosed in the embodiment of the disclosure may be applied to the processor 401 or be implemented by the processor 401. In an implementation process, all steps of a signal processing flow may be completed through an integrated logic circuit of hardware in the processor 401 or in a software form. The processor 401 may be a general-purpose processor, a digital signal processor, an application specific integrated circuit, a field-programmable gate array or other programmable logic devices, a discrete gate or a transistor logic device, a discrete Hardware component, which can implement or execute all the methods, steps and logic block diagrams disclosed in the embodiment of the present disclosure. The general-purpose processor may be a microprocessor or any conventional processor, etc. The steps of the method disclosed with reference to the embodiment of the present disclosure may be directly embodied as being executed and completed by a hardware processor, or be executed and completed by a hardware and software module combination in the processor. A software module may be located in a random access memory, a flash memory, a read only memory, a programmable read only memory, or an electrically erasable programmable memory, a register and other mature storage mediums in the art. The storage medium is located in the memory 402, and the processor 401 reads information in the memory 402, and is combined with its hardware to complete the steps of the signal processing flow.

The transceiver 403 is configured to report a full power transmission capability of the user equipment and/or a coherent transmission capability of the user equipment to a base station.

The processor 401 is configured to read programs in the memory 402 and execute the following processes: determining a codebook subset of a codebook-based PUSCH and/or second information according to first information, and the first information includes at least one of the following information: the full power transmission capability, the coherent transmission capability, codebook subset restriction information, or first instruction, the second information includes an overhead of the indication of precoding information and number of layers of the codebook-based PUSCH, and/or an encoding mechanism of the indication of precoding information and number of layers of the codebook-based PUSCH, and the first instruction includes an instruction for instructing the user equipment whether or not to perform full power transmission and/or an instruction for indicating a full power transmission mode of the user equipment.

The transceiver 403 is further configured to receive uplink scheduling information of the codebook-based PUSCH sent by the base station.

The processor 401 is further configured to read the programs in the memory 402 and execute the following processes: determining the precoding matrix and the number of transmission layers of the codebook-based PUSCH according to the uplink scheduling information of the codebook-based PUSCH, the codebook subset of the codebook-based PUSCH and the second information sent by the base station.

In one embodiment, the first information includes the codebook subset restriction information, and the codebook subset restriction information of the codebook-based PUSCH meets at least one of the follows:

at least one value of the codebook subset restriction information of the codebook-based PUSCH is configured to indicate codebook subset restrictions different from that in 3GPP Release version;

the same value of the codebook subset restriction information of the codebook-based PUSCH represents different codebook subset restrictions for different coherent transmission capabilities;

the codebook subset restriction information of the codebook-based PUSCH at least includes fourth information and fifth information, and the fourth information is configured to indicate an identifier of the codebook subset, and the fifth information is configured to indicate a codebook subset actually corresponding to the fourth information; or the same value of the codebook subset restriction information of the codebook-based PUSCH corresponds to different codebook subsets under the conditions that the user equipment receives a codebook subset restriction activation instruction and the user equipment does not receive the codebook subset restriction activation instruction.

In one embodiment, the transceiver is further configured to: receive, by the user equipment, the first instruction sent by the base station.

In one embodiment, the processor is further configured to: determine transmission power of the codebook-based PUSCH according to the full power transmission capability; or determine the transmission power of the codebook-based PUSCH according to the coherent transmission capability; or determine the transmission power of the codebook-based PUSCH according to the codebook subset restriction information of the codebook-based PUSCH; or determine the transmission power of the codebook-based PUSCH according to the full power transmission capability and the coherent transmission capability; or determine the transmission power of the codebook-based PUSCH according to the full power transmission capability and the codebook subset restriction information of the codebook-based PUSCH; or determine the transmission power of the codebook-based PUSCH according to the coherent transmission capability and the codebook subset restriction information of the codebook-based PUSCH; or determine the transmission power of the codebook-based PUSCH according to the full power transmission capability, the coherent transmission capability and the codebook subset restriction information of the codebook-based PUSCH; or determine the transmission power of the codebook-based PUSCH according to a full power transmission mode indicated by the instruction of the full power transmission mode of the user equipment; or determine the transmission power of the codebook-based PUSCH according to the full power transmission mode indicated by the instruction of the full power transmission mode of the user equipment and the full power transmission capability; or determine the transmission power of the codebook-based PUSCH according to the full power transmission mode indicated by the instruction of the full power transmission mode of the user equipment and the coherent transmission capability; or determine the transmission power of the codebook-based PUSCH according to the full power transmission mode indicated by the instruction of the full power transmission mode of the user equipment and the codebook subset restriction information of the codebook-based PUSCH; or determine the transmission power of the codebook-based PUSCH according to the full power transmission mode indicated by the instruction of the full power transmission mode of the user equipment, the full power transmission capability and the coherent transmission capability; or determine the transmission power of the codebook-based PUSCH according to the full power transmission mode indicated by the instruction of the full power transmission mode of the user equipment, the codebook subset restriction information of the codebook-based PUSCH and the coherent transmission capability; or determine the transmission power of the codebook-based PUSCH according to the full power transmission mode indicated by the instruction of the full power transmission mode of the user equipment, the codebook subset restriction information of the codebook-based PUSCH and the full power transmission capability; or determine the transmission power of the codebook-based PUSCH according to the full power transmission mode indicated by the instruction of the full power transmission mode of the user equipment, the codebook subset restriction information of the codebook-based PUSCH, the full power transmission capability and the coherent transmission capability.

In one embodiment, the transceiver is further configured to: receive a second instruction sent by the base station, and the second instruction indicates that the user equipment determines second information according to the full power transmission capability and/or the coherent transmission capability.

In one embodiment, the processor is specifically configured to: determine a maximum number of transmission layers of the codebook-based PUSCH, and the maximum number of transmission layers of the codebook-based PUSCH is not greater than S, or not greater than a minimum value among S, R and P, S is a positive integer, R is a maximum layer quantity limit indicated by the base station, and P is a maximum layer quantity limit supported by the user equipment; and determine the codebook subset of the codebook-based PUSCH and/or the second information according to the maximum number of transmission layers of the codebook-based PUSCH.

In one embodiment, a mode that the user equipment reports the full power transmission capability includes at least one of the following modes:

the user equipment reports a codebook subset capability supported by the user equipment, and the codebook subset capability supported by the user equipment is configured to determine, by the base station, at least one of a power amplifier (PA) capability of the user equipment, a full power transmission capability of an antenna port of the user equipment, whether the user equipment supports to use a precoding matrix exceeding pusch-TransCoherence of the user equipment for PUSCH transmission, the codebook subset restriction information of the codebook-based PUSCH, or the full power transmission mode supported by the user equipment;

the user equipment reports a third instruction, and the third instruction is configured to indicate whether the user equipment supports to use the precoding matrix exceeding the pusch-TransCoherence capability of the user equipment for PUSCH transmission;

the user equipment reports PA information and/or antenna port information, and the PA information and/or the antenna port information are/is configured to determine the full power transmission capability of the user equipment;

the user equipment reports an uplink full power transmission mode supported by the user equipment;

the user equipment reports a precoding matrix set, and the precoding matrix set is configured to determine at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment; or the user equipment reports the first antenna port quantity, and the first antenna port quantity is configured to determine the full power transmission capability of the user equipment.

In one embodiment, the PA information includes at least one of the following information: the quantity of PAs supporting the full power transmission of the user equipment, an identifier of the PAs supporting the full power transmission of the user equipment, a sending combination of the PAs supporting the full power transmission of the user equipment, or a fourth instruction.

The antenna port information includes at least one of the following information: the quantity of antenna ports supporting the full power transmission of the user equipment, an identifier of the antenna ports supporting the full power transmission of the user equipment, a sending combination of the antenna ports supporting the full power transmission of the user equipment, or a fifth instruction.

The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment; and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, a combination of the antenna ports corresponding to non-zero elements contained by each precoding matrix in the precoding matrix set supports the full power transmission.

In one embodiment, the user equipment reports the first antenna port quantity. The processor is further configured to: determine the transmission power of the codebook-based PUSCH through the following modes: when the quantity of determined non-zero antenna ports included by a transmission precoding matrix of the codebook-based PUSCH is greater than the first antenna port quantity, a predefined scaling factor is used to scale the basic power of the codebook-based PUSCH, and the scaled PUSCH power is equally allocated to PUSCH antenna ports with non-zero power.

In one embodiment, the user equipment reports the first antenna port quantity. The processor is further configured to: determine the transmission power of the codebook-based PUSCH through the following modes: when the quantity of antenna ports included by a sounding reference signal (SRS) resource for determining the precoding matrix of the PUSCH is smaller than the first antenna port quantity, a predefined scaling factor is used to scale the basic power of the PUSCH, and the scaled power is equally allocated to the PUSCH antenna port with the non-zero power.

In one embodiment, the user equipment reports the full power transmission capability for antenna port quantities respectively.

In one embodiment, a mode that the user equipment reports the full power transmission capability includes reporting, by the user equipment, PA information and/or antenna port information, and the PA information includes the quantity of PAs supporting the full power transmission of the user equipment, and the antenna port information includes the quantity of antenna ports supporting the full power transmission of the user equipment.

In one embodiment, the codebook subset of the codebook-based PUSCH includes one or more precoding matrixes, and each precoding matrix meets the following conditions: the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a first antenna port and a third antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a second antenna port and a fourth antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the processor is further configured to: determine the transmission power of the codebook-based PUSCH through the following modes: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power being the first antenna ports is 1 or a predefined positive number, if N=2, a power control scaling factor of PUSCH corresponding to the precoding matrix with the antenna ports with the non-zero power containing at least one of the first antenna port or the third antenna port is 1 or a predefined positive number, and if N=3, a power control scaling factor of PUSCH corresponding to the precoding matrix with the antenna ports with the non-zero power containing at least one of the first three antenna ports is 1 or a predefined positive number; when the quantity of the antenna ports with the non-zero power is smaller than the quantity of the antenna ports contained in the SRS resource for determining the precoding matrix of the codebook-based PUSCH, if N=1, a power control scaling factor of PUSCH corresponding to the precoding matrix with the antenna ports with the non-zero power not being the first antenna ports is X/I, if N=2, a power control scaling factor of PUSCH corresponding to the precoding matrix with the at least one antenna port with the non-zero power being the antenna ports other than the first antenna port and the third antenna port is X/I, and if N=3, a power control scaling factor of PUSCH corresponding to the precoding matrix with the at least one antenna port with the non-zero power being the antenna port other than the first three antenna ports is X/I, and N is the quantity of PAs supporting the full power transmission of the user equipment, or N is the quantity of the antenna ports supporting the full power transmission of the user equipment, X is the quantity of the antenna ports with the non-zero power in the precoding matrix, and I is the quantity of the antenna ports contained in the SRS resource for determining the precoding matrix of the codebook-based PUSCH.

In one embodiment, a mode that the user equipment reports the full power transmission capability includes reporting, by the user equipment, PA information and/or antenna port information, the PA information includes a fourth instruction, and the antenna port information includes a fifth instruction, and the fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment, and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, the codebook subset of the codebook-based PUSCH includes one or more precoding matrixes, and each precoding matrix meets at least one of the following conditions:
  not exceeding the coherent transmission capability of the user equipment;
  the quantity of the antenna ports with the non-zero power is equal to the quantity of the antenna ports contained in the SRS resource for determining the precoding matrix of the codebook-based PUSCH; or
  the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH includes one or more precoding matrixes, and each precoding matrix meets at least one of the following conditions:
  a combination of any layer of the antenna ports with the non-zero power does not exceed the coherent transmission capability of the user equipment;
  the quantity of the antenna ports with the non-zero power is equal to the quantity of the antenna ports contained in the SRS resource for determining the precoding matrix of the codebook-based PUSCH; or
  the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH is a full set or subset of a set composed of the precoding matrixes meeting any one of following conditions:
  a codeword does not exceed the coherent transmission capability of the user equipment;
  a combination of at least one layer of the antenna ports with the non-zero power exceeds the coherent transmission capability of the user equipment, and the quantity of the antenna ports with the non-zero power is equal to the quantity of the antenna ports contained in the SRS resource for determining the precoding matrix of the codebook-based PUSCH; or
  a combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the transmission power of PUSCH corresponding to each precoding matrix in the codebook subset of the codebook-based PUSCH meets the following conditions: a power control scaling factor of PUSCH corresponding to the precoding matrix with the antenna ports with the non-zero power is a minimum value between (MX)/I and 1, and X is the quantity of the antenna ports with the non-zero power in the precoding matrix, and I is the quantity of the antenna ports contained in the SRS resource for determining the precoding matrix of the codebook-based PUSCH.

In one embodiment, a mode that the user equipment reports the full power transmission capability includes reporting, by the user equipment, a precoding matrix set; and any two precoding matrixes in the precoding matrix set meet the following conditions: at least one layer of the non-zero power ports in any two precoding matrixes are different; or the non-zero power ports in any two precoding matrixes are the same, but the transmission layer quantities of any two precoding matrixes are different.

In one embodiment, a mode that the user equipment reports the full power transmission capability includes reporting, by the user equipment, a precoding matrix set; and any two precoding matrixes in the precoding matrix set meet the following conditions: the antenna ports with the non-zero power in any two precoding matrixes are different.

In one embodiment, a mode that the user equipment reports the full power transmission capability includes reporting, by the user equipment, a precoding matrix set. The codebook subset of the codebook-based PUSCH includes one or more precoding matrixes, and each precoding matrix meets the following conditions: each precoding matrix belongs to precoding matrixes in the precoding matrix set reported by the user equipment.

In one embodiment, a mode that the user equipment reports the full power transmission capability includes reporting, by the user equipment, a precoding matrix set.

The codebook subset of the codebook-based PUSCH includes one or more precoding matrixes, and each precoding matrix meets the following conditions:
- a non-zero port of any precoding matrix is the same as a non-zero port of at least one precoding matrix in the precoding matrix set reported by the user equipment; and
- the non-zero power ports and the transmission layer quantities of at least two precoding matrixes are the same, and relative phases between non-zero antenna ports corresponding to the at least two precoding matrixes are different.

In one embodiment, a mode that the user equipment reports the full power transmission capability includes reporting, by the user equipment, a precoding matrix set. The codebook subset of the codebook-based PUSCH determined by the user equipment includes one or more precoding matrixes, and each precoding matrix meets the following conditions: a combination of any layer of antenna ports with non-zero power does not exceed the coherent transmission capability of the user equipment; or a combination of at least one layer of antenna ports with the non-zero power exceeds the coherent transmission capability of the user equipment, and non-zero ports contained in the combination of at least one layer of the antenna ports with the non-zero power are the same as non-zero ports contained by at least one precoding matrix in the precoding matrix set reported by the user equipment.

In one embodiment, a mode that the user equipment reports the full power transmission capability includes reporting, by the user equipment, a precoding matrix set. The codebook subset of the codebook-based PUSCH is a full set or subset of a set composed of the precoding matrixes meeting any one of following conditions: a precoding matrix not exceeding the coherent transmission capability of the user equipment; or
- a precoding matrix with the contained non-zero antenna ports same as non-zero antenna ports corresponding to one precoding matrix in the precoding matrix set reported by the user equipment.

In one embodiment, the same precoding matrix set reported by the user equipment corresponds to the different codebook subsets of the codebook-based PUSCH under the different coherent transmission capabilities.

In one embodiment, the full power transmission capability includes the user equipment supporting full power transmission but at least one PA not supporting the full power transmission, and the coherent transmission capability is supporting noncoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource for determining codebook-based PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting fullcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource for determining codebook-based PUSCH transmission, and the at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting noncoherent transmission. The codebook subset includes a codebook subset composed of noncoherent transmission codebooks and a first precoding set, and precoding matrixes in the first precoding set meet the following conditions: the quantity of the antenna ports with the non-zero power of any precoding matrix is equal to the quantity of the antenna ports included in an SRS resource for determining codebook-based PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a second precoding set, and a precoding matrix of the second precoding set meets the following conditions: the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a first precoding set, and precoding matrixes of the first precoding set meet the following conditions: the quantity of the antenna ports with the non-zero power of any precoding matrix is equal to the quantity of the antenna ports included in an SRS resource for determining codebook-based PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different.

An embodiment of the present disclosure further provides user equipment, which can implement the flows executed in FIG. 3 of the aforementioned embodiments.

Figure 5:
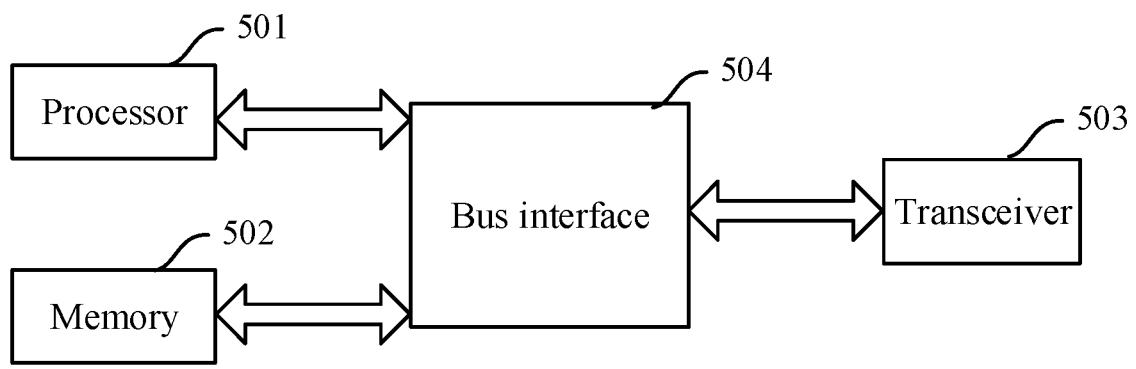
FIG. 5 is a schematic structural diagram of a base station provided by an embodiment of the present disclosure.

Referring to FIG. 5, which is a schematic structural diagram of the base station provided by the embodiment of the present disclosure, as shown in figure, the user equipment may include: a processor 501, a memory 502, a transceiver 503 and a bus interface 504.

The processor 501 is responsible for managing a bus architecture and usual processing, and the memory 502 may store data used by the processor 501 during operation execution. The transceiver 503 is configured to receive and send data under control of the processor 501.

The bus architecture may include any number of interconnected buses and bridges, which are specifically linked together by various circuits of one or more processors represented by the processor 501 and a memory represented by the memory 502. The bus architecture may further link various other circuits such as a peripheral device, a voltage stabilizer and a power management circuit together, which are publicly known in the art and therefore are not further described herein. The bus interface provides an interface. The processor 501 is responsible for managing a bus architecture and usual processing, and the memory 502 may store data used by the processor 501 during operation execution.

A flow disclosed in the embodiment of the disclosure may be applied to the processor 501 or be implemented by the processor 501. In an implementation process, all steps of a signal processing flow may be completed through an integrated logic circuit of hardware in the processor 501 or in a software form. The processor 501 may be a general-purpose processor, a digital signal processor, an application specific integrated circuit, a field-programmable gate array or other programmable logic devices, a discrete gate or a transistor logic device, a discrete hardware component, which can implement or execute all the methods, steps and logic block diagrams disclosed in the embodiment of the present disclosure. The general-purpose processor may be a microprocessor or any conventional processor, etc. The steps of the method disclosed with reference to the embodiment of the present disclosure may be directly embodied as being executed and completed by a hardware processor, or be executed and completed by a hardware and software module combination in the processor. A software module may be located in a random access memory, a flash memory, a read only memory, a programmable read only memory, or an electrically erasable programmable memory, a register and other mature storage mediums in the art. The storage medium is located in the memory 502, and the processor 501 reads information in the memory 502, and is combined with its hardware to complete the steps of the signal processing flow.

The transceiver 503 is configured to receive report information of user equipment, and the report information at least includes a full power transmission capability of the user equipment and/or a coherent transmission capability of the user equipment.

The processor 501 is configured to read programs in the memory 502 and execute the following processes: determining the full power transmission capability and/or the coherent transmission capability according to the report information; determining a codebook subset of a codebook-based PUSCH and/or third information according to the full power transmission capability and the coherent transmission capability, and the third information includes at least one of the following information: an overhead indicated by a precoding matrix and the number of transmission layers of the codebook-based PUSCH, an encoding mode indicated by the precoding matrix and the number of transmission layers of the codebook-based PUSCH, or codebook subset restriction information of the codebook-based PUSCH.

The transceiver 503 is further configured to send uplink scheduling information of the codebook-based PUSCH to the user equipment according to the codebook subset of the codebook-based PUSCH and/or the third information.

In one embodiment, the transceiver is further configured to: send the codebook subset restriction information of the codebook-based PUSCH to the user equipment, the codebook subset restriction information of the codebook-based PUSCH is configured to determine, by the user equipment, the codebook subset of the codebook-based PUSCH and/or second information, the second information includes an overhead of the indication of precoding information and number of layers of the codebook-based PUSCH, and/or an encoding mechanism of the indication of precoding information and number of layers of the codebook-based PUSCH; and the second information includes one of the following information: the overhead of the indication of precoding information and number of layers of the codebook-based PUSCH; the encoding mechanism of the indication of precoding information and number of layers of the codebook-based PUSCH; or the overhead of the indication of precoding information and number of layers of the codebook-based PUSCH, and the encoding mechanism of the indication of precoding information and number of layers of the codebook-based PUSCH.

In one embodiment, the codebook subset restriction information of the codebook-based PUSCH meets at least one of the follows:
- at least one value of the codebook subset restriction information of the codebook-based PUSCH is configured to indicate codebook subset restrictions different from that in 3GPP release version;
- the same value of the codebook subset restriction information of the codebook-based PUSCH represents the different codebook subset restrictions for the different coherent transmission capabilities;
- the codebook subset restriction information of the codebook-based PUSCH at least includes fourth information and fifth information, and the fourth information is configured to indicate an identifier of the codebook subset, and the fifth information is configured to indicate a codebook subset actually corresponding to the fourth information; or
- the same value of the codebook subset restriction information of the codebook-based PUSCH corresponds to different codebook subsets under the conditions that the user equipment receives a codebook subset restriction activation instruction and the user equipment does not receive the codebook subset restriction activation instruction.

In one embodiment, the transceiver is further configured to: send the first instruction to the user equipment, and the first instruction includes instruction for instructing the user equipment whether or not to perform full power transmission and/or instruction for indicating a full power transmission mode of the user equipment.

In one embodiment, the processor is further configured to: determine reference power or reference amplitude corresponding to the precoding matrix in the codebook subset of the codebook-based PUSCH according to the full power transmission capability; or determine the reference power or reference amplitude corresponding to the precoding matrix in the codebook subset of the codebook-based PUSCH according to the coherent transmission capability; or determine the reference power or reference amplitude corresponding to the precoding matrix in the codebook subset of the codebook-based PUSCH according to the full power transmission capability and the coherent transmission capability.

In one embodiment, the transceiver is further configured to: send a second instruction to the user equipment, and the second instruction is configured to indicate that the user equipment determines second information according to the full power transmission capability and/or the coherent transmission capability. The second information includes an overhead of the indication of precoding information and number of layers of the codebook-based PUSCH, and/or an encoding mechanism of the indication of precoding information and number of layers of the codebook-based PUSCH.

In one embodiment, when the first instruction indicates full power transmission of the user equipment, the processor is further configured to: determine a maximum number of transmission layers of the codebook-based PUSCH, and the maximum number of transmission layers of the codebook-based PUSCH is not greater than S, or not greater than a minimum value among S, R and P, and S is a positive integer, R is a maximum layer quantity limit indicated by the base station, and P is a maximum layer quantity limit supported by the user equipment; and determine, by the base station, the codebook subset of the codebook-based PUSCH and/or the third information according to the maximum number of transmission layers of the codebook-based PUSCH.

In one embodiment, when the report information includes the full power transmission capability of the user equipment, the base station receives the report information according to at least one of the following modes:
- the base station receives a codebook subset capability sent by the user equipment, and the base station determines at least one of a power amplifier (PA) capability of the user equipment, a full power transmission capability of an antenna port of the user equipment, whether the user equipment supports to use a precoding matrix exceeding the pusch-TransCoherence capability of the user equipment for PUSCH transmission, or the codebook subset restriction information of the codebook-based PUSCH according to the codebook subset capability;
- the base station receives a third instruction, the third instruction is configured to indicate whether the user equipment supports to use the precoding matrix exceeding the pusch-TransCoherence capability of the user equipment for PUSCH transmission, and the base station determines whether the user equipment supports to use the precoding matrix exceeding pusch-TransCoherence of the user equipment for PUSCH transmission according to the third instruction;
- the base station receives PA information and/or antenna port information sent by the user equipment, and the base station determines the full power transmission capability of the user equipment according to the PA information and/or the antenna port information;
- the base station receives an uplink full power transmission mode supported by the user equipment and sent by the user equipment;
- the base station receives a precoding matrix set, the precoding matrix set is configured to determine at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment, and the base station determines at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment according to the precoding matrix set; or the base station receives the first antenna port quantity, and the base station determines the full power transmission capability of the user equipment according to the first antenna port quantity.

In one embodiment, the PA information includes at least one of the following information: the quantity of PAs supporting the full power transmission of the user equipment, an identifier of the PAs supporting the full power transmission of the user equipment, a sending combination of the PAs supporting the full power transmission of the user equipment, or a fourth instruction. The antenna port information includes at least one of the following information: the quantity of antenna ports supporting the full power transmission of the user equipment, an identifier of the antenna ports supporting the full power transmission of the user equipment, a sending combination of the antenna ports supporting the full power transmission of the user equipment, or a fifth instruction, and the fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment, and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, a combination of the antenna ports corresponding to non-zero elements contained by each precoding matrix in the precoding matrix set supports the full power transmission.

In one embodiment, the base station receives the first antenna port quantity, and the method further includes: the base station determines the reference power or reference amplitude of the codebook-based PUSCH through the following modes: when the quantity of non-zero antenna ports included by one precoding matrix is greater than the first antenna port quantity and one precoding matrix is utilized to measure or detect the codebook-based PUSCH, the reference power or amplitude corresponding to one precoding matrix is scaled by using a predefined scaling factor.

In one embodiment, the base station receives the first antenna port quantity, and the processor is further configured to: determine the reference power or reference amplitude of the codebook-based PUSCH through the following modes: when the quantity of antenna ports included by one sounding reference signal (SRS) resource is smaller than the first antenna port quantity and an SRS on the SRS resource is utilized to calculate a signal to noise ratio corresponding to one precoding matrix, the reference power or amplitude corresponding to the precoding matrix is scaled by using a predefined scaling factor.

In one embodiment, the transceiver is further configured to: receive the full power transmission capabilities respectively sent by the user equipment for antenna port quantities; and the processor is further configured to: determine the full power transmission capabilities of antenna port quantities according to the full power transmission capabilities respectively sent by the user equipment for antenna port quantities.

In one embodiment, a mode that the base station receives the full power transmission capability includes receiving, by the base station, PA information and/or antenna port information, and the PA information includes the quantity of PAs supporting the full power transmission of the user equipment, and the antenna port information includes the quantity of antenna ports supporting the full power transmission of the user equipment.

In one embodiment, the codebook subset of the codebook-based PUSCH includes one or more precoding matrixes, and each precoding matrix meets the following conditions: the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH includes one or more precoding matrixes, and each precoding matrix meets the following conditions: not exceeding the coherent transmission capability of the user equipment; or the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions:
  a codeword does not exceed the coherent transmission capability of the user equipment;
  a combination of at least one layer of the antenna ports with the non-zero power does not exceed the coherent transmission capability of the user equipment; or
  when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are the first antenna port and a third antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a second antenna port and a fourth antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the reference power or reference amplitude of PUSCH corresponding to each precoding matrix in the codebook subset of the codebook-based PUSCH meets the following conditions: a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number; when the quantity of the antenna ports with the non-zero power is smaller than the quantity of the antenna ports contained in the SRS resource for determining the precoding matrix of the codebook-based PUSCH, and N=1, a power control scaling factor of PUSCH corresponding to the precoding matrix with the antenna ports with the non-zero power being the first antenna ports is 1 or a predefined positive number, when N=2, a power control scaling factor of PUSCH corresponding to the precoding matrix with the antenna ports with the non-zero power containing at least one of the first antenna port or the third antenna port is 1 or a predefined positive number, and when N=3, a power control scaling factor of PUSCH corresponding to the precoding matrix with the antenna ports with the non-zero power containing at least one of the first three antenna ports is 1 or a predefined positive number; when the quantity of the antenna ports with the non-zero power is smaller than the quantity of the antenna ports contained in the SRS resource for determining the precoding matrix of the codebook-based PUSCH, and N=1, a power control scaling factor of PUSCH corresponding to the precoding matrix with the antenna ports with the non-zero power not being the first antenna ports is X/I, when N=2, a power control scaling factor of PUSCH corresponding to the precoding matrix with the at least one antenna port with the non-zero power being the antenna ports other than the first antenna port and the third antenna port is X/I, and when N=3, a power control scaling factor of PUSCH corresponding to the precoding matrix with the at least one antenna port with the non-zero power being the antenna port other than the first three antenna ports is X/I, and N is the quantity of PAs supporting the full power transmission of the user equipment, or N is the quantity of the antenna ports supporting the full power transmission of the user equipment, X is the quantity of the antenna ports with the non-zero power in the precoding matrix, and I is the quantity of the antenna ports contained in the SRS resource for determining the precoding matrix of the codebook-based PUSCH.

In one embodiment, a mode that the base station receives the full power transmission capability includes receiving, by the base station, PA information and/or antenna port information, the PA information includes a fourth instruction, and the antenna port information includes a fifth instruction, and the fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment, and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, the codebook subset of the codebook-based PUSCH includes one or more precoding matrixes, and each precoding matrix meets at least one of the following conditions: not exceeding the coherent transmission capability of the user equipment; the quantity of the antenna ports with the non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH includes one or more precoding matrixes, and each precoding matrix meets at least one of the following conditions: a combination of any layer of antenna ports with the non-zero power does not exceed the coherent transmission capability of the user equipment; the quantity of the antenna ports with the non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, the quantity of the antenna ports with the non-zero power is not smaller than M, and M is a positive number.

In one embodiment, the codebook subset of the codebook-based PUSCH is a full set or subset of a set composed of the precoding matrixes meeting any one of following conditions: a codeword does not exceed the coherent transmission capability of the user equipment; or a combination of at least one layer of antenna ports with non-zero power exceeds the coherent transmission capability of the user equipment, the quantity of the antenna ports with the non-zero power is equal to the quantity of the antenna ports contained in the SRS resource for determining the precoding matrix of the codebook-based PUSCH; or the combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, the quantity of the antenna ports with the non-zero power is not smaller than M, and M is a positive number.

In one embodiment, the reference power or reference amplitude of PUSCH corresponding to each precoding matrix in the codebook subset of the codebook-based PUSCH meets the following conditions: a power control scaling factor of PUSCH corresponding to the precoding matrix with the antenna ports with the non-zero power is a minimum value between (MX)/I and 1, and X is the quantity of the antenna ports with the non-zero power in the precoding matrix, I is the quantity of the antenna ports contained in the SRS resource for determining the precoding matrix of the codebook-based PUSCH, and M is a positive number.

In one embodiment, a mode that the base station receives the full power transmission capability includes receiving, by the base station, a precoding matrix set;
any two precoding matrixes in the precoding matrix set meet the following conditions: at least one layer of antenna ports with non-zero power in any two precoding matrixes are different; or the antenna ports with the non-zero power in any two precoding matrixes are the same, but the transmission layer quantities of any two precoding matrixes are different.

In one embodiment, a mode that the base station receives the full power transmission capability includes receiving, by the base station, a precoding matrix set; and any two precoding matrixes in the precoding matrix set meet the following conditions: antenna ports with the non-zero power in any two precoding matrixes are different.

In one embodiment, a mode that the base station receives the full power transmission capability includes receiving, by the base station, a precoding matrix set; and
the codebook subset of the codebook-based PUSCH includes one or more precoding matrixes, and each precoding matrix meets the following conditions: each precoding matrix belongs to precoding matrixes in the precoding matrix set reported by the user equipment.

In one embodiment, a mode that the base station receives the full power transmission capability includes receiving, by the base station, a precoding matrix set. The codebook subset of the codebook-based PUSCH includes one or more precoding matrixes, and each precoding matrix meets the following conditions: non-zero ports of any precoding matrix are the same as non-zero ports of at least one precoding matrix in the precoding matrix set reported by the user equipment; the non-zero power ports and the transmission layer quantities of the at least two precoding matrixes are the same, and relative phases between the non-zero antenna ports corresponding to the at least two precoding matrixes are different.

In one embodiment, a mode that the base station receives the full power transmission capability includes receiving, by the base station, a precoding matrix set. The codebook subset of the codebook-based PUSCH includes one or more precoding matrixes, and each precoding matrix meets the following conditions: a combination of any layer of antenna ports with non-zero power does not exceed the coherent transmission capability of the user equipment; or a combination of at least one layer of antenna ports with the non-zero power exceeds the coherent transmission capability of the user equipment, and the non-zero ports are the same as non-zero ports of at least one precoding matrix in the precoding matrix set sent by the user equipment.

In one embodiment, a mode that the base station receives the full power transmission capability includes receiving, by the base station, a precoding matrix set. The codebook subset of the codebook-based PUSCH is a full set or subset of a set composed of the precoding matrixes meeting any one of following conditions: not exceeding the coherent transmission capability of the user equipment; or the contained non-zero antenna ports are the same as non-zero antenna ports corresponding to one precoding matrix in the precoding matrix set sent by the user equipment.

In one embodiment, a mode that the base station receives the full power transmission capability includes receiving, by the base station, the same precoding matrix set; and the determining, by the base station, the codebook subset of the codebook-based PUSCH according to the coherent transmission capability, includes: the base station determines the different codebook subsets of the codebook-based PUSCH corresponding to the same precoding matrix set according to the different coherent transmission capabilities.

In one embodiment, the full power transmission capability includes the user equipment supporting full power transmission but at least one PA not supporting the full power transmission, and the coherent transmission capability is supporting noncoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource obtained by CSI for determining the codebook-based PUSCH, and the at least one layer of the non-zero power ports in any two precoding matrixes are different; or the quantity of the antenna ports with the non-zero power of any precoding matrix is equal to the quantity of the antenna ports included in the SRS resource obtained by CSI for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting fullcoherent transmission. The precoding matrixes in the codebook subset of the codebook-based PUSCH meet the following conditions: the quantity of the antenna ports with the non-zero power of any precoding matrix is equal to the quantity of the antenna ports included in an SRS resource obtained by CSI for determining the codebook-based PUSCH, and the at least one layer of the non-zero power ports in any two precoding matrixes are different; or the quantity of the antenna ports with the non-zero power of any precoding matrix is equal to the quantity of the antenna ports included in the SRS resource obtained by CSI for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting noncoherent transmission. The codebook subset includes a codebook subset composed of noncoherent transmission codebooks and a first precoding set, and precoding matrixes in the first precoding set meet the following conditions: the quantity of the antenna ports with the non-zero power of any precoding matrix is equal to the quantity of the antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a second precoding set. Precoding matrixes in the second precoding set meet the following conditions: the quantity of the antenna ports with the non-zero power of any precoding matrix is equal to the quantity of the antenna ports included in an SRS resource obtained by CSI for determining the codebook-based PUSCH, and at least one layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a first precoding set, and precoding matrixes of the first precoding set meet the following conditions: the quantity of the antenna ports with the non-zero power of any precoding matrix is equal to the quantity of the antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different.

Based on embodiment of the present disclosure further provides user equipment, which can implement the flows executed in FIG. 2 of the aforementioned embodiments.

Figure 6:
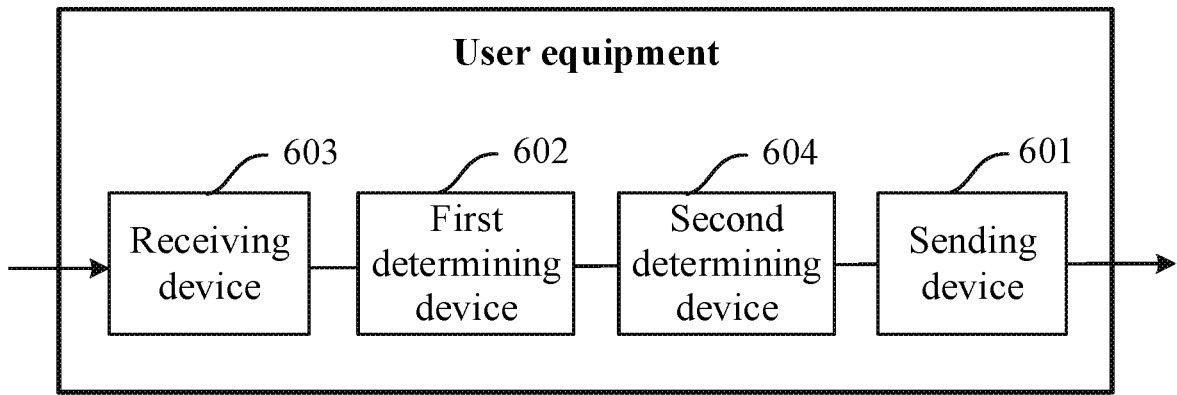
FIG. 6 is a schematic structural diagram of a UE provided by an embodiment of the present disclosure.

FIG. 6 is a schematic structural diagram of user equipment provided by an embodiment of the present disclosure.

As shown in the figure, the user equipment includes a sending device 601, a first determining device 602, a receiving device 603 and a second determining device 604.

The sending device 601 is configured to report a full power transmission capability of the user equipment and/or a coherent transmission capability of the user equipment to a base station.

The first determining device 602 is configured to determine a codebook subset of a codebook-based PUSCH and/or second information according to first information, and the first information includes at least one of the following information: a full power transmission capability, a coherent transmission capability, codebook subset restriction information, or a first instruction, the second information includes an overhead of the indication of precoding information and number of layers of the codebook-based PUSCH, and/or an encoding mechanism of the indication of precoding information and number of layers of the codebook-based PUSCH, and the first instruction includes an instruction for instructing the user equipment whether or not to perform full power transmission and/or an instruction for indicating a full power transmission mode of the user equipment.

The receiving device 603 is configured to receive uplink scheduling information of the codebook-based PUSCH sent by the base station.

The second determining device 604 is configured to determine, by the user equipment, the precoding matrix and the number of transmission layers of the codebook-based PUSCH according to the uplink scheduling information of the codebook-based PUSCH, the codebook subset of the codebook-based PUSCH and the second information sent by the base station.

In one embodiment, the first information includes the codebook subset restriction information, and the codebook subset restriction information of the codebook-based PUSCH meets at least one of the follows:
- at least one value of the codebook subset restriction information of the codebook-based PUSCH is configured to indicate codebook subset restrictions different from that in 3GPP release 15 version;
- the same value of the codebook subset restriction information of the codebook-based PUSCH represents the different codebook subset restrictions for the different coherent transmission capabilities;
- the codebook subset restriction information of the codebook-based PUSCH at least includes fourth information and fifth information, and the fourth information is configured to indicate an identifier of the codebook subset, and the fifth information is configured to indicate a codebook subset actually corresponding to the fourth information; or
- the same value of the codebook subset restriction information of the codebook-based PUSCH corresponds to different codebook subsets under the conditions that the user equipment receives a codebook subset restriction activation instruction and the user equipment does not receive the codebook subset restriction activation instruction.

In one embodiment, the first information includes the first instruction, and before the user equipment determines the codebook subset of the codebook-based PUSCH and/or the second information according to the first information, the method further includes: the user equipment receives the first instruction sent by the base station.

In one embodiment, the method further includes: the user equipment determines transmission power of the codebook-based PUSCH according to the full power transmission capability; or the user equipment determines the transmission power of the codebook-based PUSCH according to the coherent transmission capability; or the user equipment determines the transmission power of the codebook-based PUSCH according to the codebook subset restriction information of the codebook-based PUSCH; or the user equipment determines the transmission power of the codebook-based PUSCH according to the full power transmission capability and the coherent transmission capability; or the user equipment determines the transmission power of the codebook-based PUSCH according to the full power transmission capability and the codebook subset restriction information of the codebook-based PUSCH; or the user equipment determines the transmission power of the codebook-based PUSCH according to the coherent transmission capability and the codebook subset restriction information of the codebook-based PUSCH; or the user equipment determines the transmission power of the codebook-based PUSCH according to the full power transmission capability, the coherent transmission capability and the codebook subset restriction information of the codebook-based PUSCH; or the user equipment determines the transmission power of the codebook-based PUSCH according to a full power transmission mode indicated by the instruction of the full power transmission mode of the user equipment; or the user equipment determines the transmission power of the codebook-based PUSCH according to the full power transmission mode indicated by the instruction of the full power transmission mode of the user equipment and the full power transmission capability; or the user equipment determines the transmission power of the codebook-based PUSCH according to the full power transmission mode indicated by the instruction of the full power transmission mode of the user equipment and the coherent transmission capability; or the user equipment determines the transmission power of the codebook-based PUSCH according to the full power transmission mode indicated by the instruction of the full power transmission mode of the user equipment and the codebook subset restriction information of the codebook-based PUSCH; or the user equipment determines the transmission power of the codebook-based PUSCH according to the full power transmission mode indicated by the instruction of the full power transmission mode of the user equipment, the full power transmission capability and the coherent transmission capability; or the user equipment determines the transmission power of the codebook-based PUSCH according to the full power transmission mode indicated by the instruction of the full power transmission mode of the user equipment, the codebook subset restriction information of the codebook-based PUSCH and the coherent transmission capability; or the user equipment determines the transmission power of the codebook-based PUSCH according to the full power transmission mode indicated by the instruction of the full power transmission mode of the user equipment, the codebook subset restriction information of the codebook-based PUSCH and the full power transmission capability; or the user equipment determines the transmission power of the codebook-based PUSCH according to the full power transmission mode indicated by the instruction of the full power transmission mode of the user equipment, the codebook subset restriction information of the codebook-based PUSCH, the full power transmission capability and the coherent transmission capability.

In one embodiment, the before the user equipment determines the codebook subset of the codebook-based PUSCH and/or the second information according to the first information, the method further includes: the user equipment receives second instruction sent by the base station, and the second instruction indicates that the user equipment determines the second information according to the full power transmission capability and/or the coherent transmission capability.

In one embodiment, the first information includes the first instruction, and when the first instruction indicates that the user equipment performs full power transmission, the determining, by the user equipment, the codebook subset of the codebook-based PUSCH and/or the second information according to the first information, includes:
- the user equipment determines a maximum number of transmission layers of the codebook-based PUSCH, and the maximum number of transmission layers of the codebook-based PUSCH is not greater than S, or not greater than a minimum value among S, R and P, S is a positive integer, R is a maximum layer quantity limit indicated by the base station, and P is a maximum layer quantity limit supported by the user equipment; and
- the user equipment determines the codebook subset of the codebook-based PUSCH and/or the second information according to the maximum number of transmission layers of the codebook-based PUSCH.

In one embodiment, a mode that the user equipment reports the full power transmission capability includes at least one of the following modes:
- the user equipment reports a codebook subset capability supported by the user equipment, and the codebook subset capability supported by the user equipment is configured to determine, by the base station, at least one of a power amplifier (PA) capability of the user equipment, a full power transmission capability of an antenna port of the user equipment, whether the user equipment supports to use a precoding matrix exceeding pusch-TransCoherence of the user equipment for PUSCH transmission, the codebook subset restriction information of the codebook-based PUSCH, or the full power transmission mode supported by the user equipment;

the user equipment reports third instruction, and the third instruction is configured to indicate whether the user equipment supports to use the precoding matrix exceeding the pusch-TransCoherence capability of the user equipment for PUSCH transmission;

the user equipment reports PA information and/or antenna port information, and the PA information and/or the antenna port information are/is configured to determine the full power transmission capability of the user equipment;

the user equipment reports an uplink full power transmission mode supported by the user equipment;

the user equipment reports a precoding matrix set, and the precoding matrix set is configured to determine at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment; or the user equipment reports the first antenna port quantity, and the first antenna port quantity is configured to determine the full power transmission capability of the user equipment.

In one embodiment, the PA information includes at least one of the following information: the quantity of PAs supporting the full power transmission of the user equipment, an identifier of the PAs supporting the full power transmission of the user equipment, a sending combination of the PAs supporting the full power transmission of the user equipment, or a fourth instruction.

The antenna port information includes at least one of the following information: the quantity of antenna ports supporting the full power transmission of the user equipment, an identifier of the antenna ports supporting the full power transmission of the user equipment, a sending combination of the antenna ports supporting the full power transmission of the user equipment, or fifth instruction.

The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment; and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, a combination of the antenna ports corresponding to non-zero elements contained by each precoding matrix in the precoding matrix set supports the full power transmission.

In one embodiment, the user equipment reports the first antenna port quantity. The method further includes: the user equipment determines the transmission power of the codebook-based PUSCH through the following modes: when the quantity of determined non-zero antenna ports included by a transmission precoding matrix of the codebook-based PUSCH is greater than the first antenna port quantity, a predefined scaling factor is used to scale basic power of the codebook-based PUSCH, and the scaled PUSCH power is equally allocated to PUSCH antenna ports with non-zero power.

In one embodiment, the user equipment reports the first antenna port quantity. The method further includes: the user equipment determines the transmission power of the codebook-based PUSCH through the following modes: when the quantity of antenna ports included by a sounding reference signal (SRS) resource for determining the precoding matrix of the PUSCH is smaller than the first antenna port quantity, a predefined scaling factor is used to scale the basic power of the PUSCH, and the scaled power is equally allocated to the PUSCH antenna port with the non-zero power.

In one embodiment, the user equipment reports the full power transmission capability for antenna port quantities respectively.

In one embodiment, a mode that the user equipment reports the full power transmission capability includes reporting, by the user equipment, PA information and/or antenna port information, and the PA information includes the quantity of PAs supporting the full power transmission of the user equipment, and the antenna port information includes the quantity of antenna ports supporting the full power transmission of the user equipment.

In one embodiment, the codebook subset of the codebook-based PUSCH includes one or more precoding matrixes, and each precoding matrix meets the following conditions:

the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH includes one or more precoding matrixes, and each precoding matrix meets the following conditions:

not exceeding the coherent transmission capability of the user equipment; or the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; when the quantity of the antenna ports with the non-zero power is smaller than the quantity of the antenna ports contained in the SRS resource for determining the precoding matrix of the codebook-based PUSCH, N=1, the antenna port with the non-zero power is a first antenna port, if N=2, the antenna ports with the non-zero power are the first antenna port and a third antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions: a codeword does not exceed the coherent transmission capability of the user equipment; a combination of at least one layer of antenna ports with non-zero power exceeds the coherent transmission capability of the user equipment; when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a second antenna port and a fourth antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the method further includes: the user equipment determines the transmission power of the codebook-based PUSCH through the following modes:
  a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number;
  when the quantity of the antenna ports with the non-zero power is smaller than the quantity of the antenna ports contained in the SRS resource for determining the precoding matrix of the codebook-based PUSCH, and N=1, a power control scaling factor of PUSCH corresponding to the precoding matrix with the antenna ports with the non-zero power being the first antenna ports is 1 or a predefined positive number, when N=2, a power control scaling factor of PUSCH corresponding to the precoding matrix with the antenna ports with the non-zero power containing at least one of the first antenna port and the third antenna port is 1 or a predefined positive number, and when N=3, a power control scaling factor of PUSCH corresponding to the precoding matrix with the antenna ports with the non-zero power containing at least one of the first three antenna ports is 1 or a predefined positive number; or
  when the quantity of the antenna ports with the non-zero power is smaller than the quantity of the antenna ports contained in the SRS resource for determining the precoding matrix of the codebook-based PUSCH, and N=1, a power control scaling factor of PUSCH corresponding to the precoding matrix with the antenna ports with the non-zero power not being the first antenna ports is X/I, when N=2, a power control scaling factor of PUSCH corresponding to the precoding matrix with the at least one antenna port with the non-zero power being antenna ports other than the first antenna port and the third antenna port is X/I, and when N=3, a power control scaling factor of PUSCH corresponding to the precoding matrix with the at least one antenna port with the non-zero power being the antenna ports other than the first three antenna ports is X/I, and N is the quantity of PAs supporting the full power transmission of the user equipment, or N is the quantity of the antenna ports supporting the full power transmission of the user equipment, X is the quantity of the antenna ports with the non-zero power in the precoding matrix, and I is the quantity of the antenna ports contained in the SRS resource for determining the precoding matrix of the codebook-based PUSCH.

In one embodiment, a mode that the user equipment reports the full power transmission capability includes reporting, by the user equipment, PA information and/or antenna port information, the PA information includes fourth instruction, and the antenna port information includes fifth instruction, and the fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment, and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, the codebook subset of the codebook-based PUSCH includes one or more precoding matrixes, and each precoding matrix meets at least one of the following conditions:
  not exceeding the coherent transmission capability of the user equipment;
  the quantity of the antenna ports with the non-zero power is equal to the quantity of the antenna ports contained in the SRS resource for determining the precoding matrix of the codebook-based PUSCH; or
  the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH includes one or more precoding matrixes, and each precoding matrix meets at least one of the following conditions:
　　a combination of any layer of the antenna ports with the non-zero power does not exceed the coherent transmission capability of the user equipment;
　　the quantity of the antenna ports with the non-zero power is equal to the quantity of the antenna ports contained in the SRS resource for determining the precoding matrix of the codebook-based PUSCH; or
　　the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH is a full set or subset of a set composed of the precoding matrixes meeting any one of following conditions:
　　a codeword does not exceed the coherent transmission capability of the user equipment;
　　a combination of at least one layer of the antenna ports with the non-zero power exceeds the coherent transmission capability of the user equipment, and the quantity of the antenna ports with the non-zero power is equal to the quantity of the antenna ports contained in the SRS resource for determining the precoding matrix of the codebook-based PUSCH; or
　　a combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the transmission power of PUSCH corresponding to each precoding matrix in the codebook subset of the codebook-based PUSCH meets the following conditions: a power control scaling factor of PUSCH corresponding to the precoding matrix with the antenna ports with the non-zero power is a minimum value between (MX)/I and 1, and X is the quantity of the antenna ports with the non-zero power in the precoding matrix, and I is the quantity of the antenna ports contained in the SRS resource for determining the precoding matrix of the codebook-based PUSCH.

In one embodiment, a mode that the user equipment reports the full power transmission capability includes reporting, by the user equipment, a precoding matrix set; and any two precoding matrixes in the precoding matrix set meet the following conditions:
　　at least one layer of non-zero power ports in any two precoding matrixes are different; or the non-zero power ports in any two precoding matrixes are the same, but the transmission layer quantities of any two precoding matrixes are different.

In one embodiment, a mode that the user equipment reports the full power transmission capability includes reporting, by the user equipment, a precoding matrix set; and any two precoding matrixes in the precoding matrix set meet the following conditions: the antenna ports with the non-zero power in any two precoding matrixes are different.

In one embodiment, a mode that the user equipment reports the full power transmission capability includes reporting, by the user equipment, a precoding matrix set. The codebook subset of the codebook-based PUSCH includes one or more precoding matrixes, and each precoding matrix meets the following conditions: each precoding matrix belongs to precoding matrixes in the precoding matrix set reported by the user equipment.

In one embodiment, a mode that the user equipment reports the full power transmission capability includes reporting, by the user equipment, a precoding matrix set. The codebook subset of the codebook-based PUSCH includes one or more precoding matrixes, and each precoding matrix meets the following conditions: non-zero ports of any precoding matrix are the same as non-zero ports of at least one precoding matrix in the precoding matrix set reported by the user equipment; and the non-zero power ports and the transmission layer quantities of the at least two precoding matrixes are the same, and relative phases between the non-zero antenna ports corresponding to the at least two precoding matrixes are different.

In one embodiment, a mode that the user equipment reports the full power transmission capability includes reporting, by the user equipment, a precoding matrix set. The codebook subset of the codebook-based PUSCH determined by the user equipment includes one or more precoding matrixes, and each precoding matrix meets the following conditions: a combination of any layer of antenna ports with non-zero power does not exceed the coherent transmission capability of the user equipment; or a combination of at least one layer of antenna ports with the non-zero power exceeds the coherent transmission capability of the user equipment, and non-zero ports contained in the combination of at least one layer of the antenna ports with the non-zero power are the same as non-zero ports contained by at least one precoding matrix in the precoding matrix set reported by the user equipment.

In one embodiment, a mode that the user equipment reports the full power transmission capability includes reporting, by the user equipment, a precoding matrix set. The codebook subset of the codebook-based PUSCH is a full set or subset of a set composed of the precoding matrixes meeting any one of following conditions: a precoding matrix does not exceed the coherent transmission capability of the user equipment; or the contained non-zero antenna ports are the same as non-zero antenna ports corresponding to one precoding matrix in the precoding matrix set reported by the user equipment.

In one embodiment, the same precoding matrix set reported by the user equipment corresponds to the different codebook subsets of the codebook-based PUSCH under the different coherent transmission capabilities.

In one embodiment, the full power transmission capability includes the user equipment supporting full power transmission but at least one PA not supporting the full power transmission, and the coherent transmission capability is supporting noncoherent transmission. The precoding matrixes in the codebook subset of the codebook-based PUSCH meet the following conditions:
　　the quantity of antenna ports with non-zero power of any precoding matrix is equal to the quantity of antenna ports included in an SRS resource for determining PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the antenna ports with the non-zero power of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The precoding matrixes in the codebook subset of the codebook-based PUSCH meet the following conditions:

the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting fullcoherent transmission. The precoding matrixes in the codebook subset of the codebook-based PUSCH meet the following conditions:

the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting noncoherent transmission. The codebook subset includes a codebook subset composed of noncoherent transmission codebooks, and a first precoding set. Precoding matrixes in the first precoding set meet the following conditions:

the quantity of antenna ports with non-zero power of any precoding matrix is equal to the quantity of antenna ports included in an SRS resource for determining PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the antenna ports with the non-zero power of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a second precoding set. Precoding matrixes in the second precoding set meet the following conditions:

the quantity of the antenna ports with the non-zero power of any precoding matrix is equal to the quantity of the antenna ports included in an SRS resource for determining codebook-based PUSCH transmission, and at least one layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource for determining codebook-based PUSCH transmission, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a first precoding set. Precoding matrixes in the first precoding set meet the following conditions:

the quantity of antenna ports with non-zero power of any precoding matrix is equal to the quantity of antenna ports included in an SRS resource for determining PUSCH transmission, and at least one corresponding layer of the non-zero power ports in any two precoding matrixes are different; or the quantity of the antenna ports with the non-zero power of any precoding matrix is equal to the quantity of the antenna ports included in the SRS resource for determining codebook-based PUSCH transmission, the antenna ports with the non-zero power of any two precoding matrixes are the same, but the transmission layer quantities of any two precoding matrixes are different.

Based on an embodiment of the present disclosure further provides a base station, which can implement the flows executed in FIG. 3 of the aforementioned embodiments.

Figure 7:
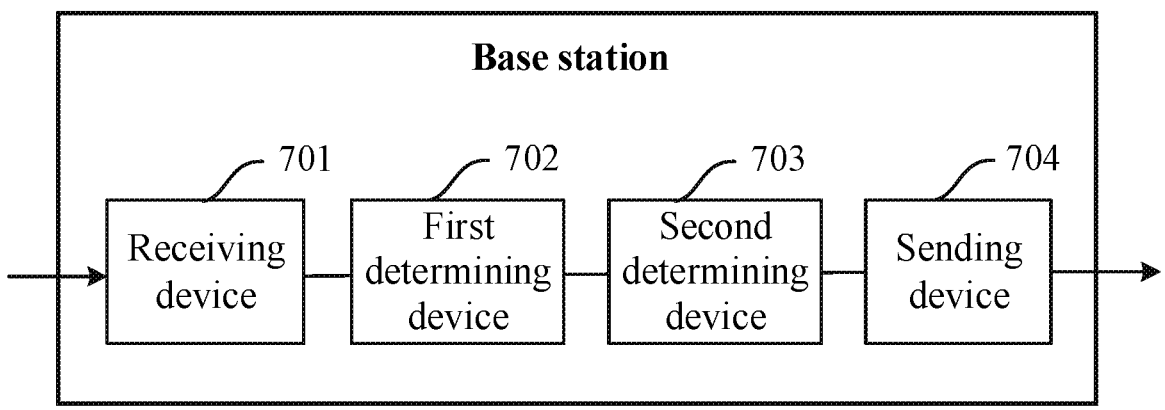
FIG. 7 is a schematic structural diagram of a base station provided by an embodiment of the present disclosure.

FIG. 7 is a schematic structural diagram of a base station provided by an embodiment of the present disclosure.

As shown in the figure, the base station includes a receiving device 701, a first determining device 702, a second determining device 703 and a sending device 704.

The receiving device 701 is configured to receive report information of user equipment, and the report information at least includes a full power transmission capability of the user equipment and/or a coherent transmission capability of the user equipment.

The first determining device 702 is configured to determine the full power transmission capability and the coherent transmission capability of the user equipment according to the report information.

The second determining device 703 is configured to determine a codebook subset of a codebook-based PUSCH and/or third information according to the full power transmission capability and/or the coherent transmission capability, and the third information includes at least one of the following information: an overhead indicated by a precoding matrix and the number of transmission layers of the codebook-based PUSCH, an encoding mode indicated by the precoding matrix and the number of transmission layers of the codebook-based PUSCH, or codebook subset restriction information of the codebook-based PUSCH.

The sending device 704 is configured to send uplink scheduling information of the codebook-based PUSCH to the user equipment according to the codebook subset of the codebook-based PUSCH and/or the third information.

In one embodiment, before the base station sends the uplink scheduling information of the codebook-based PUSCH to the user equipment according to the codebook subset of the codebook-based PUSCH and/or the third information, the method further includes:

the base station sends the codebook subset restriction information of the codebook-based PUSCH to the user equipment, the codebook subset restriction information of the codebook-based PUSCH is configured to determine, by the user equipment, the codebook subset of the codebook-based PUSCH and/or second information, the second information includes an overhead of the indication of precoding information and number of layers of the codebook-based PUSCH, and/or an encoding mechanism of the indication of precoding information and number of layers of the codebook-based PUSCH; and the second information includes one of the following information: the overhead of the indication of precoding information and number of layers of the codebook-based PUSCH; the encoding mechanism of the indication of precoding information and number of layers of the codebook-based PUSCH; or the overhead of the indication of precoding information and number of layers of the codebook-based PUSCH, and the encoding mechanism of the indication of precoding information and number of layers of the codebook-based PUSCH.

In one embodiment, the codebook subset restriction information of the codebook-based PUSCH meets at least one of the follows:

at least one value of the codebook subset restriction information of the codebook-based PUSCH is configured to indicate codebook subset restrictions different from that in 3GPP release 15 version;

the same value of the codebook subset restriction information of the codebook-based PUSCH represents the different codebook subset restrictions for the different coherent transmission capabilities;

the codebook subset restriction information of the codebook-based PUSCH at least includes fourth information and fifth information, and the fourth information is configured to indicate an identifier of the codebook subset, and the fifth information is configured to indicate a codebook subset actually corresponding to the fourth information; or the same value of the codebook subset restriction information of the codebook-based PUSCH corresponds to different codebook subsets under the conditions that the user equipment receives a codebook subset restriction activation instruction and the user equipment does not receive the codebook subset restriction activation instruction.

In one embodiment, before the base station sends the uplink scheduling information of the codebook-based PUSCH to the user equipment according to the codebook subset of the codebook-based PUSCH and/or the third information, the method further includes:

the base station sends first instruction to the user equipment, and the first instruction includes instruction for instructing the user equipment whether or not to perform full power transmission and/or instruction for indicating a full power transmission mode of the user equipment.

In one embodiment, the method further includes: the base station determines reference power or reference amplitude corresponding to the precoding matrix in the codebook subset of the codebook-based PUSCH according to the full power transmission capability; or the base station determines the reference power or reference amplitude corresponding to the precoding matrix in the codebook subset of the codebook-based PUSCH according to the coherent transmission capability; or the base station determines the reference power or reference amplitude corresponding to the precoding matrix in the codebook subset of the codebook-based PUSCH according to the full power transmission capability and the coherent transmission capability.

In one embodiment, the method further includes: the base station sends second instruction to the user equipment, and the second instruction is configured to indicate that the user equipment determines the second information according to the full power transmission capability and/or the coherent transmission capability. The second information includes the overhead of the indication of precoding information and number of layers of the codebook-based PUSCH, and/or an encoding mechanism of the indication of precoding information and number of layers of the codebook-based PUSCH.

In one embodiment, when the first instruction indicates that the user equipment performs full power transmission, the method further includes:

the base station determines a maximum number of transmission layers of the codebook-based PUSCH, and the maximum number of transmission layers of the codebook-based PUSCH is not greater than S, or not greater than a minimum value among S, R and P, S is a positive integer, R is a maximum layer quantity limit indicated by the base station, and P is a maximum layer quantity limit supported by the user equipment; and the base station determines the codebook subset of the codebook-based PUSCH and/or the third information according to the maximum number of transmission layers of the codebook-based PUSCH.

In one embodiment, when the report information includes the full power transmission capability of the user equipment, the base station receives the report information according to at least one of the following modes:

the base station receives a codebook subset capability sent by the user equipment, and the base station determines at least one of a power amplifier (PA) capability of the user equipment, a full power transmission capability of an antenna port of the user equipment, whether the user equipment supports to use a precoding matrix exceeding pusch-TransCoherence of the user equipment for PUSCH transmission, or the codebook subset restriction information of the codebook-based PUSCH according to the codebook subset capability;

the base station receives third instruction, the third instruction is configured to indicate whether the user equipment supports to use the precoding matrix exceeding the pusch-TransCoherence capability of the user equipment for PUSCH transmission, and the base station determines whether the user equipment supports to use the precoding matrix exceeding the pusch-TransCoherence capability of the user equipment for PUSCH transmission according to the third instruction;

the base station receives PA information and/or antenna port information sent by the user equipment, and the base station determines the full power transmission capability of the user equipment according to the PA information and/or the antenna port information;

the base station receives an uplink full power transmission mode supported by the user equipment and sent by the user equipment;

the base station receives a precoding matrix set, the precoding matrix set is configured to determine at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment, and the base station determines at least one of the PA capability of the user equipment, the full power transmission capability of the antenna port of the user equipment, whether the user equipment supports to use the precoding matrix exceeding the pusch-TransCoherence capability of the user equipment for PUSCH transmission, the codebook subset restriction information of the codebook-based PUSCH, or the precoding matrix of full power transmission of the user equipment according to the precoding matrix set; or the base station receives the first antenna port quantity, and the base station determines the full power transmission capability of the user equipment according to the first antenna port quantity.

In one embodiment, the PA information includes at least one of the following information: the quantity of PAs supporting the full power transmission of the user equipment, an identifier of the PAs supporting the full power transmission of the user equipment, a sending combination of the PAs supporting the full power transmission of the user equipment, or a fourth instruction.

The antenna port information includes at least one of the following information: the quantity of antenna ports supporting the full power transmission of the user equipment, an identifier of the antenna ports supporting the full power transmission of the user equipment, a sending combination of the antenna ports supporting the full power transmission of the user equipment, or fifth instruction.

The fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment; and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, a combination of the antenna ports corresponding to non-zero elements contained by each precoding matrix in the precoding matrix set supports the full power transmission.

In one embodiment, the base station receives the first antenna port quantity, and the method further includes: the base station determines the reference power or reference amplitude of the codebook-based PUSCH through the following modes: when the quantity of non-zero antenna ports included by one precoding matrix is greater than the first antenna port quantity and one precoding matrix is utilized to measure or detect the codebook-based PUSCH, the reference power or amplitude corresponding to one precoding matrix is scaled by using a predefined scaling factor.

In one embodiment, the base station receives the first antenna port quantity, and the method further includes: the base station determines the reference power or reference amplitude of the codebook-based PUSCH through the following modes: when the quantity of antenna ports included by one sounding reference signal (SRS) resource is smaller than the first antenna port quantity and an SRS on the SRS resource is utilized to calculate a signal to noise ratio corresponding to one precoding matrix, the reference power or amplitude corresponding to the precoding matrix is scaled by using a predefined scaling factor.

In one embodiment, the method further includes: the base station receives the full power transmission capabilities respectively sent by the user equipment for antenna port quantities; and the base station determines the full power transmission capabilities of antenna port quantities according to the full power transmission capabilities respectively sent by the user equipment for antenna port quantities.

In one embodiment, a mode that the base station receives the full power transmission capability includes receiving, by the base station, PA information and/or antenna port information, and the PA information includes the quantity of PAs supporting the full power transmission of the user equipment, and the antenna port information includes the quantity of antenna ports supporting the full power transmission of the user equipment.

In one embodiment, the codebook subset of the codebook-based PUSCH includes one or more precoding matrixes, and each precoding matrix meets the following conditions: the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH includes one or more precoding matrixes, and each precoding matrix meets at least one of the following conditions:
not exceeding the coherent transmission capability of the user equipment; or the quantity of antenna ports with non-zero power is equal to the quantity of antenna ports contained in the SRS resource for determining the precoding matrix of the codebook-based PUSCH; or the quantity of the antenna ports with the non-zero power is smaller than the quantity of the antenna ports contained in the SRS resource for determining the precoding matrix of the codebook-based PUSCH, each antenna port with the non-zero power belongs to the first N antenna ports, N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions:
a codeword does not exceed the coherent transmission capability of the user equipment;
a combination of at least one layer of the antenna ports with the non-zero power does not exceed the coherent transmission capability of the user equipment; or
when the quantity of the antenna ports with the non-zero power is smaller than the quantity of the antenna ports contained in the SRS resource for determining the precoding matrix of the codebook-based PUSCH, and N=1, the antenna port with the non-zero power is a first antenna port, when N=2, the antenna ports with the non-zero power are the first antenna port and a third antenna port, and when N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, the codebook subset of the codebook-based PUSCH is a full set or subset of a set composed of the precoding matrixes meeting any one of following conditions:
a codeword does not exceed the coherent transmission capability of the user equipment;
a combination of at least one layer of the antenna ports with the non-zero power does not exceed the coherent transmission capability of the user equipment; or
when the quantity of the antenna ports with the non-zero power is smaller than the quantity of the antenna ports contained in the SRS resource for determining the precoding matrix of the codebook-based PUSCH, if N=1, the antenna port with the non-zero power is a first antenna port, if N=2, the antenna ports with the non-zero power are a second antenna port and a fourth antenna port, and if N=3, the antenna ports with the non-zero power are the first three antenna ports, and N is the quantity of the PAs supporting the full power transmission of the user equipment, or N is the quantity of the antenna ports supporting the full power transmission of the user equipment.

In one embodiment, reference power or reference amplitude of PUSCH corresponding to each precoding matrix in the codebook subset of the codebook-based PUSCH meets the following conditions:
a power control scaling factor of PUSCH corresponding to the precoding matrix with the quantity of the antenna ports with the non-zero power being equal to the quantity of the antenna ports contained in the SRS resource for determining the precoding matrix of the codebook-based PUSCH is 1 or a predefined positive number;
when the quantity of the antenna ports with the non-zero power is smaller than the quantity of the antenna ports contained in the SRS resource for determining the precoding matrix of the codebook-based PUSCH, and N=1, a power control scaling factor of PUSCH corresponding to the precoding matrix with the antenna ports with the non-zero power being the first antenna ports is 1 or a predefined positive number, when N=2, a power control scaling factor of PUSCH corresponding to the precoding matrix with the antenna ports with the non-zero power containing at least one of the first antenna port and the third antenna port is 1 or a predefined positive number, and when N=3, a power control scaling factor of PUSCH corresponding to the precoding matrix with the antenna ports with the non-zero power containing at least one of the first three antenna ports is 1 or a predefined positive number; or
when the quantity of the antenna ports with the non-zero power is smaller than the quantity of the antenna ports contained in the SRS resource for determining the precoding matrix of the codebook-based PUSCH, and N=1, a power control scaling factor of PUSCH corresponding to the precoding matrix with the antenna ports with the non-zero power not being the first antenna ports is X/I, when N=2, a power control scaling factor of PUSCH corresponding to the precoding matrix with the at least one antenna port with the non-zero power being antenna ports other than the first antenna port and the third antenna port is X/I, and when N=3, a power control scaling factor of PUSCH corresponding to the precoding matrix with the at least one antenna port with the non-zero power being the antenna ports other than the first three antenna ports is X/I, and N is the quantity of PAs supporting the full power transmission of the user equipment, or N is the quantity of the antenna ports supporting the full power transmission of the user equipment, X is the quantity of the antenna ports with the non-zero power in the precoding matrix, and I is the quantity of the antenna ports contained in the SRS resource for determining the precoding matrix of the codebook-based PUSCH.

In one embodiment, a mode that the base station receives the full power transmission capability includes receiving, by the base station, PA information and/or antenna port information, the PA information includes fourth instruction, and the antenna port information includes fifth instruction, and the fourth instruction is configured to indicate that any PA of the user equipment can reach 1/M of maximum power class transmission power of the user equipment, or indicate that a combination of any M PAs of the user equipment can reach the maximum power class transmission power of the user equipment, or indicate that a combination of all the PAs of the user equipment can reach the maximum power class transmission power of the user equipment, and the fifth instruction is configured to indicate that any antenna port of the user equipment can reach 1/M of the maximum power class transmission power of the user equipment, or indicate that a combination of any M antenna ports of the user equipment can reach the maximum power class transmission power of the user equipment, or indicate that a combination of all the antenna ports of the user equipment can reach the maximum power class transmission power of the user equipment, and M is a positive integer.

In one embodiment, the codebook subset of the codebook-based PUSCH includes one or more precoding matrixes, and each precoding matrix meets at least one of the following conditions:
not exceeding the coherent transmission capability of the user equipment;
the quantity of the antenna ports with the non-zero power is equal to the quantity of the antenna ports contained in the SRS resource for determining the precoding matrix of the codebook-based PUSCH; or
the quantity of the antenna ports with the non-zero power is smaller than the quantity of the antenna ports contained in the SRS resource for determining the precoding matrix of the codebook-based PUSCH, and the quantity of the antenna ports with the non-zero power is not smaller than M.

In one embodiment, the codebook subset of the codebook-based PUSCH includes one or more precoding matrixes, and each precoding matrix meets at least one of the following conditions:
a combination of any layer of the antenna ports with the non-zero power does not exceed the coherent transmission capability of the user equipment;
the quantity of the antenna ports with the non-zero power is equal to the quantity of the antenna ports contained in the SRS resource for determining the precoding matrix of the codebook-based PUSCH; or
the quantity of the antenna ports with the non-zero power is smaller than the quantity of the antenna ports contained in the SRS resource for determining the precoding matrix of the codebook-based PUSCH, the quantity of the antenna ports with the non-zero power is not smaller than M, and M is a positive number.

In one embodiment, the codebook subset of the codebook-based PUSCH is a full set or subset of a set composed of the precoding matrixes meeting any one of following conditions:
a codeword does not exceed the coherent transmission capability of the user equipment;
a combination of at least one layer of the antenna ports with the non-zero power exceeds the coherent transmission capability of the user equipment, and the quantity of the antenna ports with the non-zero power is equal to the quantity of the antenna ports contained in the SRS resource for determining the precoding matrix of the codebook-based PUSCH; or
a combination of at least one layer of the antenna ports with the non-zero power exceeds the coherent transmission capability of the user equipment, the quantity of the antenna ports with the non-zero power is smaller than the quantity of the antenna ports contained in the SRS resource for determining the precoding matrix of the codebook-based PUSCH, the quantity of the antenna ports with the non-zero power is not smaller than M, and M is a positive number.

In one embodiment, reference power or reference amplitude of PUSCH corresponding to each precoding matrix in the codebook subset of the codebook-based PUSCH meets the following conditions:
a power control scaling factor of PUSCH corresponding to the precoding matrix with the antenna ports with the non-zero power is a minimum value between (MX)/I and 1, and X is the quantity of the antenna ports with the non-zero power in the precoding matrix, I is the quantity of the antenna ports contained in the SRS resource for determining the precoding matrix of the codebook-based PUSCH, and M is a positive number.

In one embodiment, a mode that the base station receives the full power transmission capability includes receiving, by the base station, a precoding matrix set;
any two precoding matrixes in the precoding matrix set meet the following conditions: at least one layer of antenna ports with non-zero power in any two precoding matrixes are different; or the antenna ports with the non-zero power in any two precoding matrixes are the same, but the transmission layer quantities of any two precoding matrixes are different.

In one embodiment, a mode that the base station receives the full power transmission capability includes receiving, by the base station, a precoding matrix set;
any two precoding matrixes in the precoding matrix set meet the following conditions: antenna ports with non-zero power in any two precoding matrixes are different.

In one embodiment, a mode that the base station receives the full power transmission capability includes receiving, by the base station, a precoding matrix set; and
the codebook subset of the codebook-based PUSCH includes one or more precoding matrixes, and each precoding matrix meets the following conditions:
each precoding matrix belongs to precoding matrixes in the precoding matrix set reported by the user equipment.

In one embodiment, a mode that the base station receives the full power transmission capability includes receiving, by the base station, a precoding matrix set; and
the codebook subset of the codebook-based PUSCH includes one or more precoding matrixes, and each precoding matrix meets at least one of the following conditions:
a non-zero port of any precoding matrix is the same as a non-zero port of at least one precoding matrix in the precoding matrix set reported by the user equipment; and
the non-zero power ports and the transmission layer quantities of any two precoding matrixes are the same, and relative phases between non-zero antenna ports corresponding to the at least two precoding matrixes are different.

In one embodiment, a mode that the base station receives the full power transmission capability includes receiving, by the base station, a precoding matrix set; and
the codebook subset of the codebook-based PUSCH includes one or more precoding matrixes, and each precoding matrix meets at least one of the following conditions:

a combination of any layer of antenna ports with non-zero power does not exceed the coherent transmission capability of the user equipment; or a combination of at least one layer of antenna ports with the non-zero power exceeds the coherent transmission capability of the user equipment, and the non-zero ports are the same as non-zero ports contained by at least one precoding matrix in the precoding matrix set sent by the user equipment.

In one embodiment, a mode that the base station receives the full power transmission capability includes receiving, by the base station, a precoding matrix set; and
the codebook subset of the codebook-based PUSCH is a full set or subset of a set composed of the precoding matrixes meeting any one of following conditions:
not exceeding the coherent transmission capability of the user equipment; or
the contained non-zero antenna ports are the same as non-zero antenna ports corresponding to one precoding matrix in the precoding matrix set sent by the user equipment.

In one embodiment, a mode that the base station receives the full power transmission capability includes receiving, by the base station, the same precoding matrix set; and
the determining, by the base station, the codebook subset of the codebook-based PUSCH according to the coherent transmission capability, includes:
the base station determines the different codebook subsets of the codebook-based PUSCH corresponding to the same precoding matrix set according to the different coherent transmission capabilities.

In one embodiment, the full power transmission capability includes the user equipment supporting full power transmission but at least one PA not supporting the full power transmission, and the coherent transmission capability is supporting noncoherent transmission. The precoding matrixes in the codebook subset of the codebook-based PUSCH meet the following conditions:
the quantity of antenna ports with non-zero power of any precoding matrix is equal to the quantity of antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the antenna ports with the non-zero power of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The precoding matrixes in the codebook subset of the codebook-based PUSCH meet the following conditions:
the quantity of the antenna ports with the non-zero power of any precoding matrix is equal to the quantity of the antenna ports included in an SRS resource obtained by CSI for determining the codebook-based PUSCH, and at least one layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting fullcoherent transmission. The precoding matrixes in the codebook subset of the codebook-based PUSCH meet the following conditions:
the quantity of the antenna ports with the non-zero power of any precoding matrix is equal to the quantity of the antenna ports included in an SRS resource obtained by CSI for determining the codebook-based PUSCH, and at least one layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting noncoherent transmission. The codebook subset includes a codebook subset composed of noncoherent transmission codebooks, and a first precoding set. Precoding matrixes in the first precoding set meet the following conditions:
the quantity of antenna ports with non-zero power of any precoding matrix is equal to the quantity of antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the antenna ports with the non-zero power of any two precoding matrixes are the same, but the transmission layer quantities of any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a second precoding set. Precoding matrixes in the second precoding set meet the following conditions:

the quantity of the antenna ports with the non-zero power of any precoding matrix is equal to the quantity of the antenna ports included in an SRS resource obtained by CSI for determining the codebook-based PUSCH, and at least one layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports of any two precoding matrixes are the same, but the transmission layer quantities of any two precoding matrixes are different; or the quantity of the antenna ports with the non-zero power of any precoding matrix is equal to the quantity of the antenna ports included in the SRS resource obtained by CSI for determining the codebook-based PUSCH, the non-zero power ports and the transmission layer quantities of any two precoding matrixes are the same, but relative phases of at least one coherent transmission antenna group in the coherent transmission antenna groups corresponding to any two precoding matrixes are different.

In one embodiment, the full power transmission capability includes the user equipment supporting full power transmission but at least one PA not supporting the full power transmission, and the coherent transmission capability is supporting partialcoherent transmission. The codebook subset includes a codebook subset composed of noncoherent transmission codewords, a codebook subset composed of partialcoherent transmission codewords, and a first precoding set. Precoding matrixes in the first precoding set meet the following conditions:

the quantity of antenna ports with non-zero power of any precoding matrix is equal to the quantity of antenna ports included in an SRS resource obtained by CSI for determining the codebook-based PUSCH, and at least one corresponding layer of the non-zero power ports in any two precoding matrixes are different; or the quantity of the antenna ports with the non-zero power of any precoding matrix is equal to the quantity of the antenna ports included in the SRS resource obtained by CSI for determining the codebook-based PUSCH, the antenna ports with the non-zero power of any two precoding matrixes are the same, but the transmission layer quantities of any two precoding matrixes are different.

Based on an embodiment of the present application further provides a computer readable storage medium. The computer readable storage medium stores a computer executable instruction, and the computer executable instruction is configured to cause a computer to execute the flow executed in FIG. 2.

Based on an embodiment of the present disclosure further provides a computer readable storage medium. The computer readable storage medium stores a computer executable instruction, and the computer executable instruction is configured to cause a computer to execute the flow executed in FIG. 3.

The present disclosure is described with reference to flow charts and/or block diagrams of the methods, the equipment (systems), and computer program products according to the embodiments of the present disclosure. It should be understood that each flow and/or block in the flow charts and/or the block diagrams and combinations of the flows and/or the blocks in the flow charts and/or the block diagrams can be implemented by computer program instructions. These computer program instructions may be provided to a processor of a general-purpose computer, a special-purpose computer, an embedded processing machine or other programmable data processing devices to generate a machine, and the instructions, when executed by the processor of the computer or other programmable data processing equipment, generate an apparatus for implementing functions specified in one or more flows in the flow charts and/or one or more blocks in the block diagrams.

These computer program instructions may also be stored in a computer readable memory which can guide the computer or other programmable data processing devices to work in a specific mode, thus the instructions stored in the computer readable memory generate an article of manufacture that includes a commander apparatus that implement the functions specified in one or more flows in the flow charts and/or one or more blocks in the block diagrams.

These computer program instructions may also be loaded to the computer or other programmable data processing equipment, so that a series of operating steps are executed on the computer or other programmable equipment to generate computer-implemented processing, and the instructions executed on the computer or other programmable equipment provide steps for implementing the functions specified in one or more flows in the flow charts and/or one or more blocks in the block diagrams.

The invention claimed is:

1. An uplink scheduling information determining method, comprising:

reporting, by user equipment, a full power transmission capability of the user equipment and/or a coherent transmission capability of the user equipment to a base station;

determining, by the user equipment, a codebook subset of a codebook-based physical uplink shared channel, PUSCH, and/or second information according to first information; wherein the first information comprises at least one of the full power transmission capability, and a first instruction, or, the first information comprises the coherent transmission capability, and at least one of the full power transmission capability, and a first instruction;

the second information comprises an overhead of the indication of precoding information and number of transmission layers of the codebook-based PUSCH, and/or an encoding mechanism of the indication of precoding information and number of transmission layers of the codebook-based PUSCH; the first instruction comprises an instruction for indicating a full power transmission mode; and;

receiving, by the user equipment, uplink scheduling information of the codebook-based PUSCH sent by the base station; and determining, by the user equipment, the precoding matrix and the number of transmission layers of the codebook-based PUSCH according to the uplink scheduling information of the codebook-based PUSCH and the second information sent by the base station.

2. The method according to claim 1, comprising:
determining, by the user equipment, the transmission power of the codebook-based PUSCH according to a full power transmission mode indicated by the instruction of the full power transmission mode of the user equipment.

3. The method according to claim 1, wherein before the determining, by the user equipment, the codebook subset of the codebook-based PUSCH and/or the second information according to the first information, the method comprises:
receiving, by the user equipment, a second instruction sent by the base station, wherein the second instruction is for instructing the user equipment to determine the second information according to the full power transmission capability and/or the coherent transmission capability.

4. The method according to claim 1, wherein a scheme that the user equipment reports the full power transmission capability comprises:
the user equipment reports an uplink full power transmission mode supported by the user equipment.

5. The method according to claim 4, wherein a combination of the antenna ports corresponding to non-zero elements contained by each precoding matrix in the precoding matrix set supports the full power transmission.

6. The method according to claim 4, wherein the user equipment reports the first antenna port quantity, and the method comprises:
determining, by the user equipment, transmission power of the codebook-based PUSCH through the following modes:
when a quantity of determined non-zero antenna ports comprised in a transmission precoding matrix of the codebook-based PUSCH is greater than the first antenna port quantity, a predefined scaling factor is used to scale basic power of the codebook-based PUSCH, and the scaled PUSCH power is equally allocated to PUSCH antenna ports with non-zero power;
or
the user equipment reports the first antenna port quantity, and the method comprises:
determining, by the user equipment, transmission power of the codebook-based PUSCH through following modes:
when a quantity of antenna ports comprised by a sounding reference signal, SRS, resource for determining the precoding matrix of the PUSCH is smaller than the first antenna port quantity, a predefined scaling factor is used to scale basic power of the PUSCH, and the scaled power is equally allocated to PUSCH antenna ports with non-zero power.

7. The method according to claim 4, wherein a scheme that the user equipment reports the full power transmission capability comprises reporting, by the user equipment, the PA information and/or the antenna port information, wherein the PA information comprises a quantity of PAs supporting the full power transmission by the user equipment, and the antenna port information comprises a quantity of antenna ports supporting the full power transmission by the user equipment.

8. The method according to claim 4, wherein a scheme that the user equipment reports the full power transmission capability comprises reporting, by the user equipment, a precoding matrix set; and
any two precoding matrixes in the precoding matrix set meet following conditions:
at least one layer of non-zero power ports in any two precoding matrixes are different; or
non-zero power ports in any two precoding matrixes are same, but transmission layer quantities of any two precoding matrixes are different,
or
a scheme that the user equipment reports the full power transmission capability comprises reporting, by the user equipment, a precoding matrix set; and
any two precoding matrixes in the precoding matrix set meet a following condition: antenna ports with non-zero power in any two precoding matrixes are different.

9. An uplink scheduling information determining method, comprising:
receiving, by a base station, report information of user equipment, wherein the report information at least comprises a full power transmission capability of the user equipment and/or a coherent transmission capability of the user equipment;
determining, by the base station, the full power transmission capability of the user equipment and/or the coherent transmission capability of the user equipment according to the report information;
determining, by the base station, a codebook subset of a codebook-based physical uplink shared channel, PUSCH, and/or third information according to the full power transmission capability of the user equipment and/or the coherent transmission capability of the user equipment, wherein the third information comprises at least one of the following information: an overhead indicated by a precoding matrix and number of transmission layers of the codebook-based PUSCH, an encoding mode indicated by the precoding matrix and the number of transmission layers of the codebook-based PUSCH, or information on codebook subset restriction of the codebook-based PUSCH, and the information on codebook subset restriction of the codebook-based PUSCH is used for indicating the codebook subset of the codebook-based PUSCH; and
sending, by the base station, uplink scheduling information of the codebook-based PUSCH to the user equipment according to the codebook subset of the codebook-based PUSCH and/or the third information;
wherein the uplink scheduling information of the codebook-based PUSCH is used for determining the precoding matrix and the number of transmission layers of the codebook-based PUSCH.

10. The method according to claim 9, wherein before the sending, by the base station, the uplink scheduling information of the codebook-based PUSCH to the user equipment according to the codebook subset of the codebook-based PUSCH and/or the third information, the method comprises:
sending, by the base station, the information on codebook subset restriction of the codebook-based PUSCH to the user equipment, wherein the information on codebook subset restriction of the codebook-based PUSCH is used by the user equipment to determine the codebook subset of the codebook-based PUSCH and/or second information, and the second information comprises one of the following information: an overhead of the indication of precoding information and number of transmission layers of the codebook-based PUSCH; the encoding mechanism of the indication of precoding information and number of transmission layers of the codebook-based PUSCH; or the overhead of the indication of precoding information and number of transmission layers of the codebook-based PUSCH, and an encoding mechanism of the indication of precoding information and number of transmission layers of the codebook-based PUSCH.

11. The method according to claim 9, comprising:
determining, by the base station, reference power or reference amplitude corresponding to precoding matrixes in the codebook subset of the codebook-based PUSCH according to the full power transmission capability; or
determining, by the base station, the reference power or reference amplitude corresponding to the precoding matrixes in the codebook subset of the codebook-based PUSCH according to the coherent transmission capability; or
determining, by the base station, the reference power or reference amplitude corresponding to the precoding matrixes in the codebook subset of the codebook-based PUSCH according to the full power transmission capability and the coherent transmission capability.

12. The method according to claim 10, comprising:
sending, by the base station, a second instruction to the user equipment, wherein the second instruction is configured to instruct the user equipment to determine the second information according to the full power transmission capability and/or the coherent transmission capability; and the second information comprises the overhead of the indication of precoding information and number of transmission layers of the codebook-based PUSCH, and/or an encoding mechanism of the indication of precoding information and number of transmission layers of the codebook-based PUSCH.

13. The method according to claim 9, wherein when the report information comprises the full power transmission capability of the user equipment, the base station receives the report information according to a following mode:
the base station receives an uplink full power transmission mode supported by the user equipment and sent by the user equipment.

14. The method according to claim 13, wherein a combination of the antenna ports corresponding to non-zero elements contained by each precoding matrix in the precoding matrix set supports the full power transmission.

15. The method according to claim 13, wherein the base station receives the first antenna port quantity, and the method comprises:
determining, by the base station, reference power or reference amplitude of the codebook-based PUSCH through a following mode: when a quantity of non-zero antenna ports comprised in a precoding matrix is greater than the first antenna port quantity and said precoding matrix is utilized to measure or detect the codebook-based PUSCH, the reference power or amplitude corresponding to said precoding matrix is scaled by using a predefined scaling factor;
or
the base station receives the first antenna port quantity, and the method comprises:
determining, by the base station, reference power or reference amplitude of the codebook-based PUSCH through a following mode: when a quantity of antenna ports comprised in a sounding reference signal, SRS, resource is smaller than the first antenna port quantity and an SRS on the SRS resource is utilized to calculate a signal to noise ratio corresponding to a precoding matrix, the reference power or amplitude corresponding to said precoding matrix is scaled by using a predefined scaling factor.

16. The method according to claim 13, wherein a scheme that the base station receives the full power transmission capability comprises receiving, by the base station, the PA information and/or the antenna port information, wherein the PA information comprises a quantity of PAs supporting the full power transmission of the user equipment, and the antenna port information comprises a quantity of antenna ports supporting the full power transmission of the user equipment.

17. The method according to claim 13, wherein a scheme that the base station receives the full power transmission capability comprises receiving, by the base station, a precoding matrix set; and
any two precoding matrixes in the precoding matrix set meet following conditions:
at least one layer of antenna ports with non-zero power in any two precoding matrixes are different; or
antenna ports with the non-zero power in any two precoding matrixes are same, but transmission layer quantities of the any two precoding matrixes are different;
or
a scheme that the base station receives the full power transmission capability comprises receiving, by the base station a precoding matrix set; and
any two precoding matrixes in the precoding matrix set meet a following condition: antenna ports with non-zero power in any two precoding matrixes are different.

18. A user equipment, comprising a processor, a memory and a transceiver, wherein
the memory stores a computer instruction; and
the processor is configured to read the computer instruction to execute the method according to claim 1.

19. A base station, comprising a processor, a memory and a transceiver, wherein
the memory stores a computer instruction; and
the processor is configured to read the computer instruction to execute the method according to claim 9.

* * * * *